US007823532B2

(12) United States Patent
Horikawa et al.

(10) Patent No.: US 7,823,532 B2
(45) Date of Patent: Nov. 2, 2010

(54) DIE, MANUFACTURING METHOD OF AN OPTICAL DISK, AND AN OPTICAL DISK

(75) Inventors: Akihiro Horikawa, Osaka (JP); Yasuhiro Ueyama, Osaka (JP); Masaru Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 692 days.

(21) Appl. No.: 11/535,777

(22) Filed: Sep. 27, 2006

(65) Prior Publication Data

US 2007/0125302 A1    Jun. 7, 2007

(30) Foreign Application Priority Data

Sep. 28, 2005    (JP) .............................. 2005-283047

(51) Int. Cl.
*B05C 5/00*    (2006.01)
*B05D 1/26*    (2006.01)
(52) U.S. Cl. ...................... 118/410; 118/320; 118/321; 118/323; 427/356
(58) Field of Classification Search ................. 118/410, 118/320–321, 323; 427/240; 425/461, 382.4, 425/466, 467
See application file for complete search history.

(56) References Cited

U.S. PATENT DOCUMENTS 4,810,527 A    3/1989    Geary, Jr. et al.

FOREIGN PATENT DOCUMENTS

| EP | 0 260 674 A2 | 3/1988 |
| JP | 5-5548 B2 | 1/1993 |
| JP | 2006-122857 A | 5/2006 |

*Primary Examiner*—Laura Edwards
(74) *Attorney, Agent, or Firm*—RatnerPrestia

(57) ABSTRACT

The die as provided is a die in which an upper block is placed on an upper surface of a lower block with a lower surface of the upper block in contact with the upper surface, wherein the lower block includes a manifold and a slit serving as a path for discharging paint from the manifold to the outside, constituted respectively from between the lower block and the lower surface of the upper block by forming a cavity and a space which communicates with the outside from this cavity along a columnar direction, respectively, from one end face of a columnar body with a trapezoidal shape of cross section to the other end face, a paint supply path which communicates with the manifold is formed from an outer side located between the one end face and the other end face of the lower block, a slit space dimension of the slit between front end portions in a paint discharge direction of the lower block and the upper block in a discharge port serving as an open end to the outside is smallest on the one end face side and increases toward the other end face side, and a slit length which is a dimension along the paint discharge direction of a space forming surface of the lower block constituting the slit is largest on at least one of the one end face side and the other end face side and is smallest in a position between both the end faces.

8 Claims, 39 Drawing Sheets

11 UPPER BLOCK
12 LOWER BLOCK
13 MANIFOLD
14 SLIT
15 SLIT GAP (hsg)
16 SLIT LENGTH (Ls)
17 WIDTH
18 DISCHARGE PORT
19 FRONT LIP
20 REAR LIP

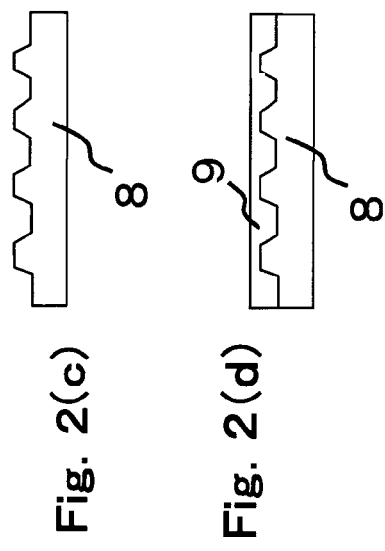
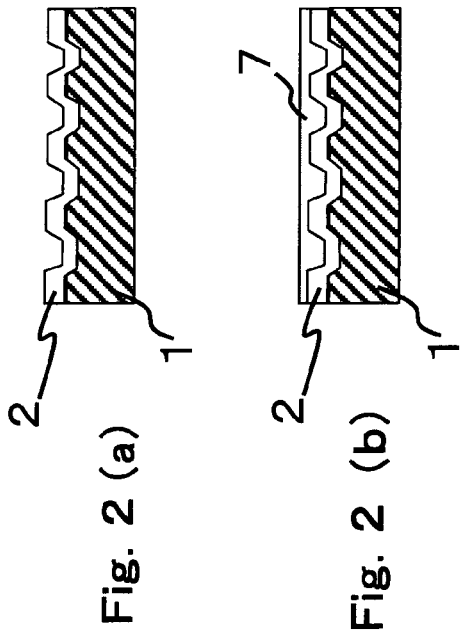
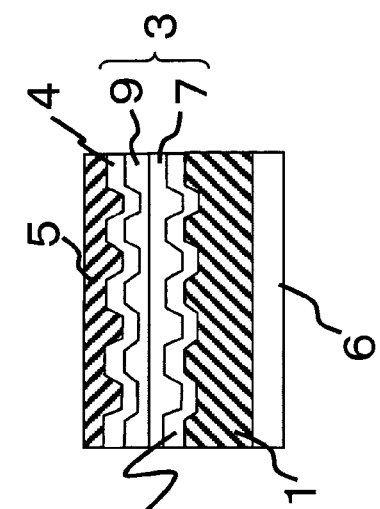
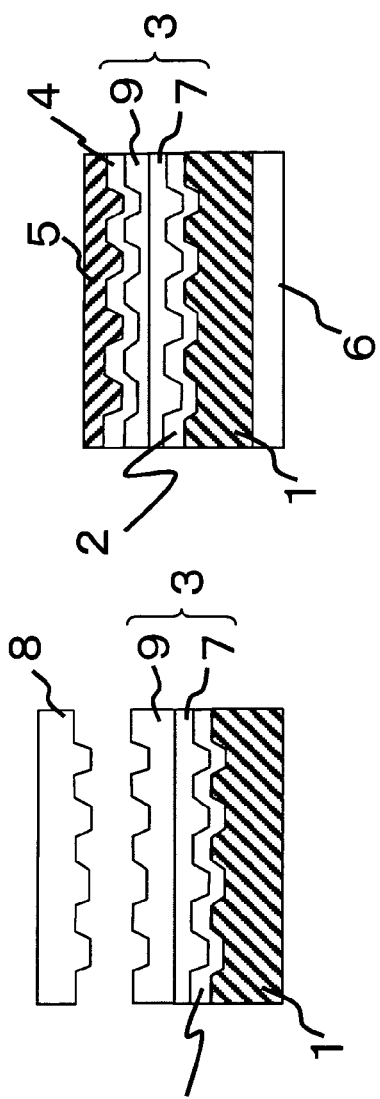
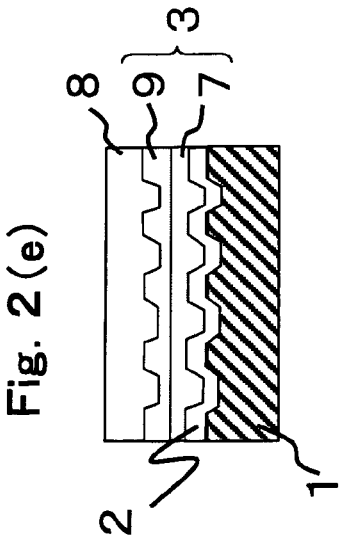

11 UPPER BLOCK
12 LOWER BLOCK
13 MANIFOLD
14 SLIT
15 SLIT GAP (hsg)
16 SLIT LENGTH (Ls)
17 WIDTH
18 DISCHARGE PORT
19 FRONT LIP
20 REAR LIP

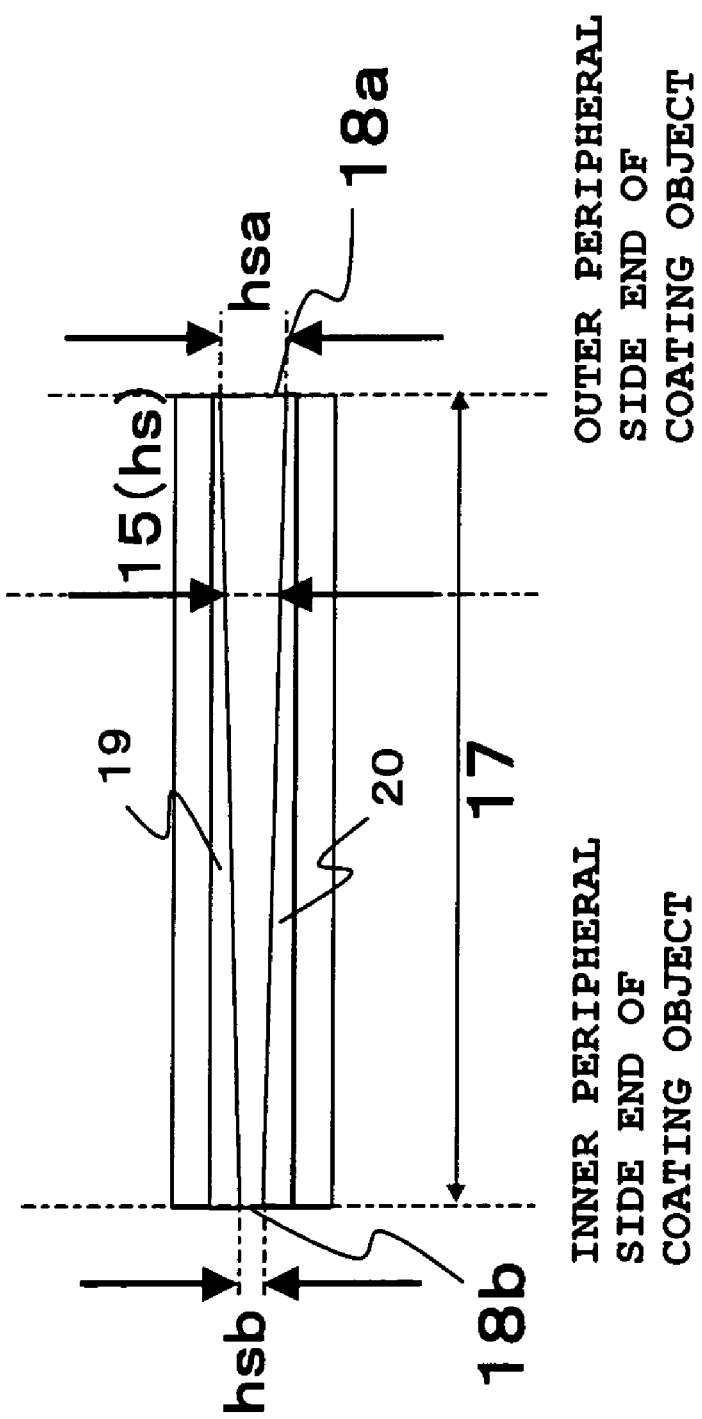

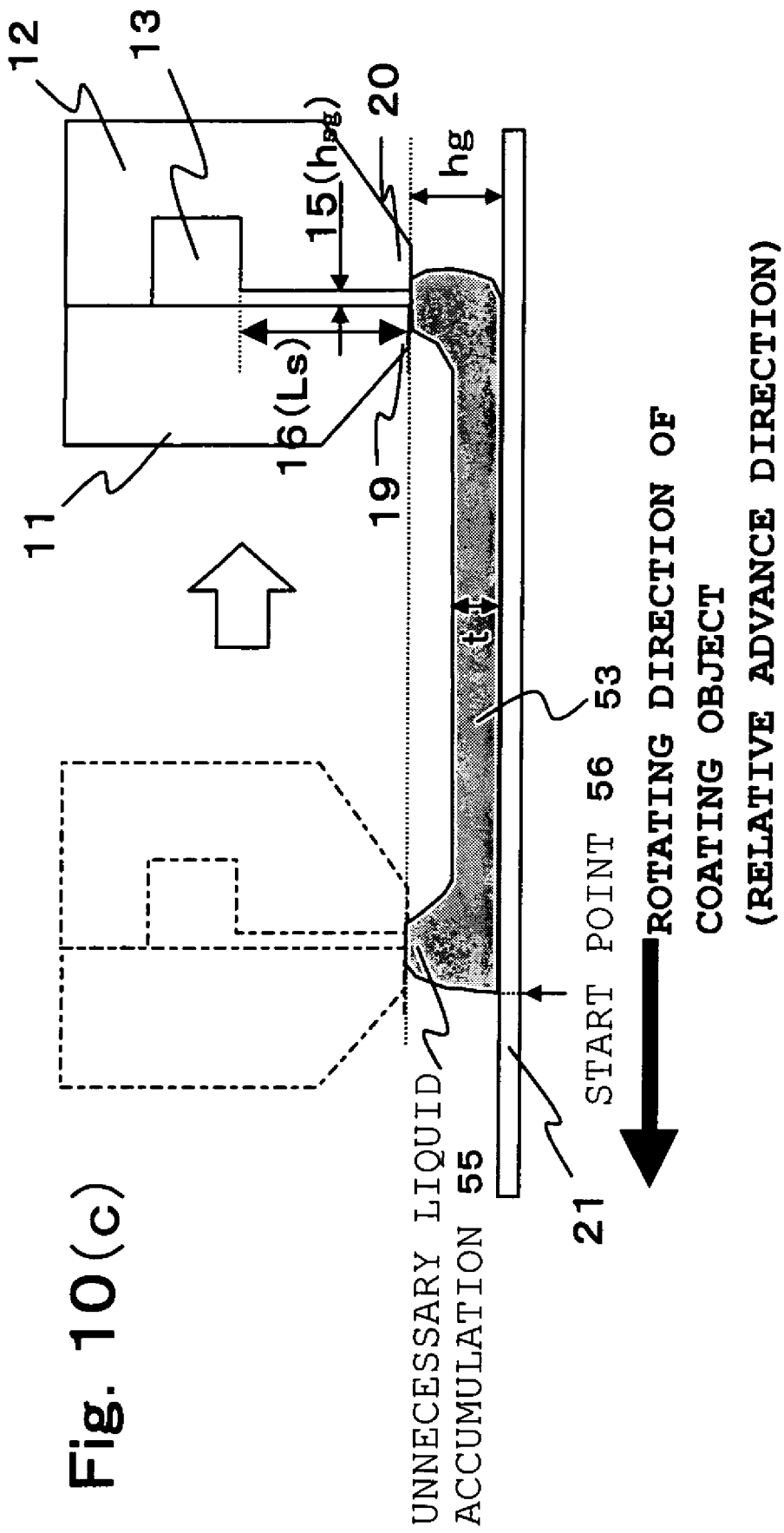

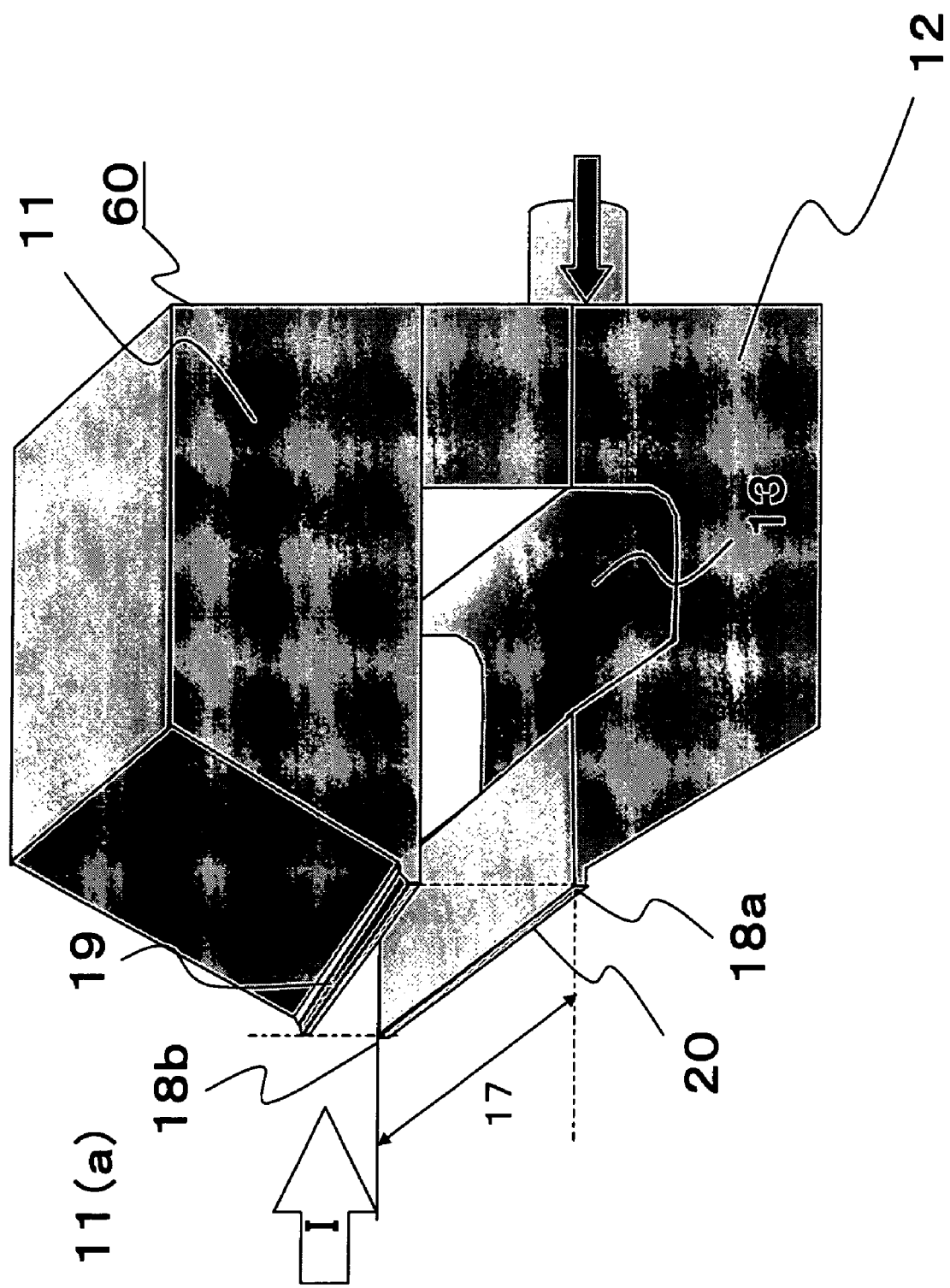

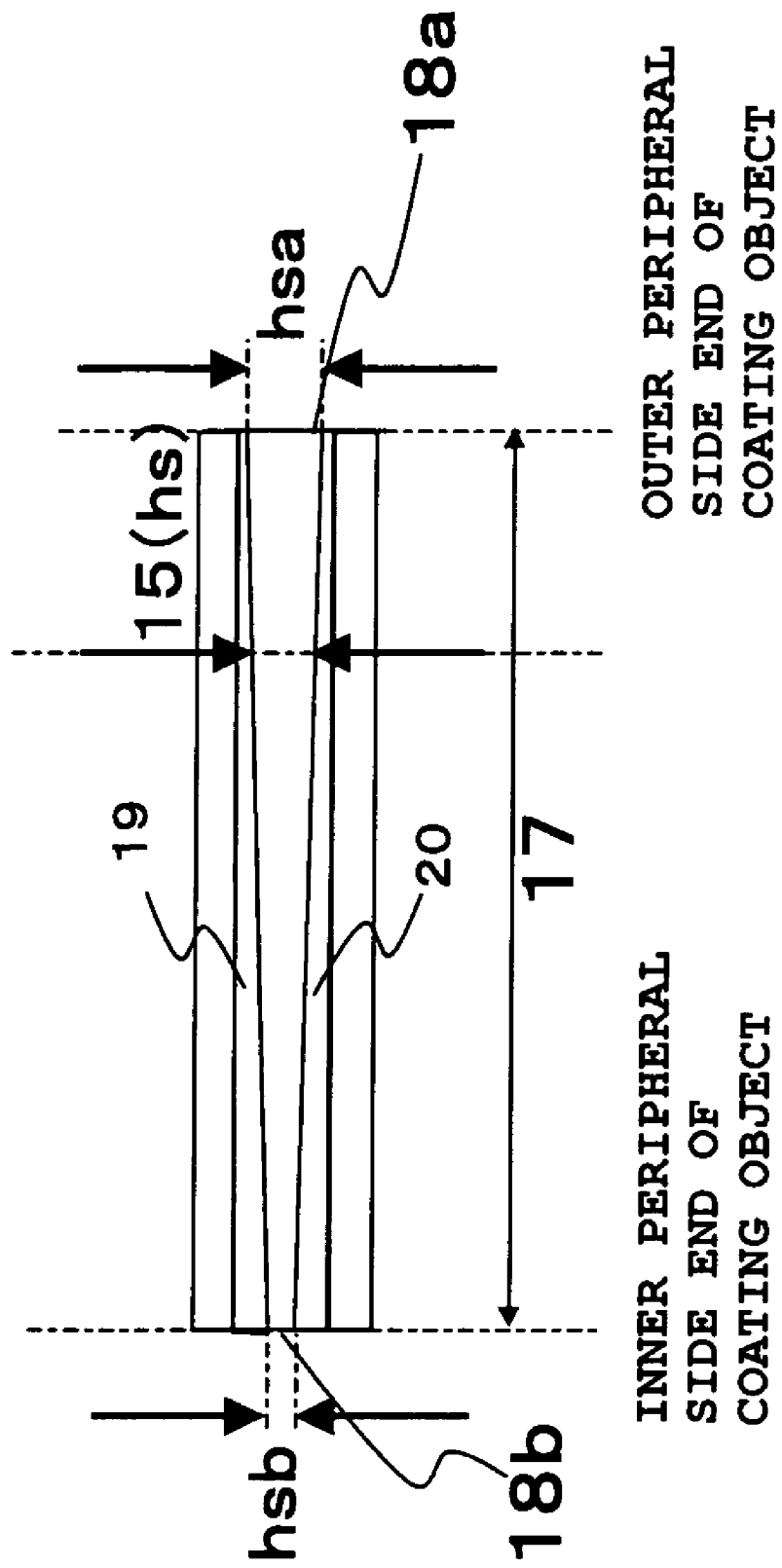

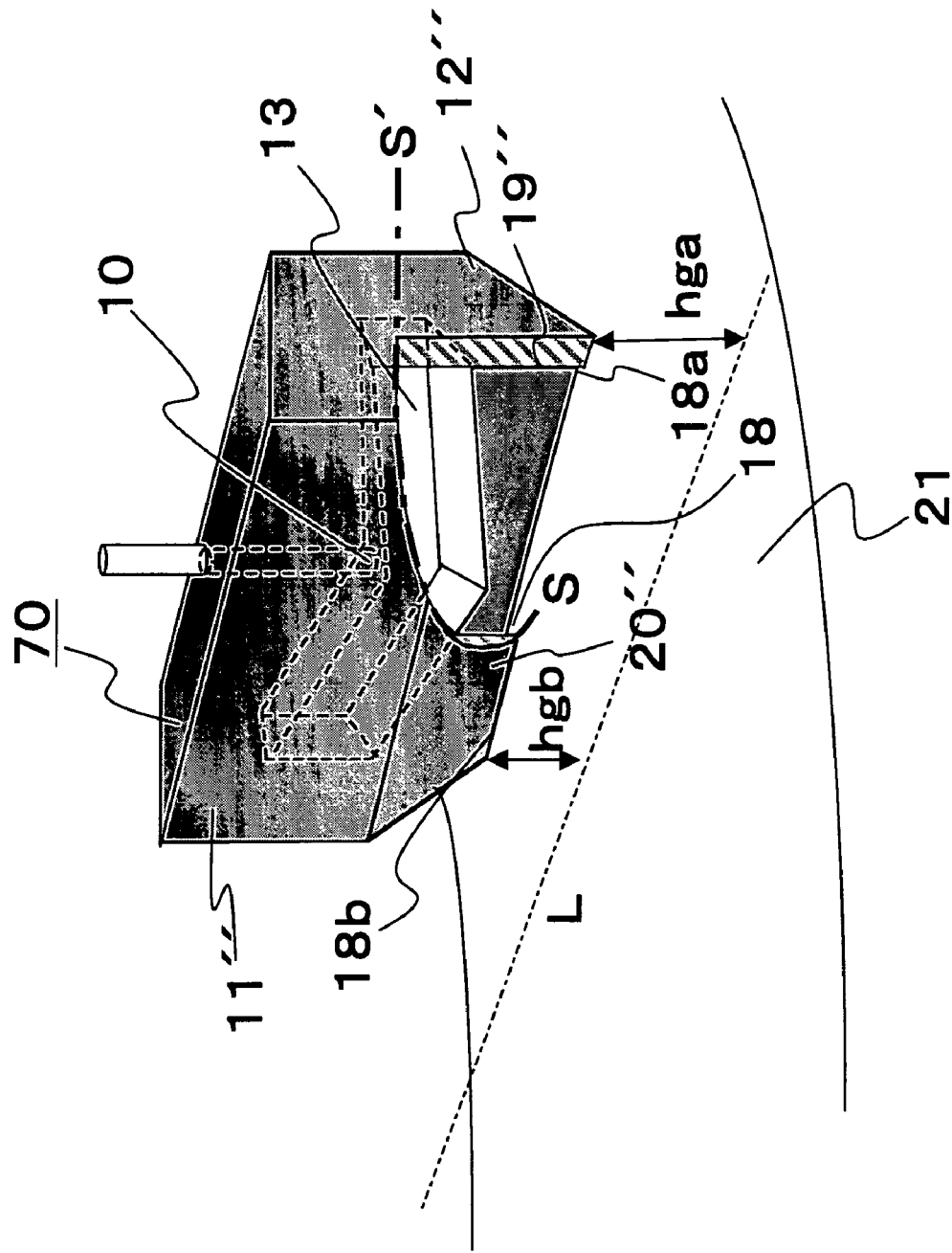

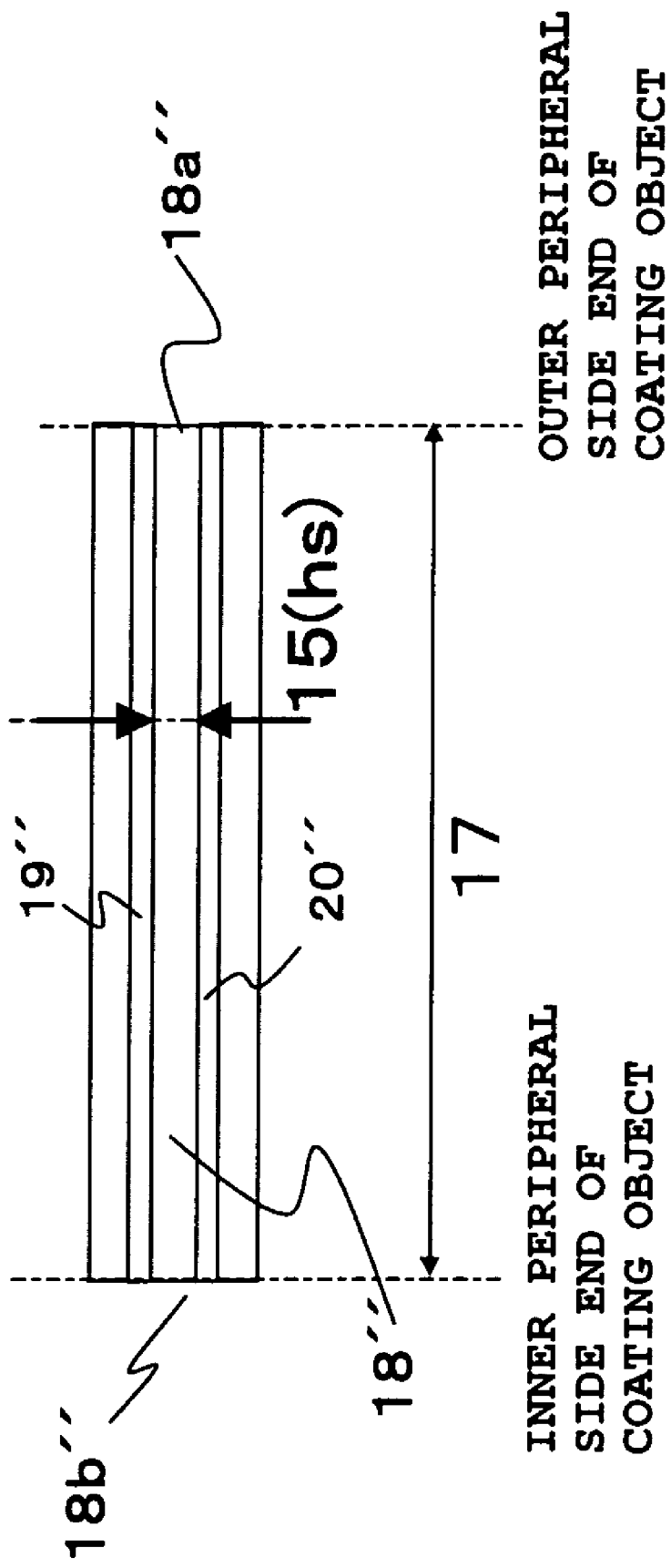

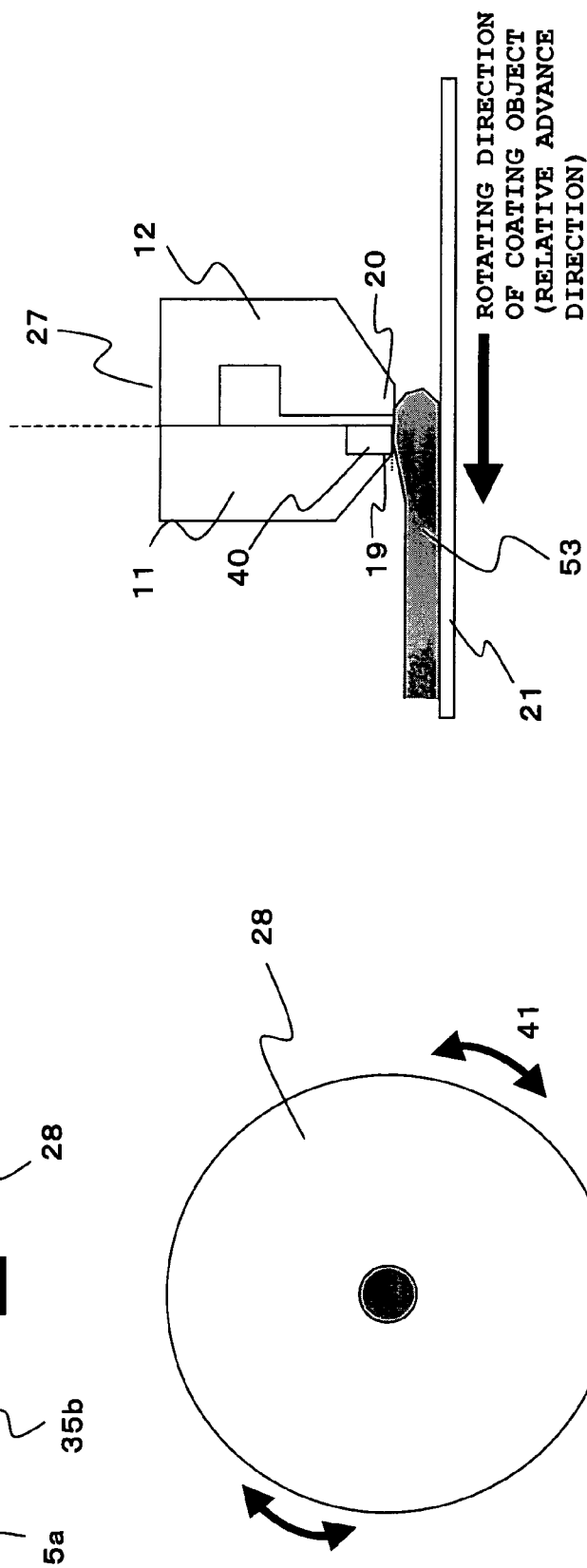

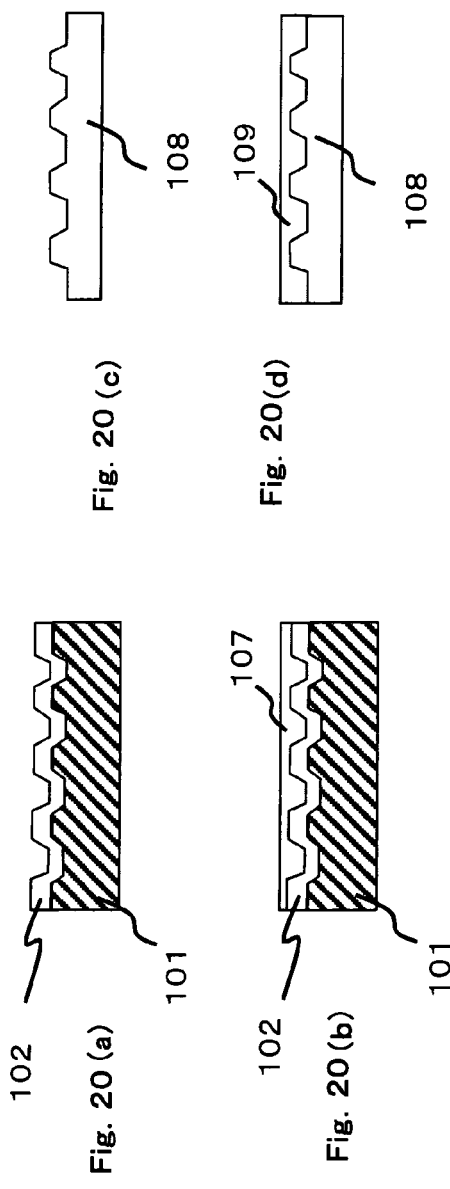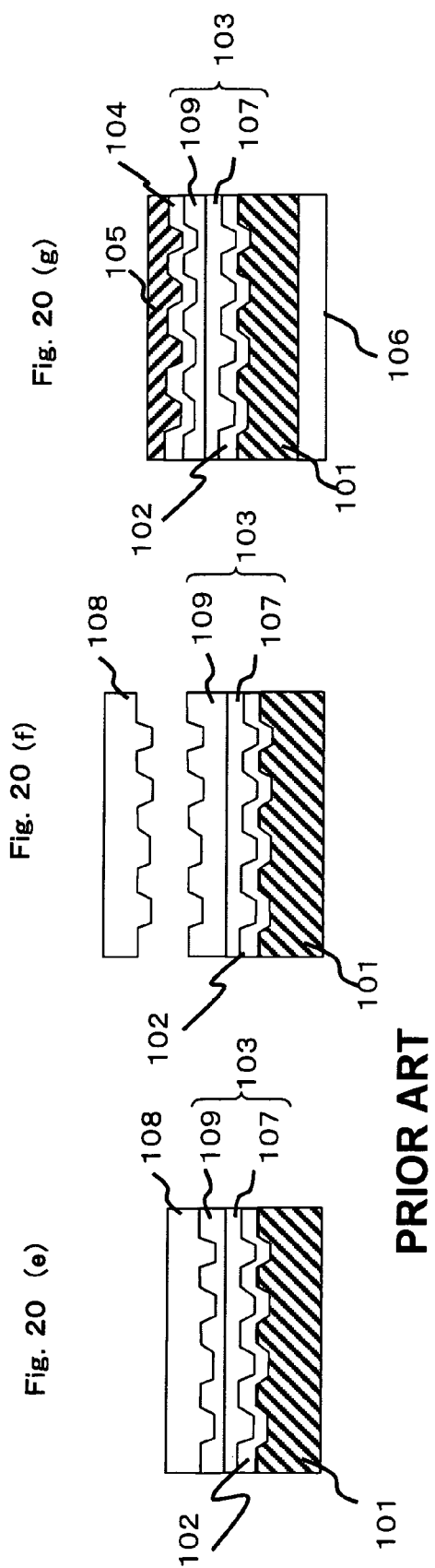
PRIOR ART

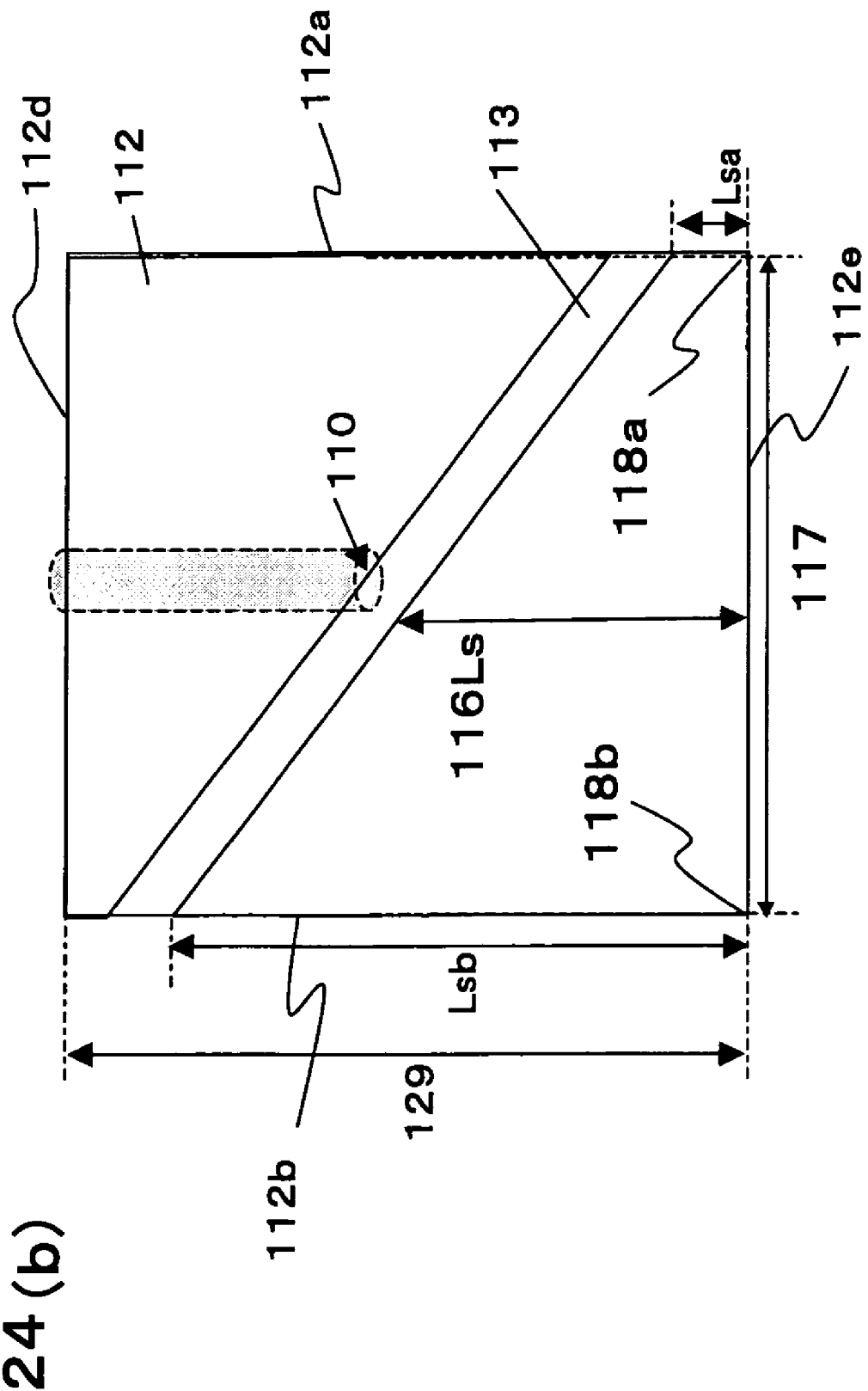
Fig. 24 (b) PRIOR ART

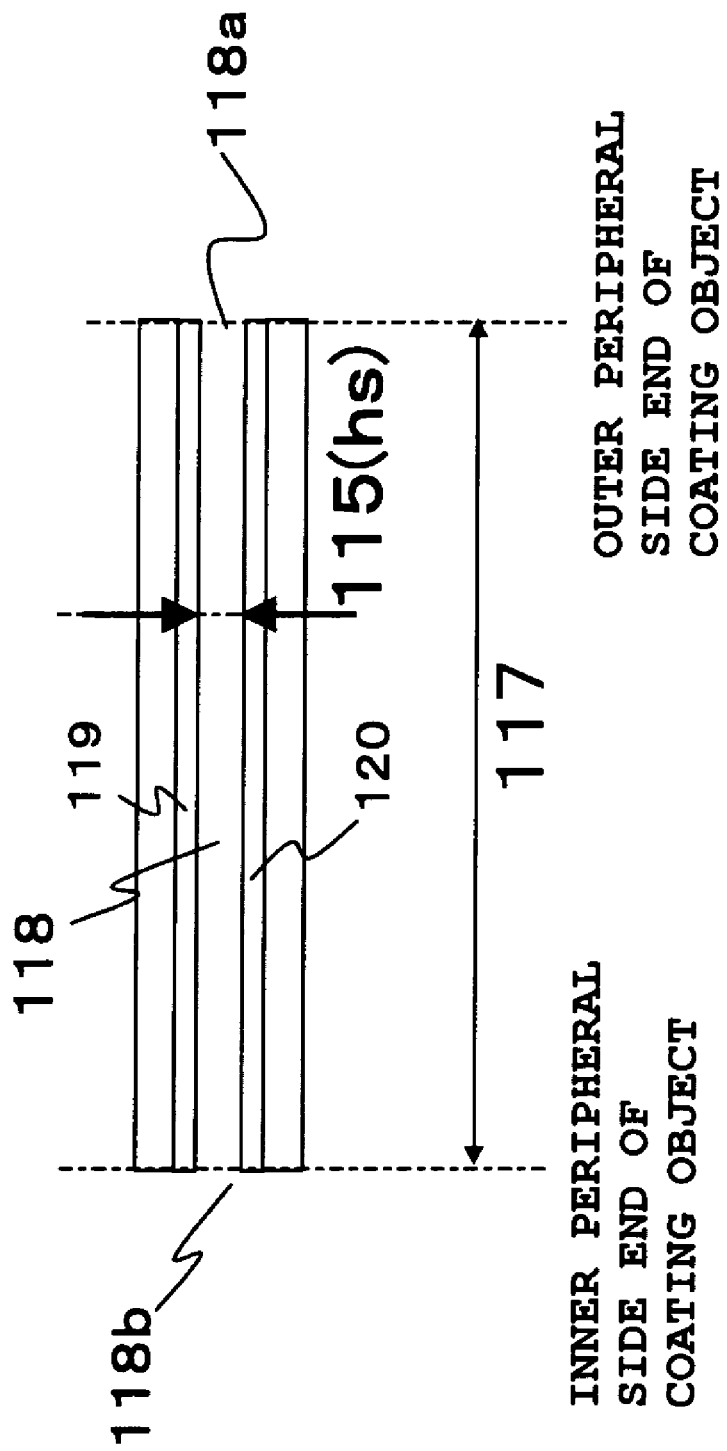

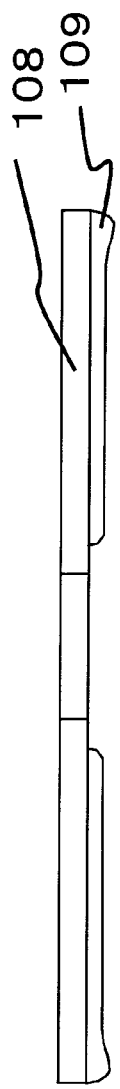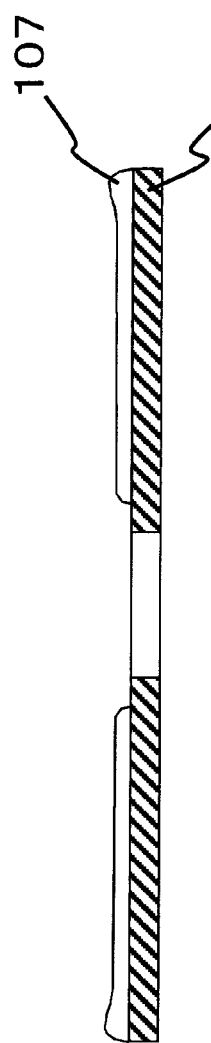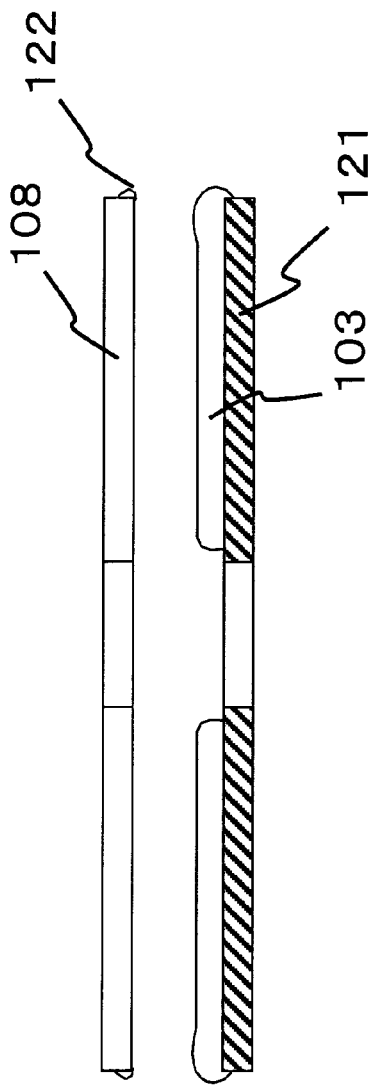
PRIOR ART
Fig. 28 (a)
Fig. 28 (b)
Fig. 28 (c)

DIE, MANUFACTURING METHOD OF AN OPTICAL DISK, AND AN OPTICAL DISK

CROSS-REFERENCE TO RELATED APPLICATIONS

This application claims priority to Japanese Patent Application No. 2005-283047, filed in the Japanese Patent Office on Sep. 28, 2005, the entire contents of it are hereby incorporated herein by reference.

BACKGROUND OF THE INVENTION

1. Field of the Invention

The present invention relates to a die for forming a resin layer as an intermediate layer of an optical disk or a coat layer of a front surface or a rear surface of the optical disk, a method of manufacturing an optical disk, and an optical disk.

2. Related Art of the Invention

A general structure of a conventional optical disk will be explained. In recent years, there have been remarkable increases in a recording density and a capacity of optical disks used for various applications for information recording such as audios, images, and computers. Products such as CDs (compact disks) and DVDs (digital versatile disks) have been produced. In general, such optical disks are constituted by stacking a recording layer, a reflection layer, and the like on a substrate and further providing a protective layer. In general, a PC (polycarbonate) substrate is used for the substrate.

In particular, in recent years, an optical disk having a large capacity is demanded. The development of a one-side multi-layer disk provided with two or more recording layers on one side of a disk has been advanced. A next-generation DVD having a diameter of 120 mm and a recording capacity of several gigabytes or more has been realized. In such a next-generation DVD, a recording density is increased by a high NA (Numerical Aperture: the number of openings of a lens). A focal length of the lens is reduced as the NA is increased. Thus, it is necessary to bring the recording layers closer to the lens and it is demanded to reduce thickness of a cover layer for protecting the recording layers. In a lens having a higher NA, blur and aberration tend to occur. Thus, high uniformity is required for qualities and thicknesses of layers (hereinafter referred to as film qualities and film thicknesses) of not only the cover layer but also in planes of respective layers forming the optical disk such as an intermediate layer.

A structure of a next-generation one-side two-layer disk is shown in FIG. 19. In the next-generation one-side two-layer disk, a first recording layer 102 having a recording track 102a is formed on a disk substrate 101, a second recording layer 104 having a recording track 104a is formed on the first recording layer 102 via an intermediate layer 103, and a cover layer 105 is formed to cover the second recording layer 104. A rear-side coat layer 106 is formed on a rear surface of the disk substrate 101.

A light beam is irradiated on the next-generation one-side two-layer disk having such a structure from the side of the cover layer 105 and recording and reproduction or only reproduction of information in the first and the second recording layers 102 and 104 is performed.

A method of manufacturing the disk will be briefly explained.

As shown in FIG. 20A, the first recording layer 102 is formed on the disk substrate 101 on which a pattern of a recording track is formed. An ultraviolet-curing adhesive 107 (hereinafter referred to as adhesive 107) is applied over this first recording layer 102 as shown in FIG. 20B. In parallel with the application of the adhesive 107, as shown in FIG. 20D, ultraviolet-curing resin 109 is applied over a stamper 108 on which a pattern of a recording track is formed as shown in FIG. 20C.

Subsequently, as shown in FIG. 20E, the disk substrate 101 and the stamper 108 are stuck together and pressed with coated surfaces thereof opposed to each other under vacuum. An ultraviolet ray is irradiated on the disk in that state to harden the adhesive 107 and the ultraviolet-curing resin 109, whereby the intermediate layer 103 is formed. Thereafter, as shown in FIG. 20F, the stamper 108 is peeled off. As shown in FIG. 20G, the second recording layer 104 is formed on the intermediate layer 103, onto which the pattern of the stamper 108 is transferred, and the cover layer 105 and the rear-side coat layer 106 are formed. In this case, a method of application by nozzles, a spin coat method, a sheet sticking method, or the like is used for the application and formation of the adhesive 107, the ultraviolet-curing resin 109, the cover layer 105, and the rear-side coat layer 106.

As a representative method of the method of application by nozzles, which is one of the conventional methods, there is a die coat method (see, for example, Japanese Patent Publication No. 5-5548 (pages 3 to 11). Schematic diagrams of a coating device 160 used for the die coat method are shown in FIGS. 21 and 22.

FIG. 21 is a top view of the coating device viewed from a surface on a side from which a resin layer (equivalent to the ultraviolet-curing adhesive 107 in FIG. 19) is applied when the resin layer is applied over the disk substrate 101 having the first recording layer 102 formed thereon (hereinafter referred to as disk substrate with recording layer 121), which is mounted on a rotation table 159. FIG. 22 is a side sectional view of the coating device 160 viewed from an arrow A side in FIG. 21. As shown in FIGS. 21 and 22, in the die coat method, while a die 127 which discharges paint is rotated in an arrow direction relatively to the disk substrate with recording layer 121, which is a coating object, around a central axis 121a of the disk substrate with recording layer 121, resin is discharged from the die 127. This makes it possible to form a resin layer on the disk substrate with recording layer 121.

Diagrams of a conventional die used when a resin layer is coated by such a die coat method are shown in FIG. 23 to FIGS. 25A and 25B.

FIG. 23 is a perspective view of the conventional die 127. The die 127 is divided into an upper block 111 on an upper side and a lower block 112 on a lower side of the die 127 on the basis of an alternate long and short dash line BB' in FIG. 23. FIG. 24A is a perspective view of only the lower block of the conventional die. FIG. 24B is a plan view of the lower block viewed from a D side in FIG. 24A. FIG. 25A is a perspective view of a state in which the upper block and the lower block of the conventional die is intentionally separated vertically. FIG. 25B is a plan view of a discharge port viewed from an E side in FIG. 25A.

As shown in FIG. 23 to FIGS. 25A and 25B, the conventional die 127 includes the upper block 111 and the lower block 112. A shape of this lower block 112 is, as shown in FIG. 24A, substantially a trapezoidal prism. The lower block 112 is mounted such that trapezoidal surfaces 112a and 112b having an upper side longer than a lower side are arranged on sides. A manifold 113 is formed from one trapezoidal surface to the other trapezoidal surface in an upper surface 112c of the lower block 112. In addition, a paint supply path 110 is formed from a side 112d other than the trapezoidal surfaces 112a and 112b to the manifold 113 in the lower block 112. A surface opposed to this side 112d is assumed to be a side 112e. A rear lip 120 projecting from the side 112e is formed at an end on the side 112e side of the upper surface 112c. The shape of the lower block 112 being substantially a trapezoidal prism means that the shape of the lower block 112 is in a range recognized as a trapezoidal prism under the commonly accepted idea.

As shown in FIGS. 23 and 25A, a shape of the upper block 111 is also a trapezoidal prism substantially the same as the shape of the lower block 112. However, the manifold and the paint supply path 110 are not formed in the upper block 111. This upper block 111 is mounted on the lower block 112 such that an upper surface and a lower surface thereof are opposite compared with those of the lower block 112. A front lip 119 is formed in a portion of the upper block 111 opposed to the rear lip 120 of the lower block 112.

Between the lower surface of the upper block 111 and the upper surface of the lower block 112, a slit 114 is formed from the position of the manifold 113 to the position of the rear lip 120. This slit 114 is formed from the trapezoidal surface 112a side to the trapezoidal surface 112b side (see FIG. 25A). A portion between the front lip 119 and the rear lip 120, which is a part of this slit 114, forms a discharge port 118. Width 117 of this discharge port 118 from the trapezoidal surface 112a to the trapezoidal surface 112b is coating width in which paint is applied. Although not shown in the figure, sidewalls are formed on the trapezoidal surfaces (including the surfaces 112a and 112b) shown in FIG. 23 such that the paint does not leak from ends of the manifold 113 and the slit 114.

In the conventional die having the structure shown in FIG. 23, a resin liquid supplied from the paint supply path 110 is spread and distributed in the width 117 direction by the manifold 113, passes through the slit 114 formed between the upper block 111 and the lower block 112, and is discharged from the discharge port 118.

In the coating device 160 shown in FIGS. 21 and 22, the die 127 is arranged such that the discharge port 118 is opposed to the plane of the disk substrate with recording layer 121. An area on which the resin is applied is denoted by reference numeral 150, an outer peripheral side end of the area 150 is denoted by reference sign 150a, an inner peripheral side end thereof is denoted by reference sign 150b, and width thereof is denoted by reference sign 150h. A position of the discharge port 118 of the die 127 corresponding to the outer peripheral side end 150a is assumed to be an outer peripheral side end 118a and a position thereof corresponding to an end on the inner peripheral side of the area 150 is assumed to be an inner peripheral side end 118b. Length of the width 117 is equivalent to the width 150h of the area 150 on which the resin is applied (see FIG. 23 to FIGS. 25A and 25B).

In order to apply the resin over a disk-like coating object at uniform thickness with the method shown in FIGS. 21 and 22, since peripheral speed at the time when the coating object rotates is higher on an outer peripheral side than on an inner peripheral side of the coating object, it is necessary to discharge a larger quantity of resin at the outer peripheral side end 118a compared with the inner peripheral side end 118b of the coating object in a coating width direction according to the peripheral speed. When a resin layer having a coating width of 40 mm is formed on a disk having a diameter 120 mm, which is the present standard of optical disks, a discharge quantity three times as large as that at the inner peripheral side end 118b is required at the outer peripheral side end 118a.

Moreover, the discharge quantity is affected by a pressure loss in the slit portion and a pressure loss $\Delta Ps$ is in a proportional relation with a slit length 116 (Ls) ($\Delta Ps \propto Ls$). Thus, in order to increase the discharge quantity, the pressure loss $\Delta Ps$ only has to be reduced, that is, the slit length 116 (Ls) only has to be reduced.

Thus, when a difference is caused in the discharge quantity in the coating width direction, a slit length in a portion where it is desired to set the discharge quantity smallest only has to be set largest and a slit length in a portion where it is desired to set the discharge quantity largest only has to be set smallest.

Therefore, in the structure of the conventional die, as shown in FIG. 21, the slit length 116 (Lsb) at the inner peripheral side end 118b is larger than the slit length 116 (Lsa) at the outer peripheral side end 118a of the coating object. The slit length 116 (Ls) increases from the outer peripheral side end toward the inner peripheral side end. A difference is caused in resistance against flow of the resin in the width 117 direction by this structure to discharge a larger quantity of the resin at the outer peripheral side end compared with the inner peripheral side end of the coating object.

A slit gap 115 (hs) of the conventional die is set to be identical in any position in the width 117 direction in the area of the width 117 as shown in FIGS. 25A and 25B.

The method of forming a resin layer by the die coat method has been described. However, when the spin coat method of dropping resin on a disk substrate and, then, rotating a disk to spread the resin over the surface of the disk and obtain a film is used, it is also possible to form a resin layer. When the sheet sticking method is used, it is possible to form a resin layer by transferring a resin film formed as a sheet instead of applying resin.

SUMMARY OF THE INVENTION

As described above, conventionally, the intermediate layer 103, which is interposed between the first recording layer 102 and the second recording layer 104, is formed by sticking the ultraviolet-curing resin 109 on the adhesive 107 of the disk substrate 101. It is necessary to form the respective layers forming the optical disk such as the intermediate layer 103 as well as the cover layer 105 and the rear-side coat layer 106 with smaller thickness, with more uniform film quality and film thickness in a plane, and at lower cost compared with those in the past.

A discharge quantity distribution in the coating width direction in the case in which the conventional die is used is shown in FIG. 26. In the conventional die, in order to form a resin layer having desired thickness of 20 μm smaller than that in the past in the intermediate layer 103, the cover layer 105, the rear-side coat layer 106, and the like, as a difference of the slit length, the slit length 116 at the inner peripheral side end 118b is set to be four times as large as that at the outer peripheral side end 118a in the width 117 direction (in FIGS. 24A and 24B, Lsa=20 mm and Lsb=80 mm and, in FIGS. 25A and 25B, hs=100 μm).

In order to apply the resin over the disk-like coating object such as the disk substrate 101 at uniform thickness, as described above, peripheral speed at the time when the coating object rotates is higher on the outer peripheral side than on the inner peripheral side of a coating object. Therefore, it is necessary to discharge a larger quantity of resin from the die at the outer peripheral side end 150a compared with the inner peripheral side end 150b of the coating object in the width 150h direction according to the peripheral speed (see FIG. 21).

In a section between the inner peripheral side end 150b and the outer peripheral side end 150a, it is necessary that a discharge quantity linearly increases from the inner peripheral side end 150b toward the outer peripheral side end 150a of the coating width 150h of the disk (equivalent to a target discharge quantity distribution in FIG. 26).

When a resin layer having an coating width of 40 mm is formed on the disk having a diameter of 120 mm, which is the present standard of optical disks, as indicated by a broken line in FIG. 26, a discharge quantity three times as large as that at the inner peripheral side end 150b is required at the outer peripheral side end 150a (when a discharge quantity at the inner peripheral side end is 100%, 300% is required at the outer peripheral side end).

However, as indicated by a solid line in FIG. 26, in the conventional die in which, as a difference of slit length, the slit length 16 at the inner peripheral side end 118b is set four times as large as that at the outer peripheral side end 118a in the width 117 direction, it is impossible to realize the difference of a discharge quantity of three times in the width 117 direction (the coating width 150h direction). For measurement of a discharge quantity, a container provided with thin partitions at intervals of 2 mm and the die are arranged to be opposed to each other such that the partitions divide the discharge port 118 of the die at the intervals of 2 mm in the width 117 direction. In this state, after discharging the resin from the conventional die for thirty seconds, a discharge quantity distribution in the width 117 direction is measured by measuring weight of the resin accumulated inside the respective partitions.

In order to further increase the difference of a discharge quantity in the coating width direction, it is conceivable to further increase a difference of the slit length 16 at both the ends in the coating width direction (a difference between Lsa and Lsb). However, in the die coat method, it is necessary to apply the resin while maintaining a liquid pressure in the manifold 113 at a fixed pressure or more in order to improve uniformity of the discharge quantity in the discharge width 117 direction. Since this liquid pressure is proportional to length of the slit length 116, it is necessary to secure length equal to or larger than fixed length as the slit length 116. Therefore, there is a limit in reducing the length of Lsa and it is necessary to increase the length of Lsb in order to increase the difference between Lsa and Lsb. As a result, a body of the die 127 becomes extremely large and cost increases because of an increase in size of the device.

When an extreme difference occurs in the slit length 116 in the width 117 direction, a problem occurs in that response to intermittent operations in the beginning and the end of the application of the resin becomes non-uniform in the width 117 direction and an application shape at the ends is disordered.

Results of evaluation of thickness fluctuation and cost in the case in which a resin layer having desired thickness of 20 μm smaller than that in the past was formed using the ultraviolet-curing resin 109 by the die coat method in which the conventional die was used, the spin coat method, and the sheet sticking method are shown below (Table 1). Although the results obtained by using the ultraviolet-curing resin 109 are shown in the table, the same results are obtained when the ultraviolet-curing adhesive 107 is used. As the conventional die, a die in which a difference of the slit length 16 at both the ends in the coating width direction was set to four times (in FIG. 21, Lsa=20 mm and Lsb=80 mm) was used.

TABLE 1

| | Resin layer having thickness of 20 μm | | |
| | Conventional methods | | |
| | Die coat | Spin coat | Sheet sticking method |
|---|---|---|---|
| In-plane thickness fluctuation R (%) | 49 | 2 | 1.8 |
| In-plane thickness fluctuation judgment (non-defective product standard: R5% or less) | X | ○ | ○ |
| Cost | Large: X | Large: X | Extremely large: XX |

From Table 1, in the application by the die coat method in which the conventional die is used, although cost is small, the desired discharge quantity distribution cannot be realized as described above. Thus, the in-plane thickness fluctuation is extremely large and it is impossible to obtain a non-defective product which meets the standard.

On the other hand, in the spin coat method, although swell 153 of the resin is formed at the outer peripheral end as shown in FIG. 27 by a centrifugal force and a surface tension, it is possible to form a resin layer with thickness fluctuation which meets the standard. However, when the resin is dropped on the first recording layer 102 formed on the disk substrate 101 (hereinafter also referred to as disk substrate with recording layer 121) and, then, the disk is rotated to spread the resin over the surface of the disk and obtain a film, a large quantity of resin dropped scatters from the surface of the disk. Thus, there is a problem in that material cost increases. Therefore, thickness fluctuation increases when it is attempted to perform spin coat at a low number of revolutions to prevent the resin from being scattered.

Collection and reuse of scattered resin are considered. However, since entrance of bubbles in the resin, inclusion of dust, a change in resin viscosity, and the like occur, it is extremely difficult to realize stable application of the resin.

FIG. 28A is a diagram showing a state before the disk substrate with recording layer 121 and the stamper 108, to which the adhesive 107 and the ultraviolet-curing resin 109 are applied by the spin coat method, respectively, are stuck together. FIG. 28B is a diagram showing a state at the time when the disk substrate with recording layer 121 and the stamper 108 are stuck together and the adhesive 107 and the ultraviolet-curing resin 109 are hardened. FIG. 28C is a diagram showing a state after the stamper 8 is peeled off.

As shown in FIGS. 28A to 28C, when the disk substrate with recording layer 121 and the stamper 108, on which the adhesive 107 and the ultraviolet-curing resin 109 are applied by the spin coat method, respectively, are stuck together and peeled off, in the spin coat method, the adhesive 107 and the ultraviolet-curing resin 109 are applied to the outer peripheral ends of the disk substrate 101 and the stamper, respectively. Thus, the resin overflows to the outer peripheral end surface of the stamper at the time when the disk substrate with recording layer 121 and the stamper 108 are stuck together and the adhesive 107 and the ultraviolet-curing resin 109 are hardened. The overflowing resin remains adhering to the outer peripheral end surface of the stamper even after the disk substrate with recording layer 121 and the stamper 108 are peeled off (equivalent to resin 122 shown in FIG. 28C). Since the resin 122 adhering to the outer peripheral end surfaces of the stamper causes dust, the stamper 108 used once cannot be reused and is disposable, resulting in an extreme increase in cost.

As shown in Table 1, in the sheet sticking method, it is also possible to form a resin layer with thickness fluctuation which meets the standard. In the sheet sticking method, there is no scattering of the resin liquid and a relatively stable resin film is obtained. However, since cost per one sheet is high, it is difficult to provide an inexpensive optical disk. Moreover, there is also a problem in that a cover film which protects a resin film at the time of manufacturing of a sheet and a support base material on which the resin film is applied at the time of manufacturing of a sheet are discarded as a large quantity of wastes after lamination on a disk and cost for the disposal is extremely large.

A four-layer optical disk having four recording layers (three layers in an intermediate layer) shown in FIG. 29 is assumed. This four-layer optical disk has a first recording layer 102, a second recording layer 104, a third recording layer 124, and a fourth recording layer 126 and has intermediate layers 103, 123, and 125 among the respective recording layers. Films formed by stacking three resin layers (having average thickness of 20 μm) shown in FIG. 30 were formed by the die coat method in which the conventional die was used, the spin coat method, and the sheet transfer method, respectively, using the ultraviolet-curing resin 109 such that the resin layers had the same conditions as the intermediate layers in the above-mentioned structure. Thickness fluctuation of the resin layers was measured.

Results of the thickness fluctuation and results of evaluation of cost are shown in Table 2. Although results obtained by using the ultraviolet-curing resin 109 are shown in the table, the same results are obtained when the ultraviolet-curing adhesive 107 is used.

TABLE 2

| Resin layer having thickness of 60 μm (20 μm × 3 layers) | | | |
|---|---|---|---|
| | Conventional methods | | |
| | Die coat | Spin coat | Sheet sticking method |
| In-plane thickness fluctuation R (%) | Over 50 | 7 | 5 |
| In-plane thickness fluctuation judgment (non-defective product standard: R5% or less) | X | X | ○ |
| Cost | Large: X | Large: X | Extremely large: XX |

From the results in Table 2, in the die coat method in which the conventional die is used, a discharge quantity distribution in a desired coating width direction cannot be realized as described above. Thus, the in-plane thickness fluctuation of the multilayered intermediate layers exceeds R50%. Formation of intermediate layers with small thickness and small thickness fluctuation in a coated surface, with which it is possible to realize a four-layer optical disk, cannot be realized.

In the spin coat method, as a single layer, it is possible to form a resin layer with thickness fluctuation which meets the standard as shown in Table 1. However, when resin layers are multilayered, thickness fluctuation due to the swell 153 at outer peripheral ends in the respective layers is accumulated. When three layers are stacked, thickness fluctuation of the three layers is larger than the desired standard, resulting in a defective product. Thus, in the spin coat method, it is also difficult to form highly accurate intermediate layers, with which it is possible to realize a four-layer optical disk.

In the sheet sticking method, although thickness fluctuation which meets the standard is obtained even when three layers are multilayered, it is necessary to manufacture a more highly accurate sheet compared with the case of the single layer. Thus, cost per one sheet further increases and disposal cost for wastes is enormous, resulting in a large problem.

Taking the conventional problems into account, it is an object of the present invention to manufacture a layer having more uniform thickness distribution or provide a die which can be manufactured at lower cost, a method of manufacturing an optical disk using the die, and an optical disk.

To achieve the above object, the 1st aspect of the present invention is a die in which an upper block is placed on an upper surface of a lower block with a lower surface of the upper block in contact with the upper surface, wherein the lower block includes a manifold and a slit serving as a path for discharging paint from the manifold to the outside, constituted respectively from between the lower block and the lower surface of the upper block by forming a cavity and a space which communicates with the outside from this cavity along a columnar direction, respectively, from one end face of a columnar body to the other end face, a paint supply path which communicates with the manifold is formed from an outer side located between the one end face and the other end face of the lower block, a slit space dimension of the slit between front end portions in a paint discharge direction of the lower block and the upper block in a discharge port serving as an open end to the outside is smallest on the one end face side and increases toward the other end face side, and a slit length which is a dimension along the paint discharge direction of a space forming surface of the lower block constituting the slit is largest on at least one of the one end face side and the other end face side and is smallest in a position between both the end faces.

Further, the 2nd aspect of the present invention is the die according to the first aspect of the present invention, wherein the slit length monotonously increases from a position where a slit length of the lower block is smallest toward the one end face position and the other end face position.

Further, the 3rd aspect of the present invention is the die according to the the 2nd aspect of the present invention, wherein the position where the slit length is smallest is a center position between the one end face and the other end face.

The 4th aspect of the present invention is the die according to the 3rd aspect of the present invention, wherein a ratio of smallest length and largest length is 3:5 in a space dimension of the slit, the slit length is identical in the one end face position and the other end face position, and a ratio of smallest length and largest length is 3:4 in the slit length.

The 5th aspect of the present invention is a method of manufacturing an optical disk including a coating step of applying resin over a disk-like coating object using the die according to the 1st aspect of the present invention.

The 6th aspect of the present invention is the method of manufacturing an optical disk according to the 5th aspect of the present invention, further comprising an oscillation step of giving oscillation to the resin applied.

The 7th aspect of the present invention is the method of manufacturing an optical disk according to the 5th aspect of the present invention, wherein the coating step is a step of arranging, with a center axis of the disk-like coating object as a reference, the die such that a shorter end of the space dimension of the slit is closer to the center axis than a longer end of the space dimension of the slit and a distance from the coating object to the discharge port is fixed, rotationally moving the die relatively around the center axis with the coating object as a reference, and applying the resin over the coating object.

The 8th aspect of the present invention is the method of manufacturing an optical disk according to the 7th aspect of the present invention, wherein the distance from the coating object to the discharge port is substantially identical with thickness of a film which should be formed.

The 9th aspect of the present invention is an optical disk manufactured using the die according to the 1st aspect of the present invention, wherein a difference between a rotation radius Rd of the optical disk and a radius R of applied resin is equal to or larger than 0.2 mm and equal to or smaller than 0.5 mm.

The 10th aspect of the present invention is the optical disk according to the 9th aspect of the present invention, wherein thickness of the applied resin is equal to or larger than 5 μm and equal to or smaller than 200 μm.

According to the present invention, it is possible to manufacture a layer having more uniform thickness distribution or provide a die which can be manufactured at lower cost, a method of manufacturing an optical disk using the die, and an optical disk.

BRIEF DESCRIPTION OF THE DRAWINGS

FIGS. 2A to 2G are sectional views showing steps for manufacturing the blu-ray disk in the first embodiment according to the present invention;

FIG. 17B is a main part enlarged view of the coating device in the second embodiment according to the present invention;

FIG. 17C is a plan view showing a shape of a discharge port of the coating device in the second embodiment according to the present invention;

FIGS. 18A to 18C are diagrams for explaining a coating device in a third embodiment according to the present invention;

FIGS. 20A to 20G are step sectional views showing a manufacturing flow for manufacturing the conventional one-side two-layer disk;

FIG. 24B is a plan view of the lower block of the conventional die;

FIG. 25B is a plan view of a discharge port viewed from an E side in FIG. 25A;

FIGS. 28A to 28C are diagrams for explaining stamper adhering resin after peeling of the stamper according to the conventional spin coat method;

DESCRIPTION OF SYMBOLS

Figure 1:
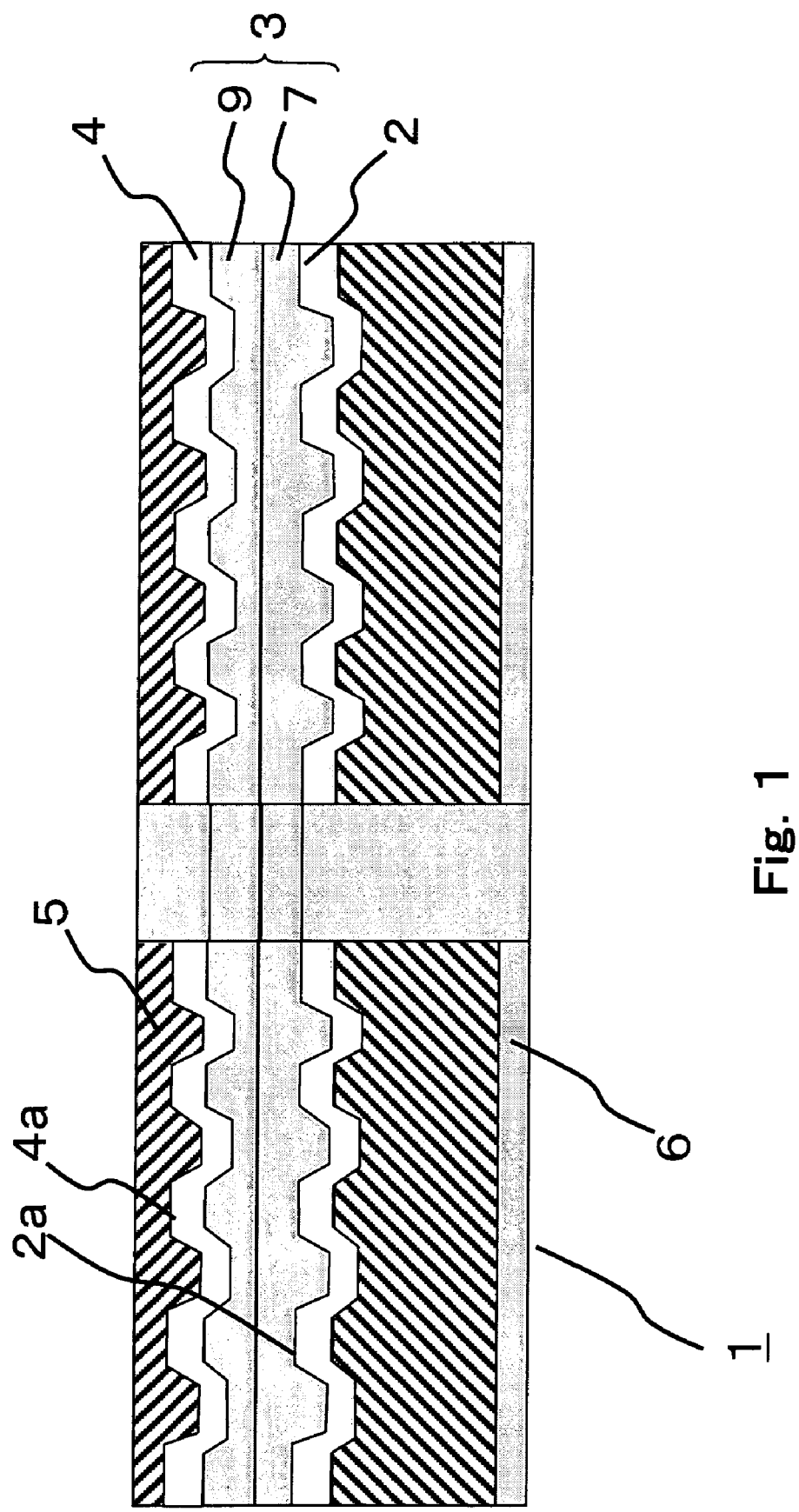
FIG. 1 is a sectional view of a structure of a blu-ray disk in a first embodiment according to the present invention.

10 Paint injection path
11 Upper block
12 Lower block
13 Manifold
14 Slit
15 Slit gap (hs)
16 Slit length (Ls)
17 Width
18 Discharge port
19 Front lip
20 Rear lip 21 Disk substrate with recording layer
27 Die
28 Rotation table
29 Length in height direction of a die

PREFERRED EMBODIMENTS OF THE INVENTION

Embodiments of the present invention will be hereinafter explained with reference to the drawings.

First Embodiment

A coating device in a first embodiment according to the present invention will be explained and an example of a die of the present invention will be simultaneously explained.

First, a structure of a blu-ray disk, which is an example of an optical disk of the present invention manufactured by using the coating device in the first embodiment, will be explained.

Figure 19:
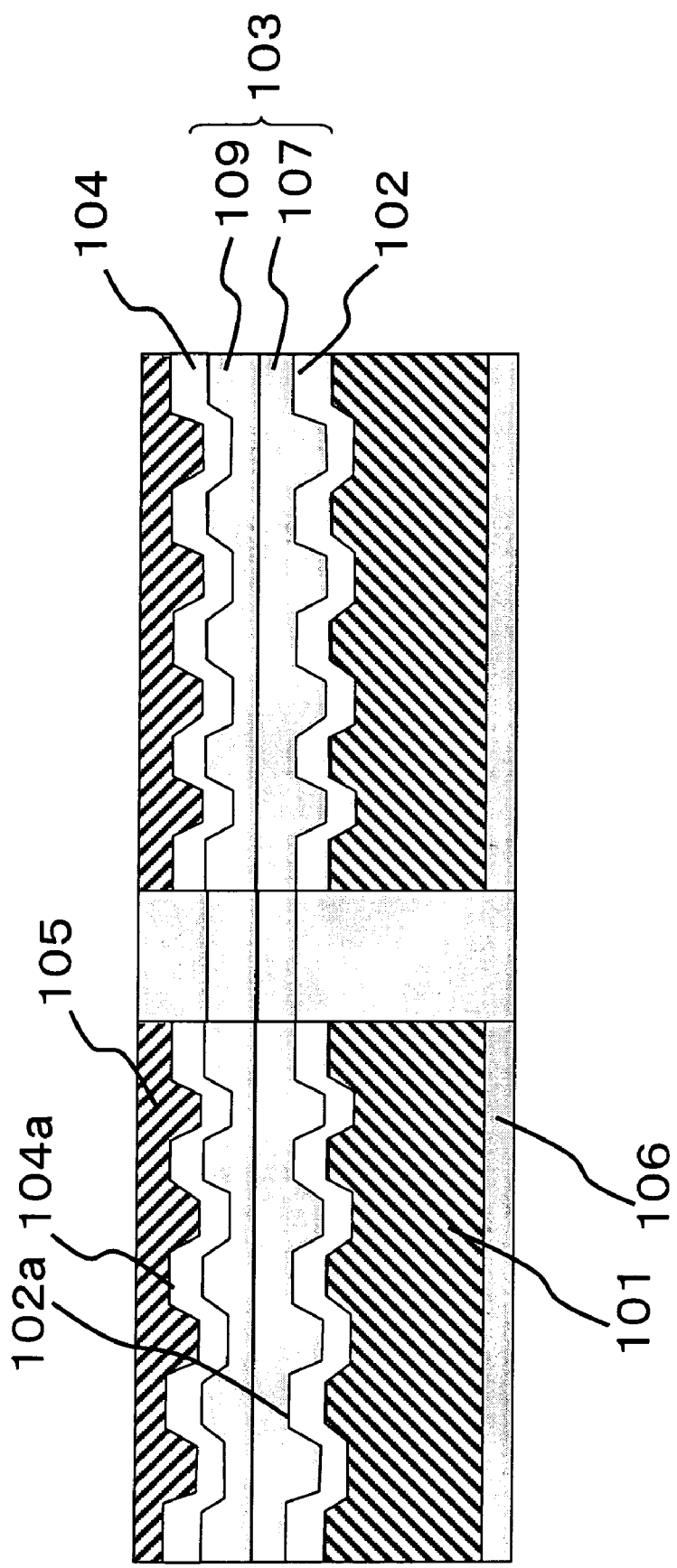
FIG. 19 is a sectional view showing a structure of a conventional one-side two-layer disk.
Figure 21:
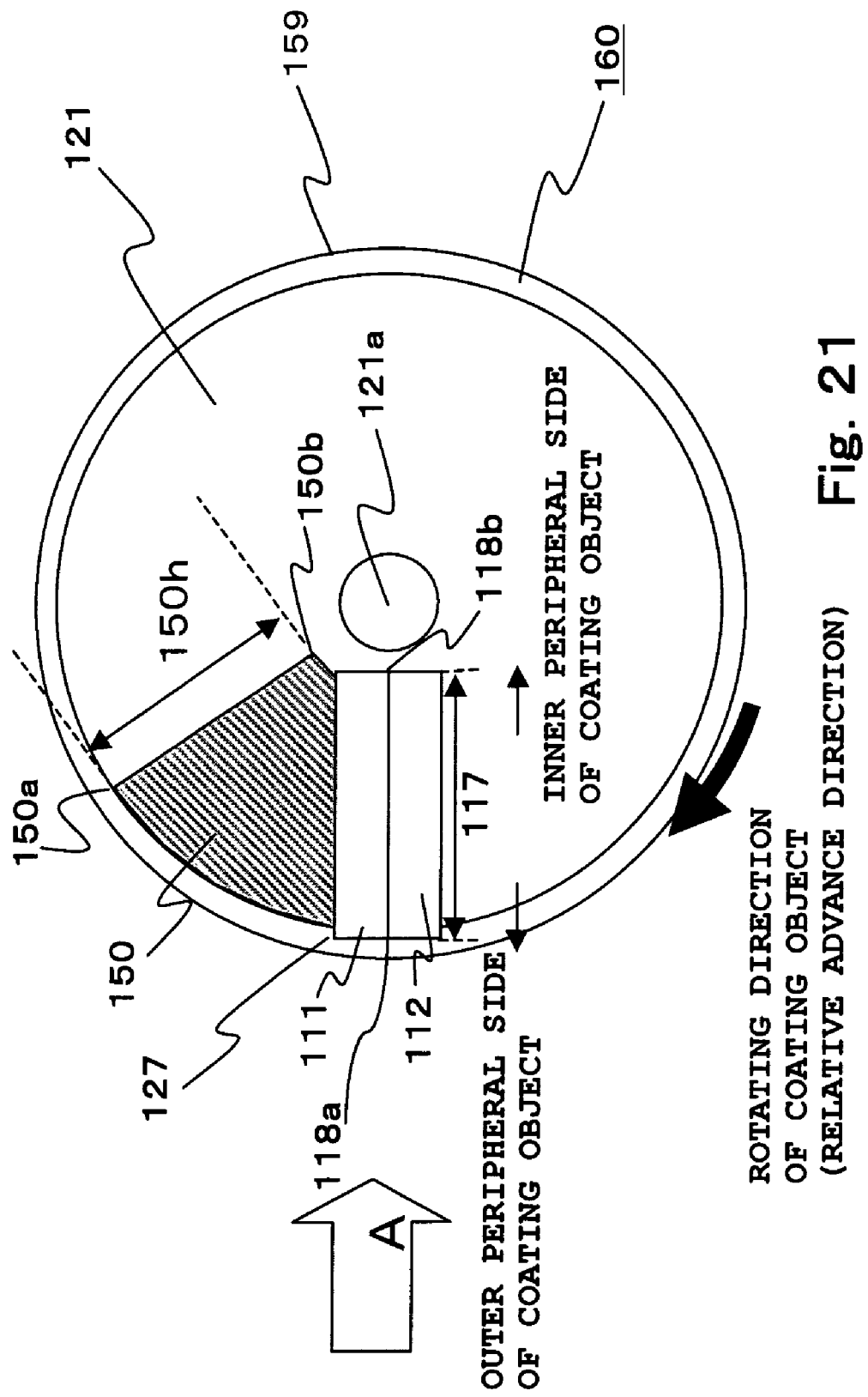
FIG. 21 is a top view of a conventional coating device.
Figure 22:
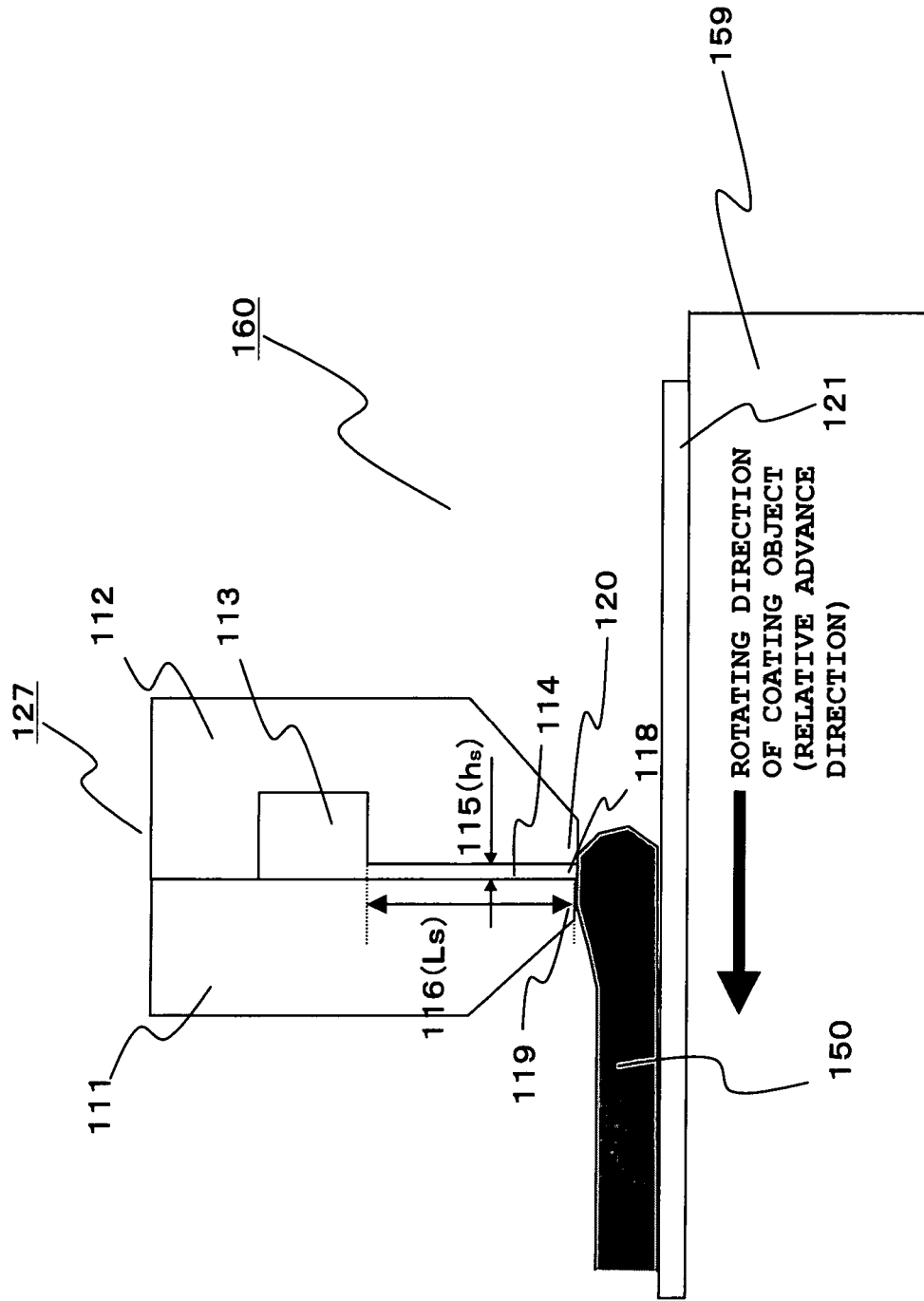
FIG. 22 is a front view of the conventional coating device.
Figure 23:
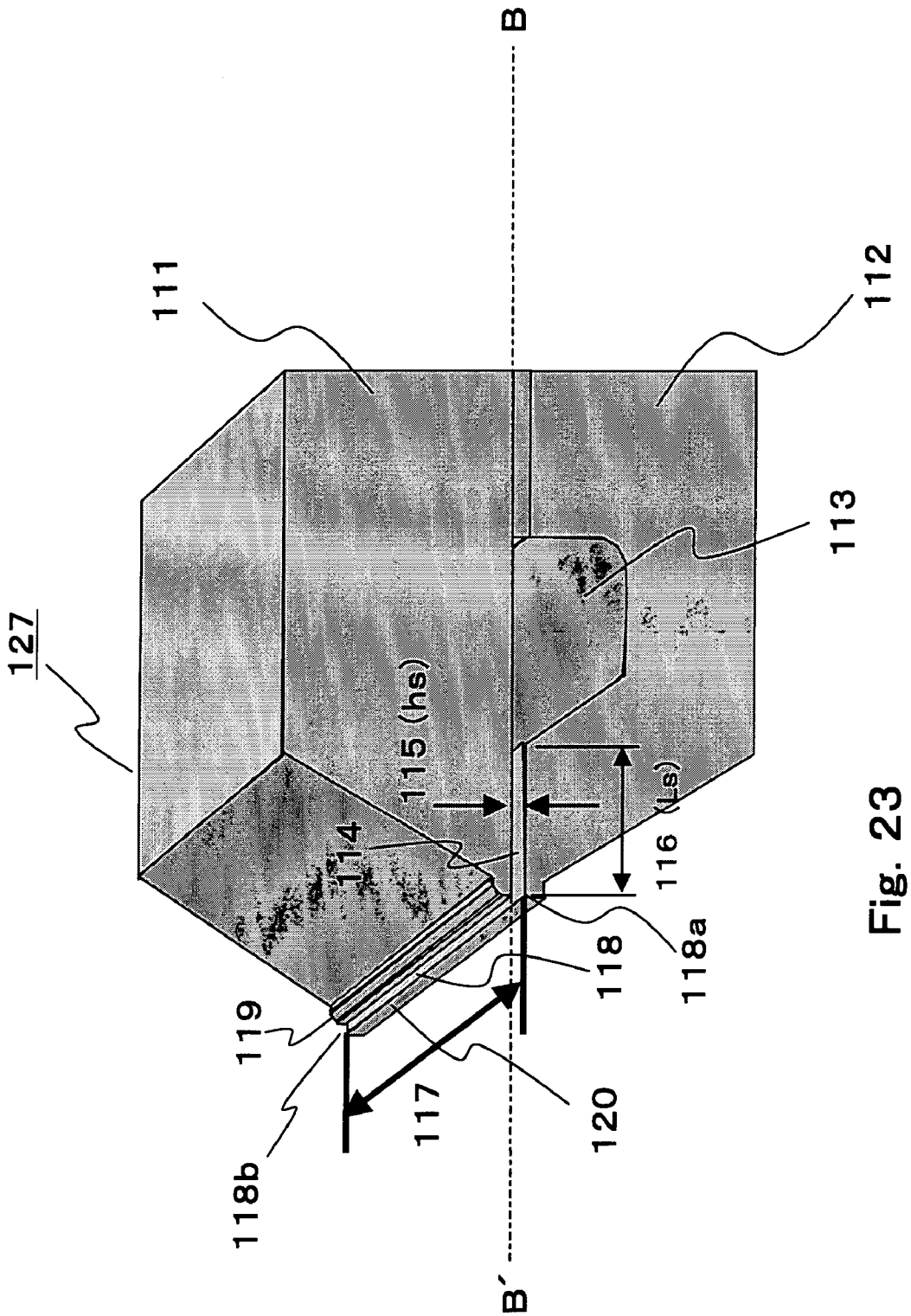
FIG. 23 is a perspective view of a conventional die.
Figure 24A:
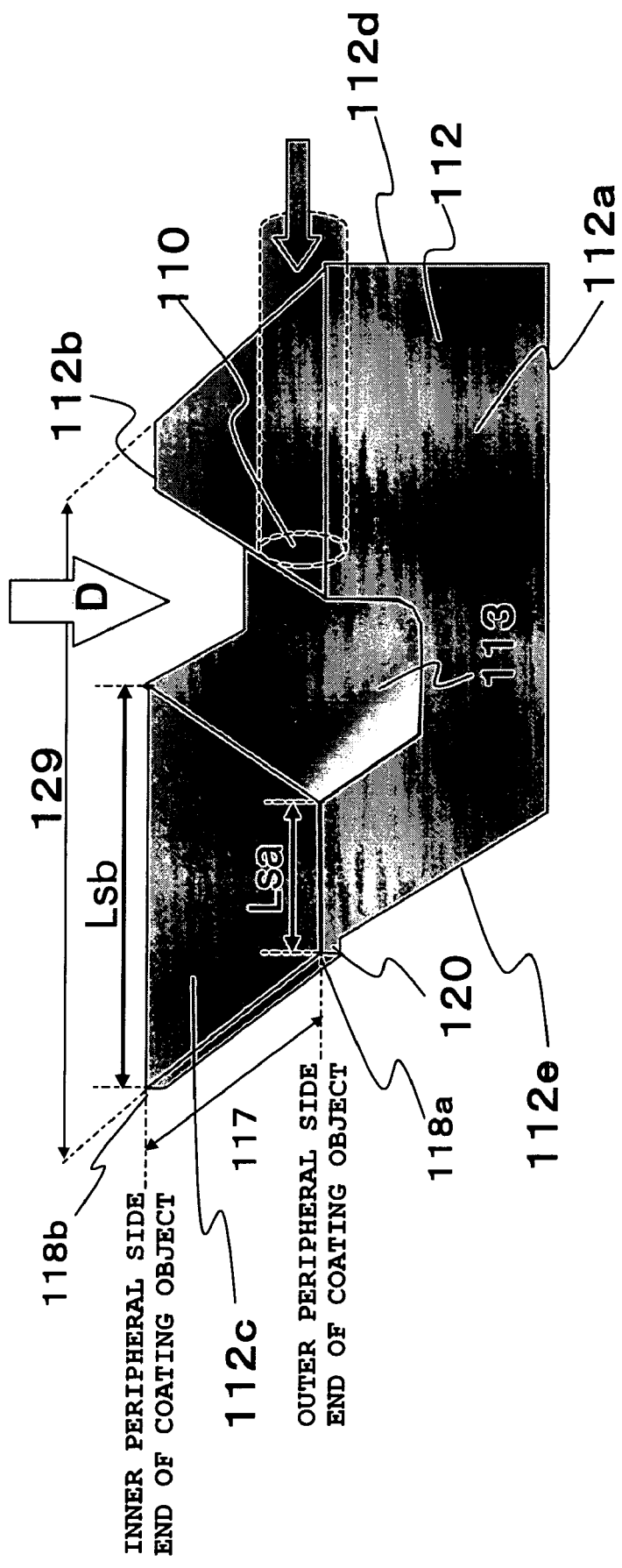
FIG. 24A is a perspective view of a lower block of the conventional die.
Figure 25A:
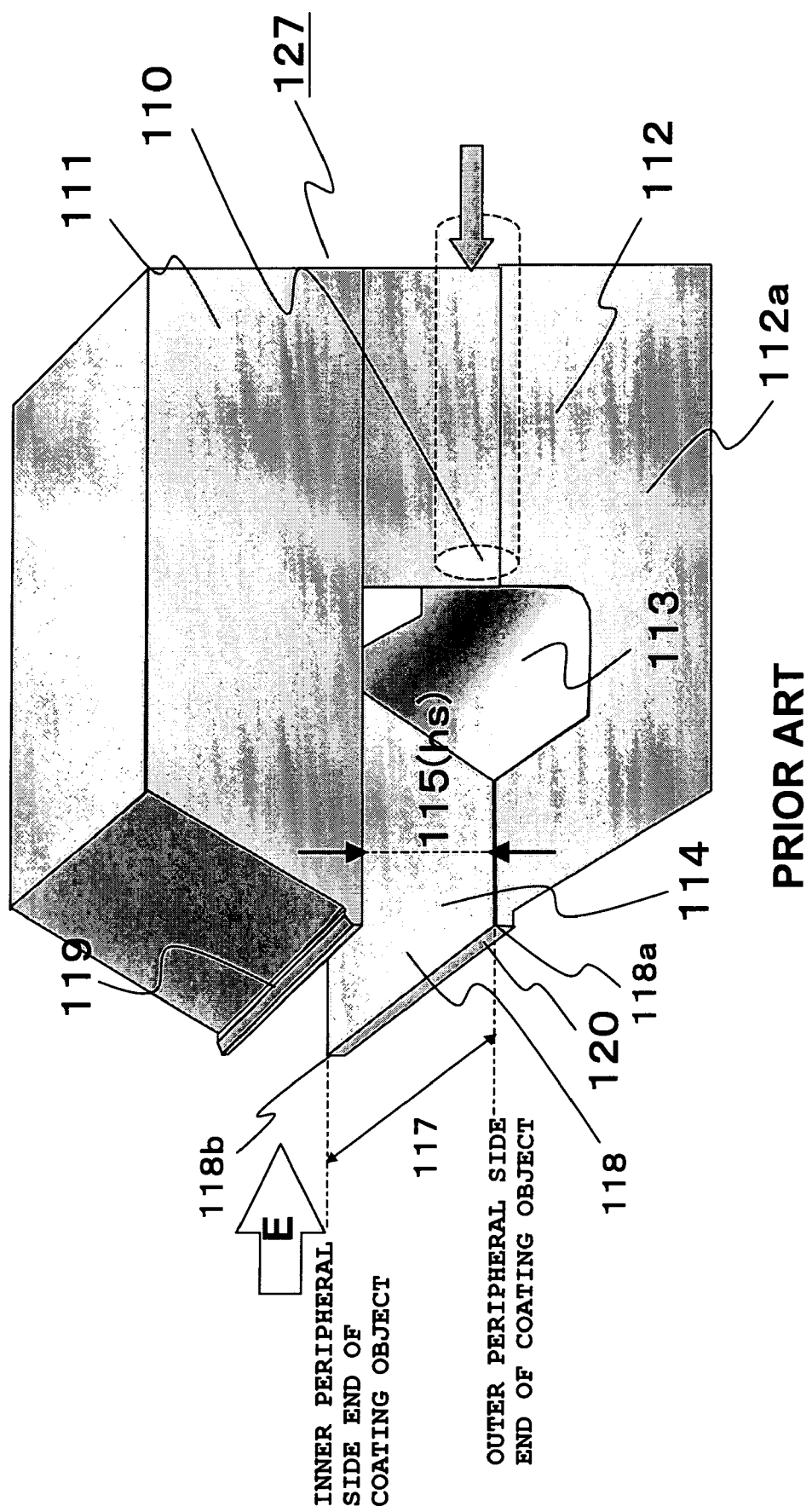
FIG. 25A is a perspective view in which a slit gap of the conventional die is expanded for explanation.

The blu-ray disk uses a blue laser having a wavelength of about 405 nm for reading and writing. This blu-ray disk is a two-layer disk. FIG. 1 is a diagram of the blu-ray disk. This blu-ray disk has the same structure as the two-layer disk explained with reference to FIG. 19 earlier.

As shown in FIG. 1, in the blu-ray disk, a first recording layer 2 having a recording track 2a is formed on a disk substrate 1. A second recording layer 4 having a recording track 4a is formed on the first recording layer 2 via an intermediate layer 3. A cover layer 5 which covers the second recording layer 4 is formed. A rear-side coat layer 6 is formed on a rear surface of the disk substrate 1. A light beam is irradiated from the cover layer 5 side to perform recording and reproduction or only reproduction of information in the first and the second recording layers 2 and 4. The intermediate layer 3 is formed of an ultraviolet-curing adhesive 7 (hereinafter referred to as adhesive 7) and ultraviolet-curing resin 9.

A method of manufacturing a blu-ray disk, which is an example of the method of manufacturing an optical disk of the present invention, will be explained.

Figure 3:
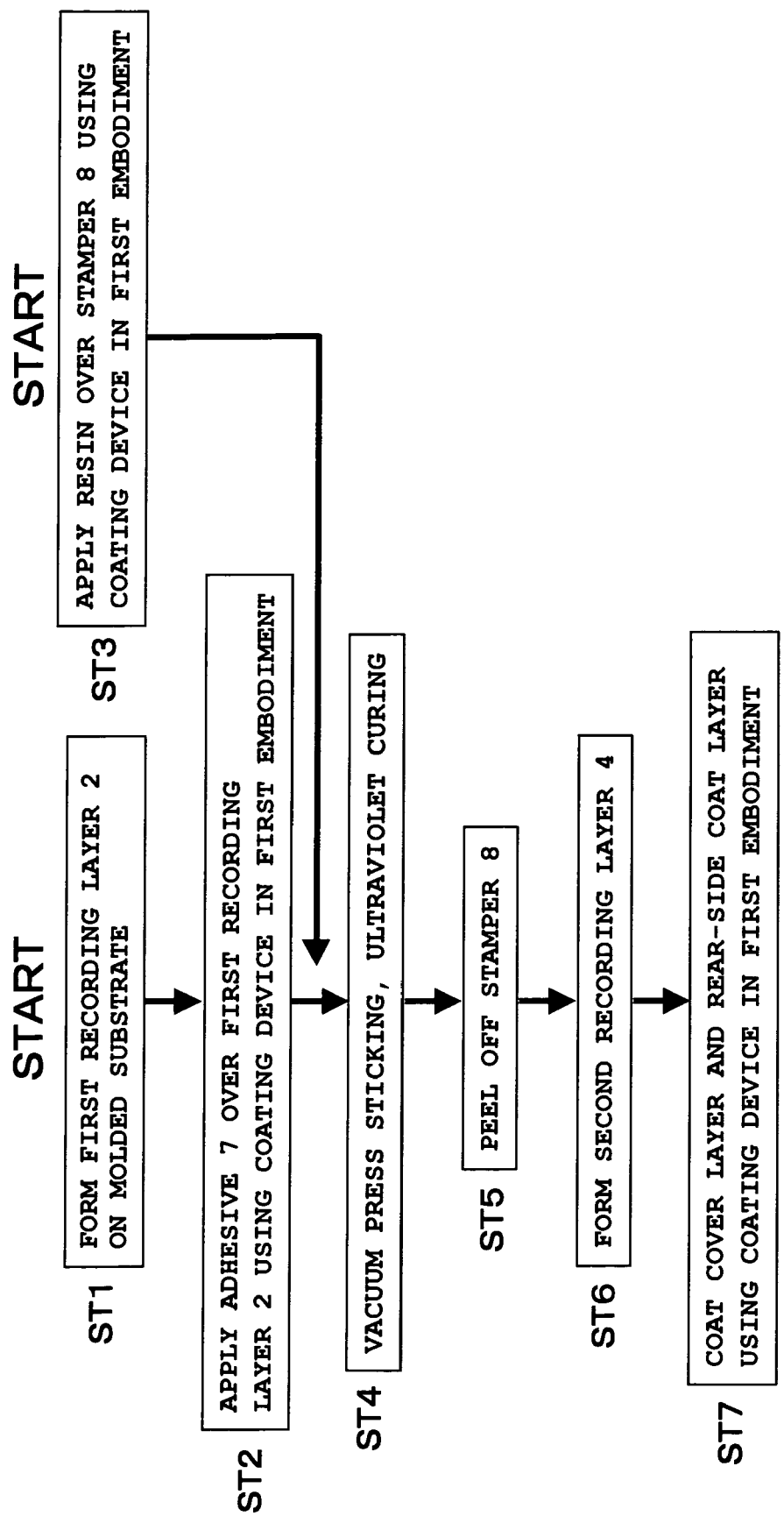
FIG. 3 is a flowchart showing the steps for manufacturing the blu-ray disk in the first embodiment according to the present invention.

FIGS. 2A to 2G are diagrams showing the method of manufacturing a blu-ray disk. FIG. 3 is a flowchart of the method. The method of manufacturing a blu-ray disk is basically the same as the conventional method.

As shown in FIG. 2A, the first recording layer 2 is formed on the disk substrate 1, on which a pattern of the recording track 2a is formed, by the sputtering method (ST1 in FIG. 3). As an example of the disk substrate 1, it is possible to cite a disk substrate having thickness of 1.1 mm and a diameter of 120 mm, which is formed using polycarbonate as a material.

As shown in FIG. 2B, the adhesive 7 is applied over this first recording layer 2 by the coating device in the first embodiment (ST2). This step ST2 corresponds to an example of a coating step of the present invention. As described in detail later, the coating device in the first embodiment which applies the adhesive 7 is a coating device 80 shown in FIG. 4 described later. As a die 27 used in this coating device 80, a die shown in FIG. 5 to FIG. 7A and 7B described later is used.

As a material of the first recording layer 2, it is possible to use Ag—In—Sb—Te—Ge, a cyanine organic coloring matter, or the like. Thickness of the first recording layer 2 is equal to or smaller than 1 µm. It is also possible to set height of irregularity of the recording track 2a to be equal to or smaller than 1 µm. Moreover, as an example of a material of the adhesive 7, it is possible to cite acrylic resin.

In parallel to these steps, over the stamper 8 on which a pattern of the recording track 4a is formed as shown in FIG. 2C, the ultraviolet-curing resin 9 is applied by the coating device in the first embodiment as shown in FIG. 2D (ST3). This step ST3 corresponds to an example of the coating step of the present invention. As an example of a material of the stamper 8, it is possible to use acrylic resin such as PMMA or eonor. Height of irregularity formed in the stamper 8 is equal to or smaller than 1 µm. As an example of the ultraviolet-curing resin 9, it is possible to cite acrylic resin.

As shown in FIG. 2E, the disk substrate 1 and the stamper 8 are stuck together and pressed with coated surfaces thereof opposed to each other under vacuum. In that state, an ultraviolet ray is irradiated to harden the adhesive 7 and the ultraviolet-curing resin 9, whereby the intermediate layer 3 is formed (ST4). The disk substrate 1 and the stamper 8 are stuck together under vacuum in order to remove air bubbles generated in the adhesive 7 and the ultraviolet-curing resin 9 and prevent the air bubbles from remaining in, in particular, a stuck surface (an interface between the adhesive 7 and the ultraviolet-curing resin 9).

Subsequently, when the adhesive 7 and the ultraviolet-curing resin 9 are hardened entirely, as shown in FIG. 2F, the stamper 8 is peeled off (ST5).

Thereafter, as shown in FIG. 2G, the second recording layer 4 is formed on the intermediate layer 3 onto which the pattern of the stamper 8 is transferred (ST6). As a material of the second recording layer 4, it is possible to use Ag—In—Sb—Te—Ge, a cyanine organic coloring matter, or the like. Thickness of the first recording layer 2 is equal to or smaller than 1 µm. It is possible to set height of irregularity of the recording track 2a to be equal to or smaller than 1 µm.

Finally, the cover layer 5 is formed on the second recording layer 4 by applying resin over the second recording layer 4 with the coating device in the first embodiment. The rear-side coat layer 6 is formed on the rear surface of the disk substrate 1 by applying resin over the rear surface with the coating device in the first embodiment (ST7). This step ST7 corresponds to an example of the coating step of the present invention. As an example of a material of the cover layer 5, it is possible to use polycarbonate. As a material of the rear-side coat layer 6, it is possible to use acrylic resin.

The coating device in the first embodiment which applies each of the materials in order to form any one of the adhesive 7, the ultraviolet-curing resin 9, the cover layer 5, and the rear-side coat layer 6 will be explained. In the following explanation, the step ST2 for applying the adhesive 7 over the second recording layer 4 is explained as an example (see FIG. 3).

Figure 4:
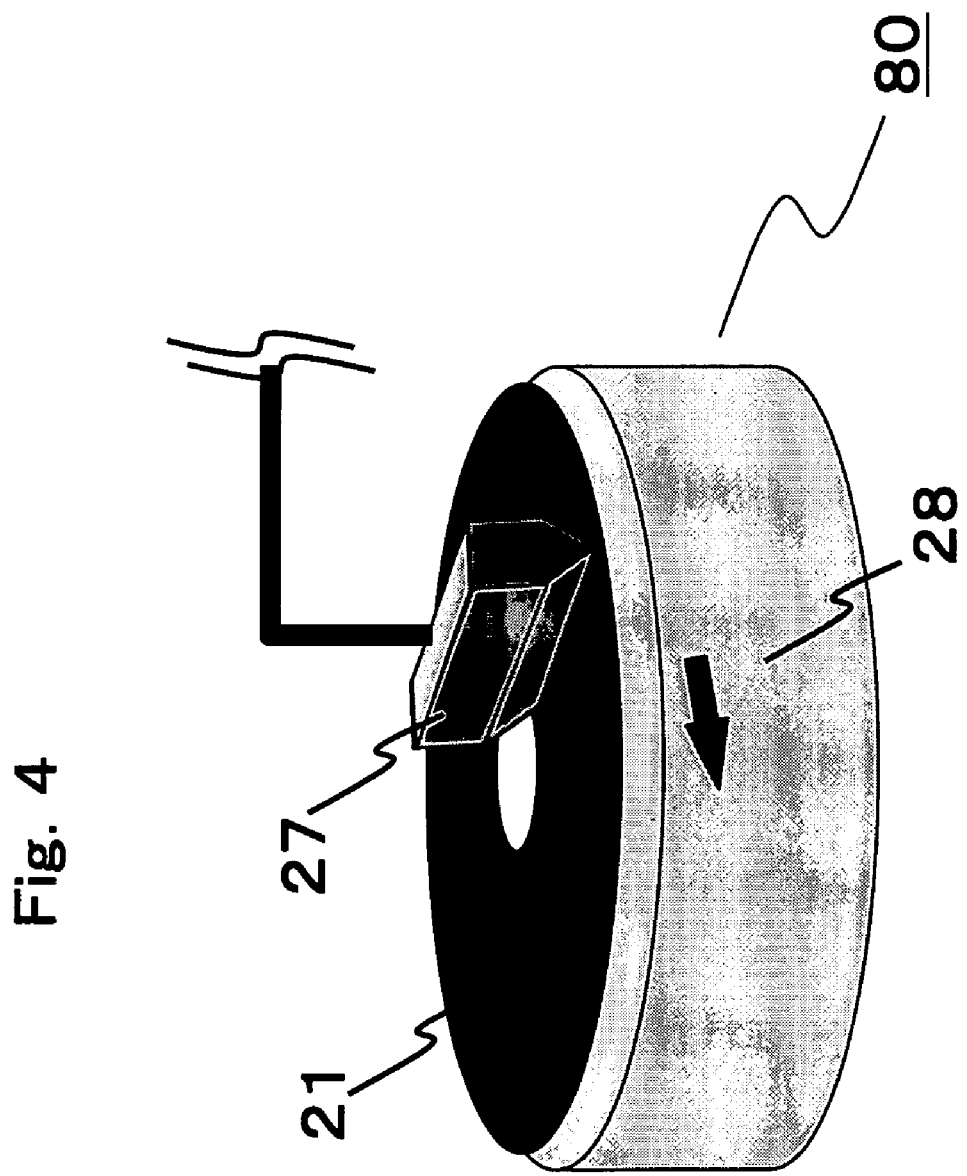
FIG. 4 is a schematic diagram of a coating device in the first embodiment of the present invention.

FIG. 4 is a perspective view of the coating device 80 in the first embodiment. The coating device 80 in the first embodiment includes the die 27 and a rotation table 28 which holds and rotates the disk substrate with recording layer 21, which is an example of a coating object of the present invention, obtained by forming the first recording layer 2 on the disk substrate 1. Although not shown in the figure, the rotation table 28 is constituted by a vacuum attraction base having a vacuum attraction hole opened on an upper surface thereof and a driving unit including a motor which rotates the vacuum attraction base. The rotation table 28 attracts the disk substrate with recording layer 21 set on the upper surface of the vacuum attraction base and keeps flatness of the disk substrate with recording layer 21.

Although not shown in the figure, displacement gauges are provided at both ends of a lower end of the die 27 close to the surface of the disk substrate with recording layer 21. Consequently, it is possible to measure a distance between the die 27 and the surface of the disk substrate with recording layer 21 and keep flatness and fixed height of the lower surface of the die 27 through an unshown control device with respect to the surface of the disk substrate with recording layer 21.

In the first embodiment, in the coating device, the disk substrate with recording layer 21 shown in FIG. 1 is rotated. However, the present invention is not limited to this. At least one of the die 27 and the disk substrate with recording layer 21 only has to rotate such that the die 27 and the disk substrate with recording layer 21 relatively rotate.

In the coating device 80 shown in FIG. 4, in order to apply the adhesive 7 shown in FIG. 2B over the disk substrate with recording layer 21 in step ST2 in FIG. 3, the disk substrate with recording layer 21 is mounted on the rotation table 28. However, in order to apply the ultraviolet-curing resin 9 shown in FIG. 2D over the stamper 8 in step ST3, it is necessary to mount the stamper 8 on the rotation table 2. In order to form the cover layer 5 and the rear-side coat layer 6 shown in FIG. 2G in step ST7, it is necessary to mount such a disk, after the stamper 8 is peeled off in FIG. 2F, that has the disk substrate 1, the first recording layer 2, the intermediate layer 3, and the second recording layer 4 formed thereon, on the rotation table 28.

The die 27 used in the coating device 80 in the first embodiment will be explained.

Figure 5:
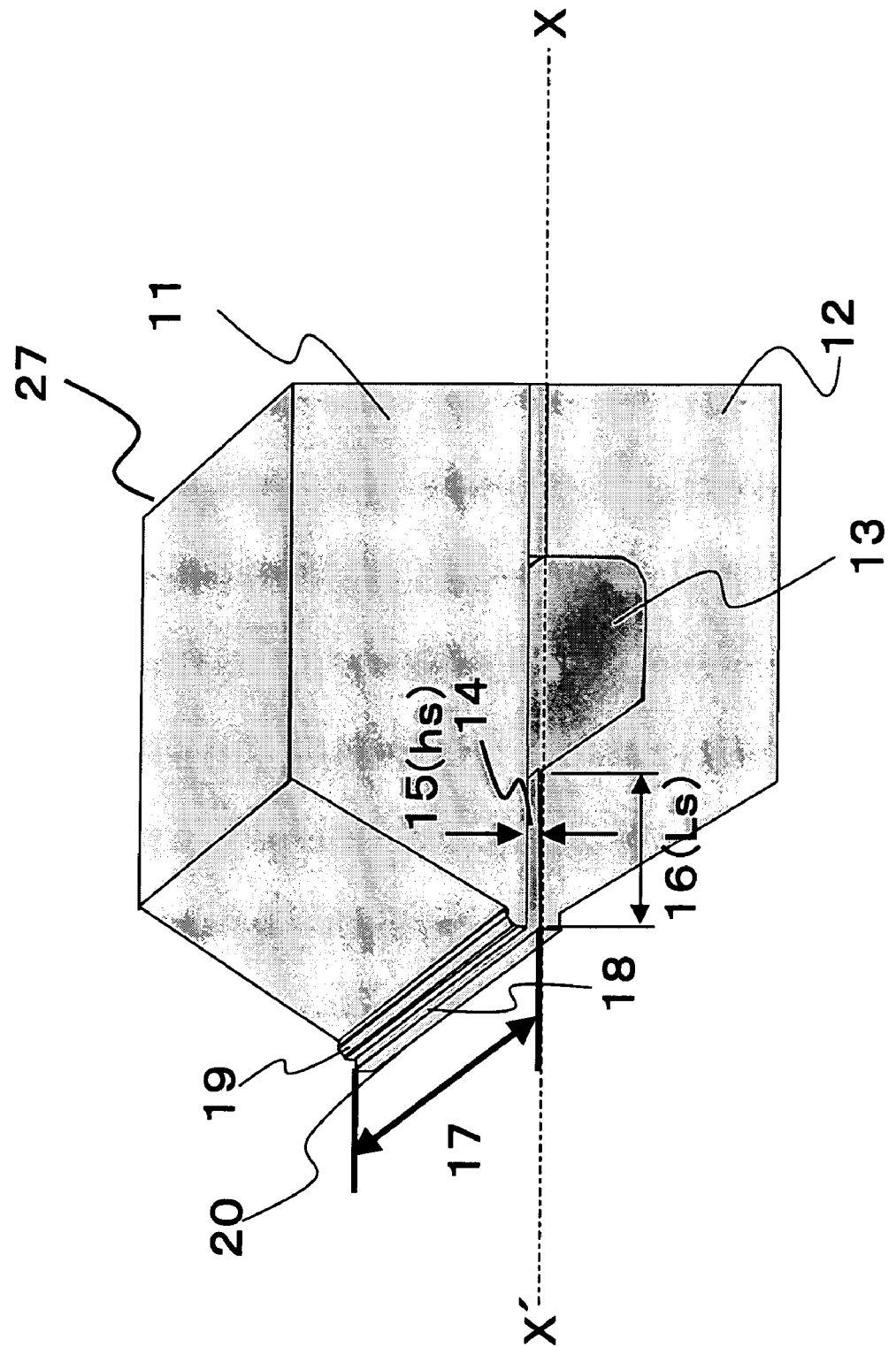
FIG. 5 is a perspective view of a die in the first embodiment according to the present invention.

FIG. 5 shows a perspective view of a structure of the die 27. The die 27 is divided into an upper block 11 on an upper side and a lower block 12 on a lower side on the basis of an alternate long and short dash line XX' in FIG. 5. FIG. 6A is a perspective view showing only the lower block of the die 27. FIG. 6B is a plan view of the lower block viewed from the side of F in FIG. 6A. FIG. 7A is a perspective view of a state in which the upper block and the lower block of the die 27 are separated. FIG. 7B is a plan view of a discharge port viewed from an arrow G direction in FIG. 7A.

As shown in FIG. 5, the die 27 is constituted by combining the upper block 11 and the lower block 12. In FIG. 6A, a shape of the lower block 12 is substantially a trapezoidal prism. Trapezoidal surfaces 12a and 12b having an upper side longer than a lower side are arranged on sides of the lower block 12. A manifold 13 is formed from one trapezoidal surface 12a to the other trapezoidal surface 12b in an upper surface 12c of the lower block 12. In addition, a paint supply path 10 is formed from a side 12d other than the trapezoidal surfaces 12a and 12b to the manifold 13 in the lower block 12. A surface opposed to this side 12d is assumed to be a side 12e. A rear lip 20 projecting from the side 12e is formed at an end on the side 12e side of the upper surface 12c.

As shown in FIGS. 5 and 7A, a shape of the upper block 11 is also a trapezoidal prism substantially the same as the shape of the lower block 12. However, the manifold and the paint supply path are not formed in the upper block 11. This upper block 11 is mounted on the lower block 12 such that an upper surface and a lower surface thereof are opposite compared with those of the lower block 12. A front lip 19 is formed in a portion of the upper block 11 opposed to the rear lip 20 of the lower block 12.

Between the lower surface of the upper block 11 and the upper surface of the lower block 12, a slit 14 is formed from the position of the manifold 13 to the position of the rear lip 20. This slit 14 is formed from the trapezoidal surface 12a side to the trapezoidal surface 12b side. A portion between the front lip 19 and the rear lip 20, which is a part of this slit 14, forms a discharge port 18. A distance from the trapezoidal surface 12a to the trapezoidal surface 12b is width 17 of the discharge port 18 equivalent to a coating width in which resin is applied. Although not shown in the figure, sidewalls are formed on the trapezoidal surfaces shown in FIG. 6 (including the surfaces 12a and 12b) such that the paint does not leak from ends of the manifold 13 and the slit 14.

A structure of the slit 14 is indicated by the width 17 of the discharge port 18 of the die 27, the slit gap 15 which is a size of a gap between the front lip 19 and the rear lip 20 and is an example of a space dimension of the slit of the present invention, and the slit length 16 which is a flow path length from the manifold 13 to the discharge port 18. The paint supply path 10 communicates with the manifold 13 in substantially the center of the width 17.

Figure 8:
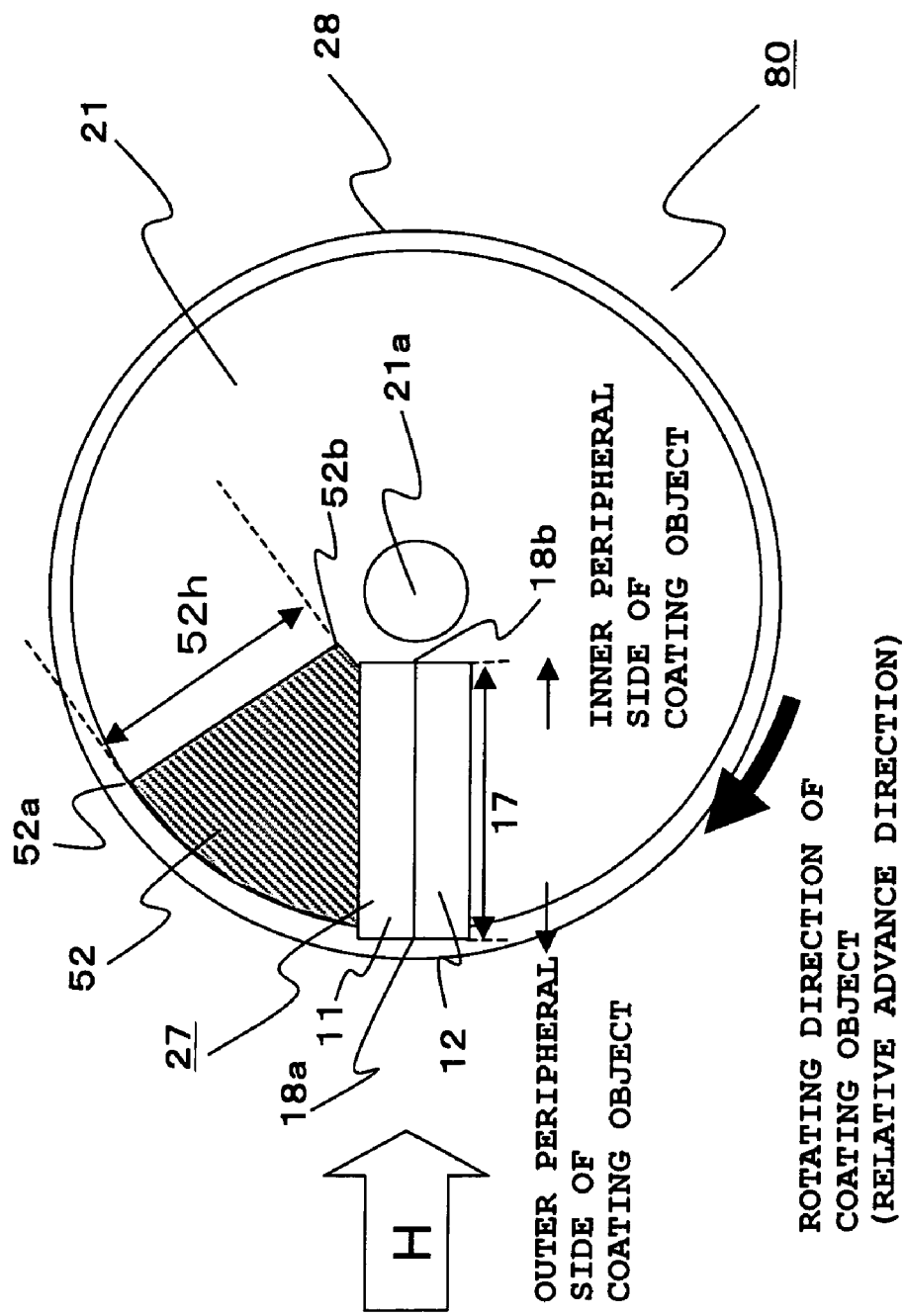
FIG. 8 is a top view of the coating device in the first embodiment according to the present invention.
Figure 9:
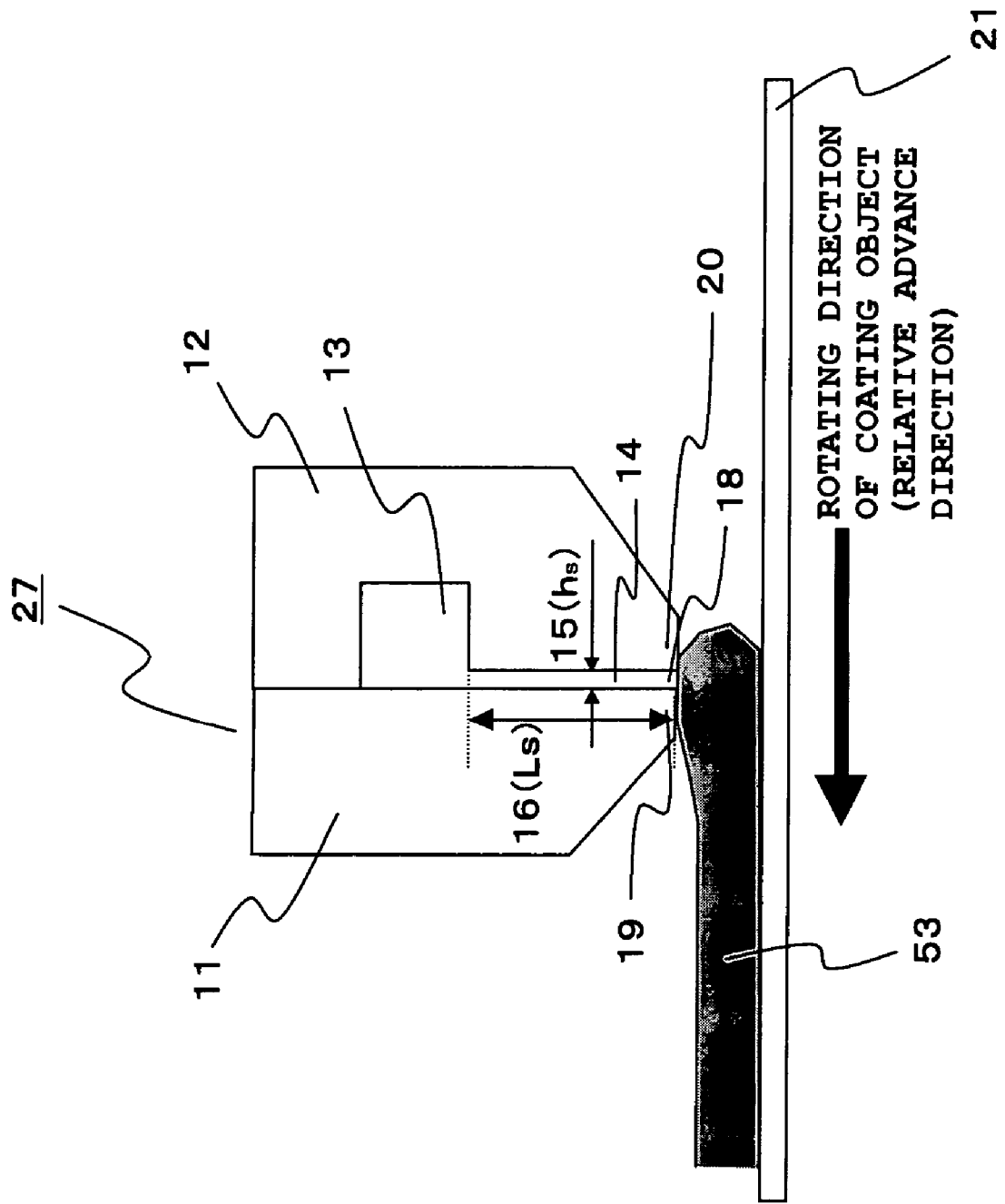
FIG. 9 is a front view of the coating device in the first embodiment of the present invention.

FIG. 8 is a top view of the coating device in the first embodiment. FIG. 9 is a side view of the coating device viewed from an arrow H direction in FIG. 8. As shown in FIGS. 8 and 9, in the die 27, the discharge port 18 thereof is opposed to the disk substrate with recording layer 21, which is an example of the coating object of the present invention, and the width 17 direction thereof is arranged in an outer peripheral direction from a center axis 21a of the disk substrate 1. In FIG. 8, an area in which the resin is applied is denoted by reference numeral 52. A coating width 52h of this area 52 is equivalent to the width 17. An outer peripheral side end of the coated area 52 is denoted by reference sign 52a and an inner peripheral side end thereof is denoted by reference sign 52b. A position in the width 17 direction of the discharge port 18 corresponding to the outer peripheral side end 52a of this area 52 is an outer peripheral side end 18a. A position corresponding to the inner peripheral side end 52b of the area 52 is an inner peripheral side end 18b.

As shown in FIG. 6B, the slit length 16 in the position of the outer peripheral side end 18a, which corresponds to the outer peripheral side of the disk substrate with recording layer 21 when the resin is applied, is set as Lsa. The slit length 16 of the inner peripheral side end 18b is set as Lsb. The slit length 16 of a substantially center position 17c of the width 17 opposed to the paint supply path 10 is set as Lsc.

In the die in the first embodiment, Lsa=Lsb and Lsc is the smallest. The slit length 16 linearly increases from the length Lsc in the position 17c to the length Lsa in the outer peripheral side end 18a. The slit length 16 from the position 17c to the inner peripheral side end 18b increases in the same manner. As shown in FIG. 6B, the manifold 13 of the die 27 in the first embodiment is formed in a V shape viewed from above.

As shown in FIG. 7B, length of the slit gap 15 in the position of the outer peripheral side end 18a is set as hsa. Length of the slit gap 15 in the position of the inner peripheral side end 18b is set as hsb. In the die 27 in the first embodiment, hsa is longer than hsb. The slit gap 15 monotonously increases from the inner peripheral side end 18b to the outer peripheral side end 18a. The example of the description "a slit space dimension is the smallest on the one end face side and increases toward the other end face side" of the present invention corresponds to the monotonous increase in the slit gap from the inner peripheral side end 18b to the outer peripheral side end 18a.

A coating liquid supplied from the paint supply path 10 is spread and distributed in the width 17 direction of the die 27 by the manifold 13, passes the slit 14, and is discharged from the discharge port 18, which is constituted by the front lip 19 and the rear lip 20, in predetermined thickness (a discharge quantity distribution in the width direction of the die). The discharge quantity distribution in the coating width direction of the die is affected by a pressure loss of the coating liquid in flow in the width direction of the die inside the manifold 13, a pressure loss due to the slit gap 15 and the slit length 17 in the slit portion.

In the coating device in the first embodiment including the die 27, while the die 27 and the disk substrate with recording layer 21, which are an example of the present invention, are relatively rotated, the ultraviolet-curing resin 9 is discharged from the die 27. When the disk substrate with recording layer 21 rotates once and the resin is applied over the entire periphery thereof, the die 27 is retracted from the surface of the substrate.

Figure 10:
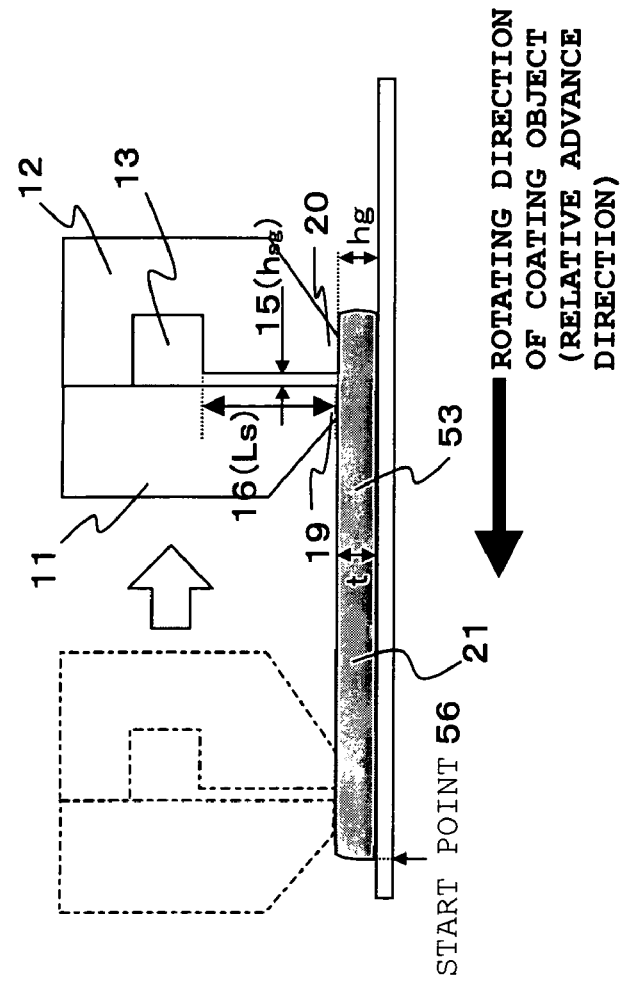
FIGS. 10A to 10C are diagrams for explaining an coating gap and film thickness in the beginning and the end of an application process in which the coating device in the first embodiment according to the present invention is used.
Figure 10:
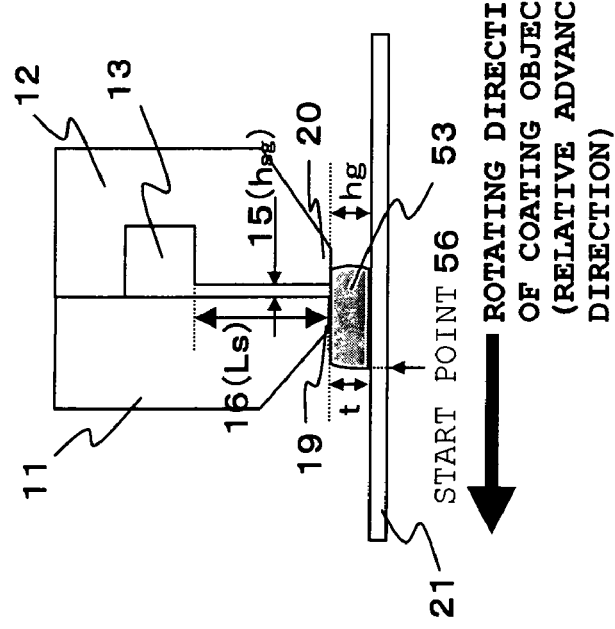

In that case, to prevent fluctuation in the film thickness such as swell or void from occurring in a joint of the beginning and the end of a resin film 53 applied, as shown in FIG. 10A, at beginning coating time and end coating time, the resin is applied with a coating gap hg, which is an amount of a gap between the lower end of the die 27 and the surface of the disk substrate 1 set the same as film thickness t. FIG. 10B shows a state in which the die 27 moves relatively to the disk substrate 1 from a position indicated by an alternate long and short dash line to a position indicated by a solid line.

When the coating is started under a condition that the coating gap hg is larger than the desired film thickness t, as shown in FIG. 10C, unnecessary liquid accumulation 55 occurs when a bead is formed at the start of the coating and swell (the liquid accumulation 55) of a start point 56 occurs.

A discharge quantity Q from the die 27 is intensely affected by resistance of the coating gap hg and is in a proportional relation with the cube of the coating gap hg ($Q \propto hg^3$). Thus, when the coating gap hg decreases, the resistance in the coating gap hg becomes extremely large and the discharge quantity Q suddenly decreases. When the coating gap hg decreases to zero, liquid is not discharged. Therefore, when the resin is applied as shown in FIG. 10C, at a point overlapping the coating start point 56, the discharge port 18 is blocked by a coating film at the coating start point 56 already coated. Since a substantial coating gap decreases to zero and the discharge quantity decreased to zero, the swell (the liquid accumulation 55) occurs.

On the other hand, when the coating is started with the coating gap hg equal to thickness t of the film to be applied as shown in FIG. 10A, since unnecessary liquid accumulation does not occur, it is possible to easily form the start point 56 without swell. An example of a distance from the coating object to the discharge port of the present invention is equivalent to the coating gap hg in the first embodiment. The description "substantially identical with thickness of a film which should be formed" of the present invention means a film thickness in a range recognized as identical with the film thickness t under the commonly accepted idea.

In steps ST2, ST3, and ST7 in the process of manufacturing a blu-ray disk shown in FIG. 3, it is possible to form a layer having thickness fluctuation of a desired thickness within an allowable range by using the coating device in the first embodiment.

Examples of a coating device 60 and a die which can be used in the coating device 60 in the first embodiment will be described more in detail in first and second examples.

First Example

FIG. 11A is a perspective view of a die 60 in the first example. FIG. 11B is a plan view of the die 60 viewed from an arrow I direction in FIG. 11A. FIG. 11C is a top view of a lower block 12'. As shown in FIG. 11C., the die 60 in the first example is different from the die 27 explained in the first embodiment in that the slit length 16 is fixed in the width 17 direction (Lsa=Lsc=Lsb). On the other hand, the slit gap 15 formed by the upper block 11 and the lower block 12' monotonously increases from one end to the other end along the width 17 direction as in the first embodiment. As respective lengths of the die 60 in the first example, Lsa=Lsb=Lsc=20 mm, hsa=100 μm, and hsb=60 μm. A ratio of hsb and hsa is 3:5.

A discharge quantity of a paint is affected by a pressure loss in the slit portion and a pressure loss ΔPs is in an inversely proportional relation with the cube of the slit gap hs ($\Delta Ps \propto (1/(hs \times hs \times hs))$). Thus, it is considered that, in order to increase a discharge quantity, the pressure loss ΔP only has to be reduced, that is, the slit gap only has to be increased. A die to which this ideal is applied is a die in the first example.

Figure 11:
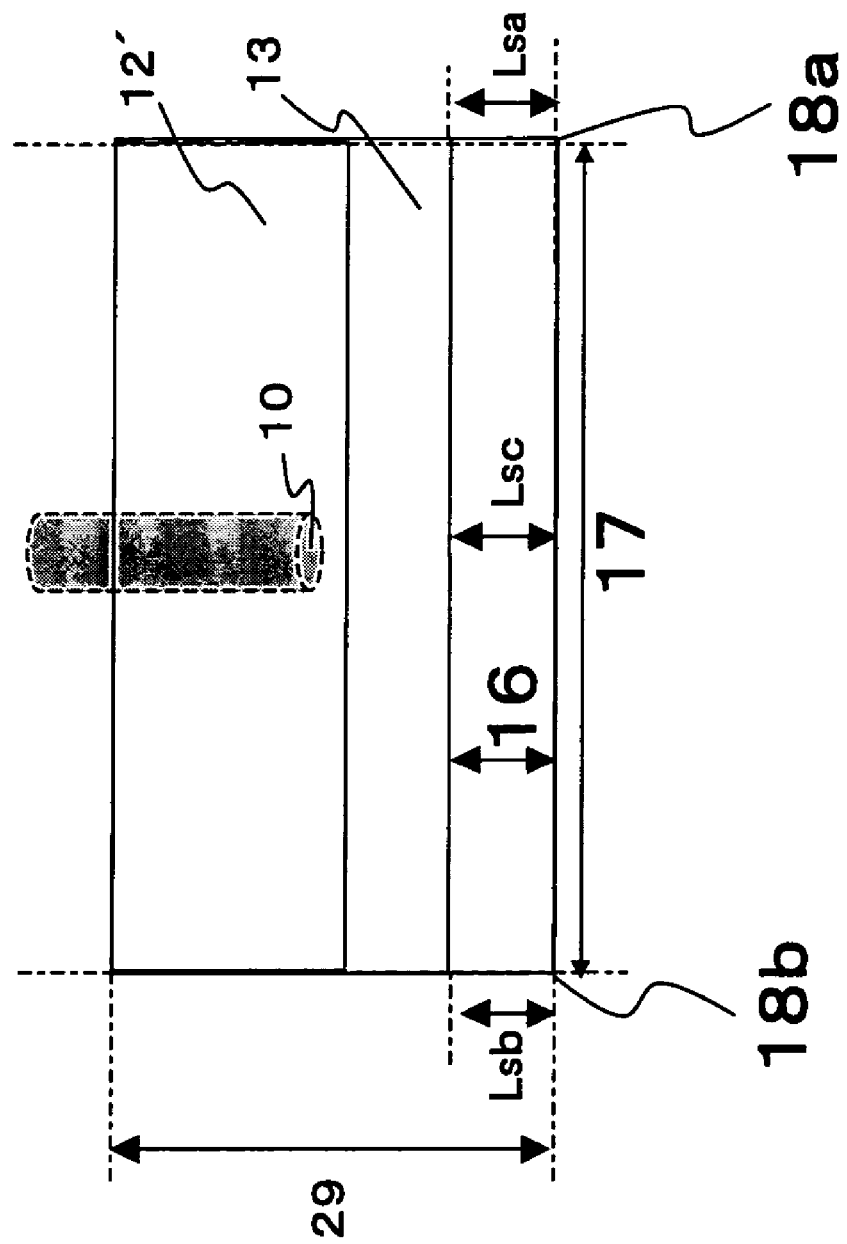
FIG. 11A is a perspective view enlarged for explaining an interval of a slit gap of a die in a first example according to the present invention.
FIG. 11B is a plan view of a lower block of the die in the first example according to the present invention.
FIG. 11C is a plan view of a discharge port of the die in the first example according to the present invention.

A discharge quantity in forming a resin layer having a film thickness of 20 μm with the die in the first example shown in FIG. 11 was measured.

The die in the first example shown in FIG. 11 was arranged to be opposed to a container provided with thin partitions at intervals of 2 mm such that the partitions divided the discharge port 18 of the die at the intervals of 2 mm in the width 17 direction. In this state, after resin was discharged from the die in the first example for thirty seconds, a discharge quantity distribution in the width 17 direction was measured by measuring weight of the resin accumulated in the respective partitions.

Figure 12:
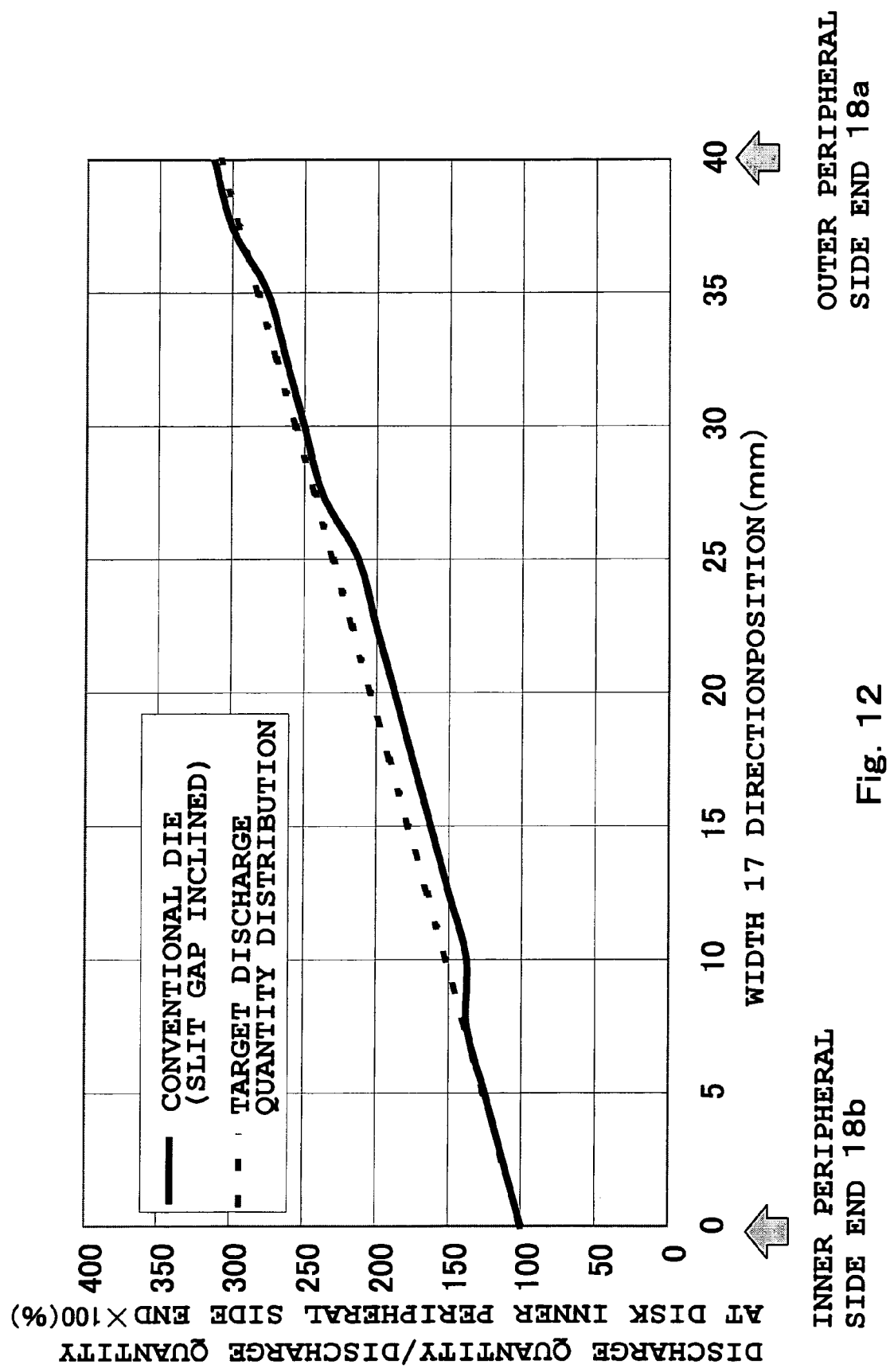
FIG. 12 is a graph of a discharge quantity distribution by the die in the first example according to the present invention.

A result of the discharge quantity distribution measured in this way is shown in FIG. 12. A dotted line indicates a target discharge quantity. As shown in FIG. 12, it is seen that, in the outer peripheral side end 18a and the inner peripheral side end 18b, the target discharge quantity distribution is nearly obtained but a discharge quantity near the center of the width 17 is smaller than the target discharge quantity.

The discharge quantity near the center of the width 17 is small in this way. This is considered to be because, since the pressure loss ΔPs is in an inverse proportional relation with the cube of the slit gap hs ($\Delta Ps \propto 1/(hs \times hs \times hs)$), a discharge quantity distribution in the coating width 52h direction is a distribution of a curved line shape.

Figure 26:
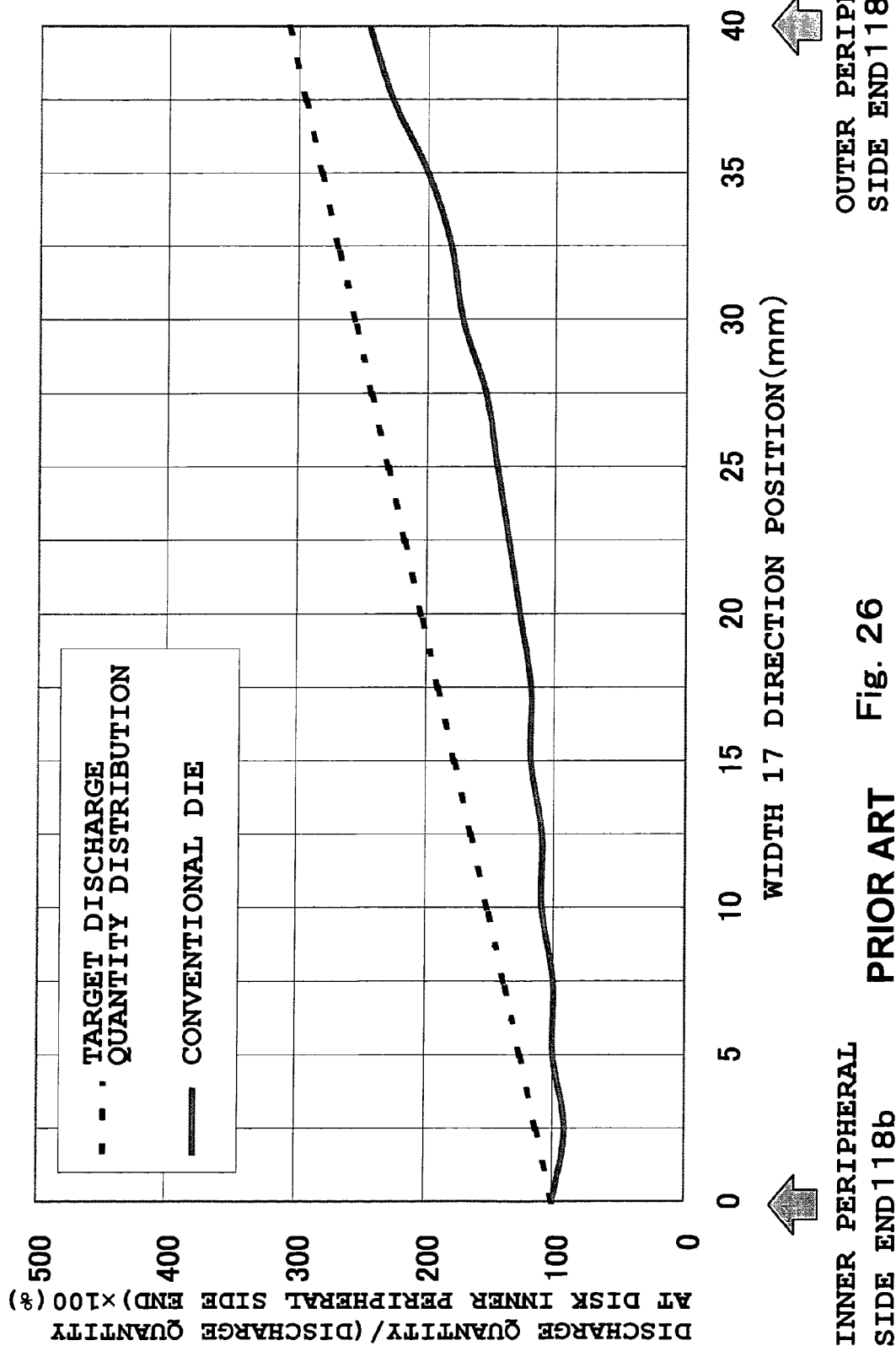
FIG. 26 is a diagram showing a graph of a discharge quantity distribution by the conventional die.
Figure 27:
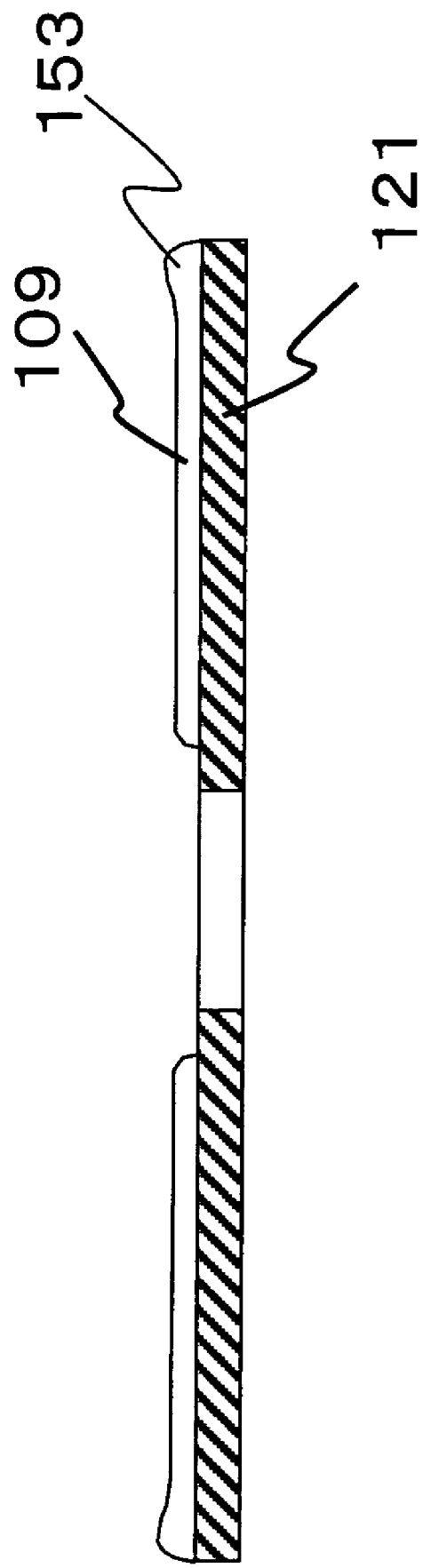
FIG. 27 is a sectional view showing thickness fluctuation of a resin layer according to a conventional spin coat method.

As described above, it is seen that, in the die in the first example, although the discharge quantity near the center in the width 17 direction is small, the discharge quantity is substantially improved when the discharge quantity is compared with that shown in FIG. 26.

Second Example

In the second example, the die 27 described in the first embodiment was used. As the respective lengths of the die 27, Lsa=Lsb=20 mm, Lsc=15 mm, hsa=100 μm, and hsb=60 μm. The die 27 in the second example is different from the die 60 in the first example in that the length of the slit length 16 is small in the center of the width 17. As ratios of the length, hsb:hsa is 3:5 and Lsc:Lsa is 3:4.

As in the first example, the die in the second example was opposed to a container provide with thin partitions at intervals of 2 mm such that the partitions divided the discharge port 18 of the die at the intervals of 2 mm in the width 17 direction. In this state, after resin was discharged from the die in the second example for thirty seconds, a discharge quantity distribution in the width 17 direction was measured by measuring weight of the resin accumulated in the respective partitions. A result of the measurement is shown in a graph of a discharge quantity distribution in FIG. 13.

Figure 13:
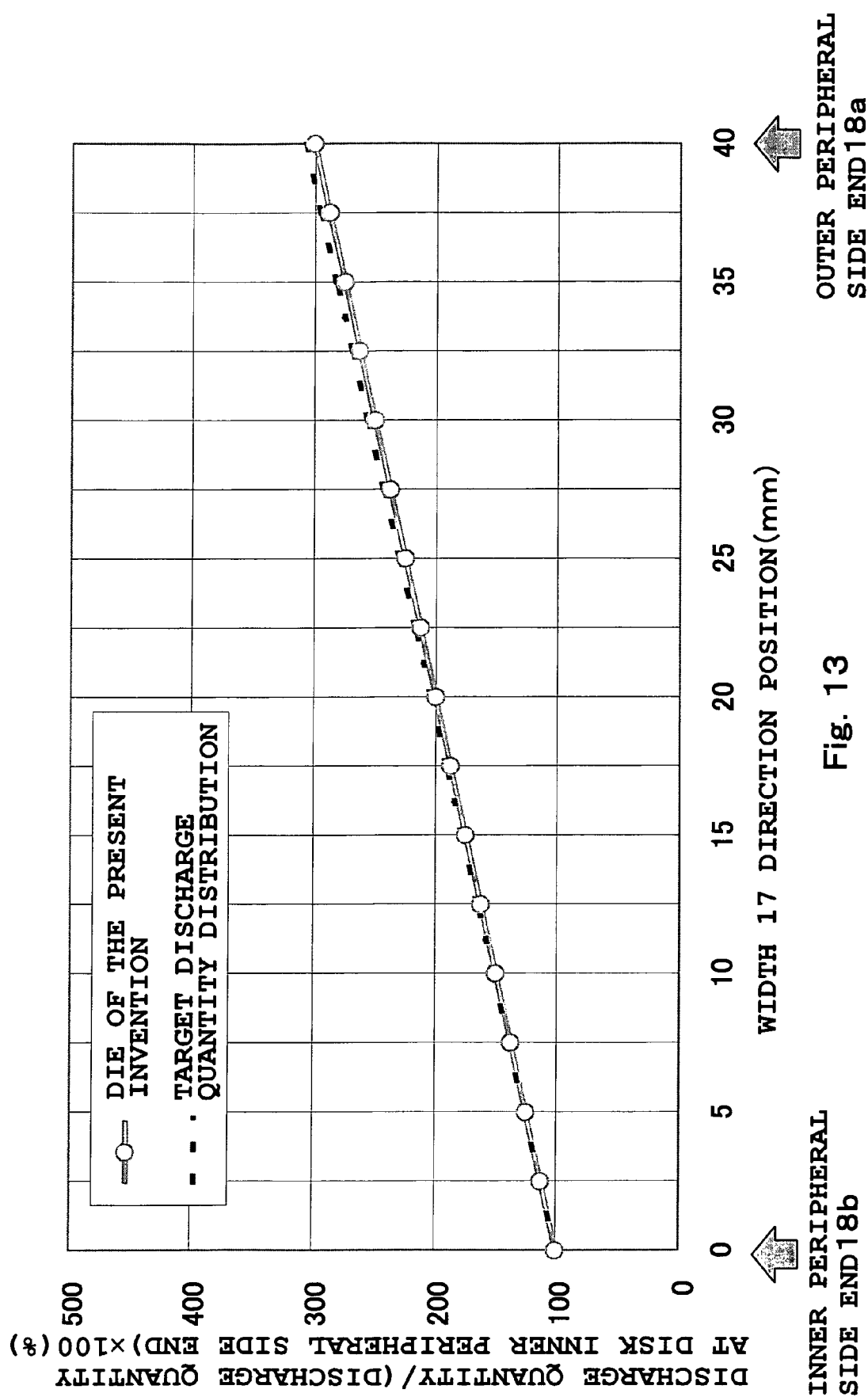
FIG. 13 is a graph of a discharge quantity distribution by a die in a second example according to the present invention.

From the result in FIG. 13, in the die in the second example, a discharge quantity distribution in which a discharge quantity of the outer peripheral side end 18a was 300% with respect to a discharge quantity of the inner peripheral side end 18b of the disk substrate 1 and, in a section between the inner peripheral side end 18b and the outer peripheral side end 18a, a discharge quantity linearly increased from the inner peripheral side end 18b toward the outer peripheral side end 18a of the disk could be realized.

In the die in the second example, compared with the die in the first embodiment, it is possible to reduce a pressure loss and solve the decrease of a discharge quantity with respect to the target discharge quantity in the center of the width 17, which occurs in the die in the first example, by setting the slit length 16 in the center of the width 17 smallest.

Figure 14:
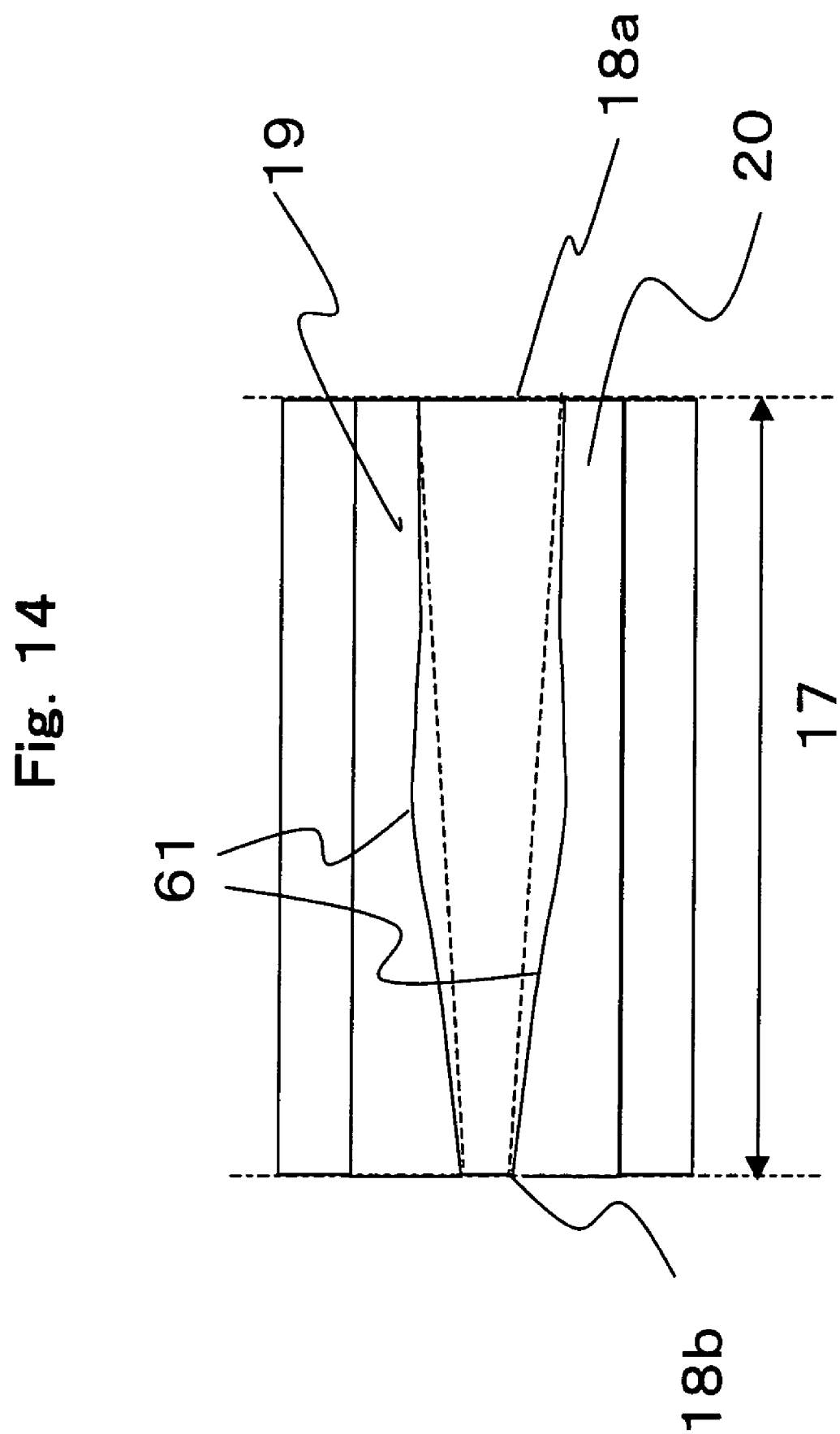
FIG. 14 is a plan view showing a discharge port machined in a curved line shape.

In order to correct a phenomenon in which a discharge quantity near the center of the width 17 is smaller than the target discharge quantity, which occurs in the first example, and obtain a linear discharge quantity distribution in the coating width 52h direction without reducing the slit length 16 in the center of the width 17 as in the second example, a shape of the discharge port 18 (a slit gap) in the width 17 direction has to be formed by sides 61 of curved lines shown in FIG. 14 rather than being formed by linear sides shown in FIG. 7(b) described above. Dotted lines in FIG. 14 indicate a shape of the slit shown in FIG. 7(b).

However, it is extremely difficult to highly accurately machine the slit 14 viewed from the discharge port 18 side into a curved line shape such that the discharge port 18 is formed by sides of curved lines. As a result, equipment is always expensive. Therefore, in the past, a method of providing steps in the slit gap 15 in the width 17 direction is not realistic. Consequently, the die 127 shown in FIGS. 23 to 25A is used in a coating method according to the conventional die coat method.

On the other hand, according to the die in the first example, a shape of a discharge port only has to be formed by linear sides as shown in FIG. 7B and complicated machining of the slit shown in FIG. 14 for obtaining a linear discharge quantity distribution is unnecessary. Thus, it is possible to obtain inexpensive equipment.

Third Example

In the third example, the die 27 in the second example was used in the coating device 60 explained in the first embodiment and a resin layer having thickness of 20 μm was formed by applying the ultraviolet-curing resin 9 over the disk substrate with recording layer 21.

Results of evaluation of thickness fluctuation and cost of the resin layer formed are shown in Table 3. In Table 3, results obtained by forming the same resin layer by the die coat method in which the conventional die is used, the spin coat method, and the sheet sticking method, which are explained in Table 1 earlier, are also described.

TABLE 3

Resin layer having thickness of 20 μm

| | Third example Die coat | Conventional method | | |
| --- | --- | --- | --- | --- |
| | | Die coat | Spin coat | Sheet sticking method |
| In-plane thickness fluctuation R (%) | 1.5 | 49 | 2 | 1.8 |
| In-plane thickness fluctuation judgment (non-defective product standard: R5% or less) | ◎ | X | ○ | ○ |
| Cost | Small: ◎ | Large: X | Large: X | Extremely large: XX |

From Table 3, it is seen that, in the die in the second example, as described above, since a desired discharge quantity distribution could be realized in the coating width direction, thickness fluctuation is extremely small, a uniform resin layer which meets the standard can be formed at low cost, and an extremely high-quality optical disk is obtained.

Results of comparing thickness fluctuation, a size of a die, and cost at the time when resin layers having thickness of 20 μm are formed by the conventional die (Lsa=20 mm and Lsb=80 mm in FIG. 24 and hs=100 μm in FIG. 25) and the die in the second example with respect to the same coating device are shown in Table 4.

TABLE 4

Resin layer having thickness of 20 μm

| | Conventional method Die coat | Third example Die coat |
| --- | --- | --- |
| In-plane thickness fluctuation R (%) | 49 | 1.5 |
| Judgment (non-defective product standard: R5% or less) | X | ◎ |
| Length in a height direction of a die (mm) | 180 | 70 |
| Size and weight of a coating device | Large/heavy: X | Small/light: ◎ |
| Cost | Large: X | Small: ◎ |

From the results in Table 4, when the lengths in the height direction 29 (equivalent to height at the time when the die is arranged in the coating device) of the die of the present invention shown in FIG. 5 to FIGS. 7A and 7B and the lengths in the height direction 129 of the conventional die shown in FIG. 23 to FIGS. 25A and 25B are compared, in the conventional die, when the slit length is Lsa=20 mm and Lsb=80 mm, the length in the height direction 129 of the die is 180 mm and, in the die in the second example, when Lsa=Lsb=20 mm, the length in the height direction 29 of the die is 70 mm.

From the results of the in-plane thickness fluctuation, the size, the weight, and the cost shown in Table 4, in the die in the second example, substantial effects of a reduction in cost and a reduction in size and weight of the coating device are obtained because it is possible to realize a desired discharge quantity distribution in a paint discharge device which is extremely small compared with the conventional die and it is possible to realize inexpensive equipment.

Fourth Example

Figure 30:
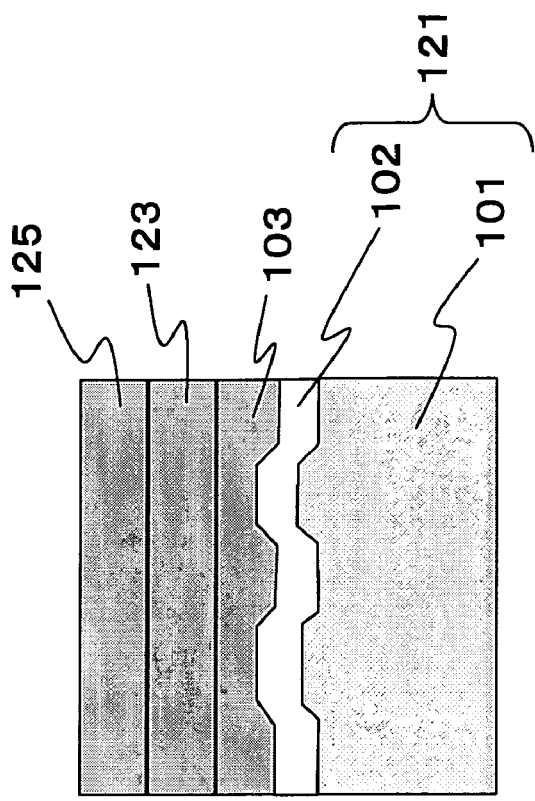
FIG. 30 is a sectional view of a structure of a resin-layer multilayer film for which the four-layer optical disk according to the conventional technique and the present invention is assumed.
Figure 29:
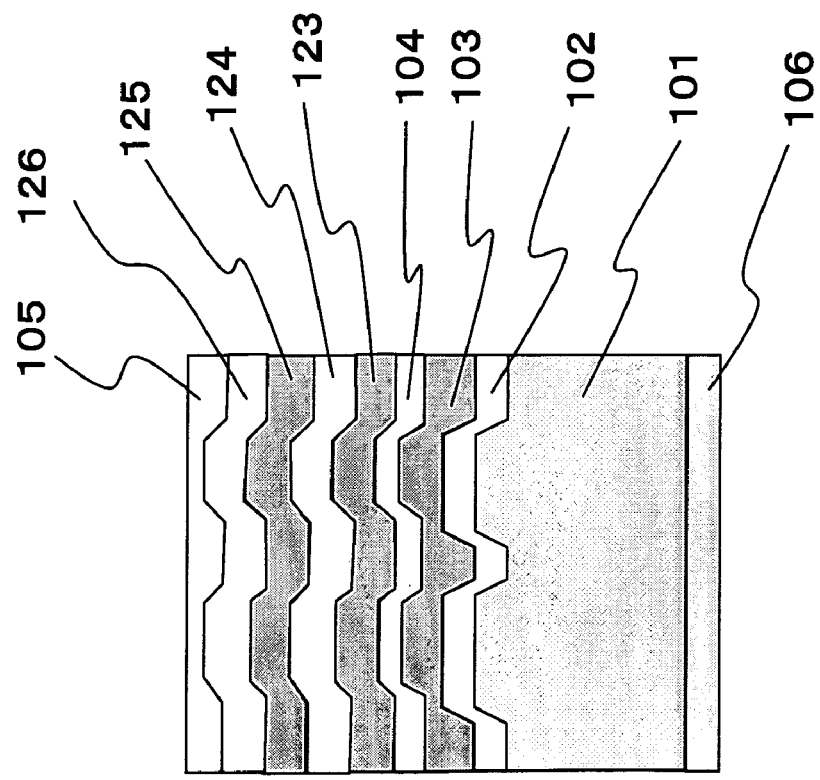
FIG. 29 is a sectional view of a structure of an optical disk (four layers) according to a conventional technique and the present invention.

Assuming a four-layer optical disk (three layers in an intermediate layer), a film in which three resin layers (average film thickness of 20 μm) were stacked as shown in FIG. 30 explained in the background art was formed by the coating device used in the third example using the ultraviolet-curing resin 9 such that a condition same as that of a structure of the four-layer optical disk was obtained.

Thickness fluctuation of the resin layers was measured. A result of the thickness fluctuation and a result of evaluation of cost are shown in Table 5. In Table 5, results obtained by forming the same resin layer by the die coat method in which the conventional die is used, the spin coat method, and the sheet sticking method, which are explained in Table 2 earlier, are also described.

TABLE 5

Resin layer having thickness of 60 μm (20 μm × 3 layers)

| | Fourth example Die coat | Conventional method | | |
| | | Die coat | Spin coat | Sheet sticking method |
|---|---|---|---|---|
| In-plane thickness fluctuation R (%) | 4.5 | Over 50 | 7 | 5 |
| In-plane thickness fluctuation judgment (non-defective product standard: R5% or less) | ◎ | X | X | ○ |
| Cost | Small: ◎ | Large: X | Large: X | Extremely large: XX |

As a standard for a non-defective product in the four-layer (three layers in an intermediate layer) structure, a level same as that of two layers is required in a sum of fluctuation of the four layers. Thus, more highly accurate coating compared with the case of the two layers is required for formation of the respective layers constituting the four layers. As a result, thickness fluctuation in a sum of the three layers in the intermediate layer is the same as the standard R5% calculated in the intermediate layer in the two-layer structure.

From the results in Table 5, it is seen that, in the spin coat method, when a disk is multilayered, thickness fluctuation in outermost peripheries of coating films of the respective layers is accumulated and deviates from the desired standard but, in the coating device in the fourth example, as described above, since the desired discharge quantity distribution can be realized in the coating width direction, it is possible to form a highly accurate resin layer having extremely small thickness fluctuation and capable of coping with multilayering and an extremely high-quality multilayer disk is obtained.

Fifth Example

Figure 15:
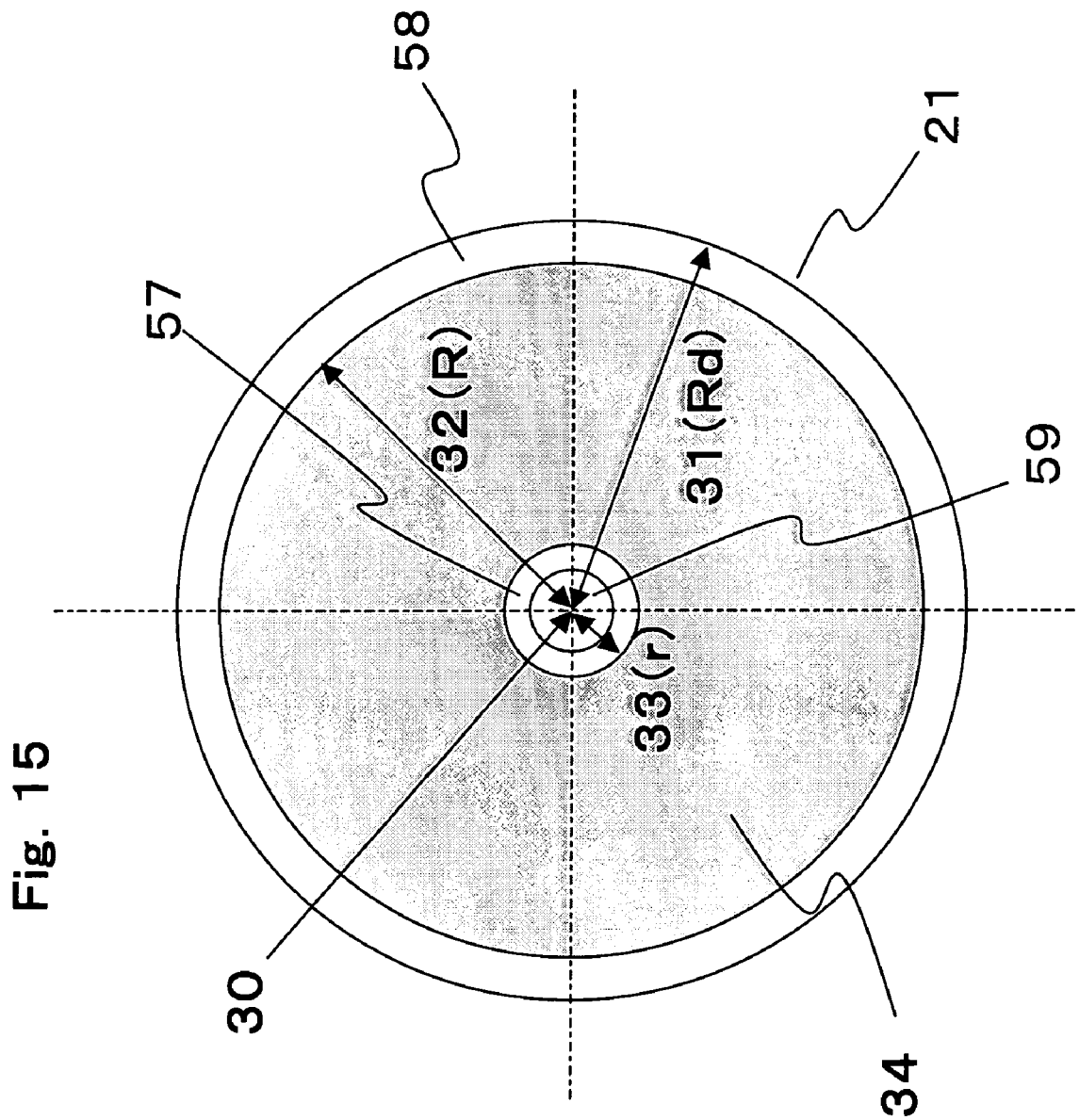
FIG. 15 is a plan view of a disk substrate with recording layer, on which ultraviolet-curing resin is applied excluding a periphery thereof, manufactured in a fifth example according to the present invention.

FIG. 15 is a plan view of a state in which resin is applied over a disk substrate with recording layer. In the fifth example, as shown in FIG. 15, while an uncoated portion 58 was provided at an outermost peripheral end of a disk substrate on the disk substrate with recording layer 21, a resin layer in which three resin layers having average thickness of 20 μm were stacked (see FIG. 30) was formed by applying the ultraviolet-curing resin 9 over the disk substrate using the coating device explained in the third example. An uncoated portion 57 is also provided around a hole 59 in which a rotor on the device side is inserted, for example, when an optical disk is played. An area in which the ultraviolet-curing resin 9 is applied is shown as a coated area 34. A rotation axis 30 of the disk substrate with recording layer 21 is shown in the figure.

In the fifth example, a resin film radius 32 (R)=58.8 mm and a resin film inner diameter 33 (r)=18 mm with respect to a disk radius 31 (Rd)=60 mm.

Results of evaluation of thickness fluctuation of a resin layer and cost in this case are shown in Table 6. Results of evaluation at the time when the same resin layer was formed by the spin coat method are also shown.

TABLE 6

Resin layer having thickness of 60 μm (20 μm × 3 layer)

| | Conventional method Spin coat | Fifth example Die coat |
|---|---|---|
| In-plane thickness fluctuation R (%) | 7 | 4.5 |
| Judgment (non-defective product standard: R5% or less) | X | ○ |
| Stamper reuse | Impossible: X | Possible: ◎ |
| Resin utilization ratio (%) | 10: X | 100: ◎ |

From the results in Table 6, in the fifth example, a satisfactory result of thickness fluctuation was obtained as in the fourth example.

Utilization ratios of resin by the two kinds of methods, that is, the spin coat method, which is the conventional example, and the method in which the die of the present invention is used are also shown in Table 6. As a result, whereas the utilization ratio is extremely low at about 10% in the spin coat method, the utilization ratio of nearly 100% can be realized in the die of the present invention. In this regard, there is also a significant advantage of cost reduction.

As explained with reference to FIGS. 28A to 28C, since when resin is applied over an intermediate layer by the spin coat method, the application reaches the outermost periphery of the disk, the resin thereafter invades an outer peripheral end face of the stamper 108 when the stamper 108 is pressed against the disk, the resin adheres to the stamper 108 even after peeling off the resin. Thus, in order to control dust, the stamper 108 is disposable.

On the other hand, if an intermediate layer is formed by the coating device in the first embodiment, it is possible to apply the resin over the intermediate layer in a state in which an uncoated portion is left in an outermost periphery of the disk. Even when the stamper 8 is pressed against the disk, it is possible to prevent the invasion of the resin to the outer peripheral end of the stamper 8 (see FIGS. 28A to 28C). As a result, it is possible to reuse the stamper 8 and realize substantial reduction in cost.

The stamper 8 is required to have a function for making only the stamper 8 peeled off without peeling off the intermediate layer 3 from the disk substrate 1 side at the time when the stamper 8 is peeled off the disk substrate 1 after the stamper 8 and the disk substrate 1 are stuck together. However, in the conventional spin coat method, since it is impossible to reuse the stamper 8, only an inexpensive and easily-available material such as polycarbonate can be used for the stamper 8. When the stamper 8 is made of such a material, since adhesive strength of the stamper 8 itself and the ultraviolet-curing resin 9 is high, without the adhesive 7, it is impossible to peel off only the stamper 8. In other words, in order to set adhesive strength of the ultraviolet-curing resin 9 and the disk substrate 1 side higher than adhesive strength of the ultraviolet-curing resin 9 and the stamper 8, the adhesive 7 is applied on the disk substrate 1 side to stick ultraviolet-curing resin 9 and the disk substrate 1 together.

However, it is possible to reuse the stamper 8 by forming an intermediate layer in a state in which the uncoated portion is left in the outermost periphery of the disk substrate using the coating device in the first embodiment. Thus, although cost per one stamper slightly increases compared with the conventional stamper, it is possible to change the stamper 8 to a stamper which uses a material such as acrylic resin, polyolefin resin, or polycarbonate subjected to surface treatment of nickel, silver, or the like or nickel metal itself and is easily peeled off the ultraviolet-curing resin 9.

This makes it unnecessary to apply the adhesive 7 on the disk substrate 1 side and makes it possible to form the intermediate layer 3 only with one kind of metal and realize a reduction in cost in terms of procurement of materials.

Figure 16:
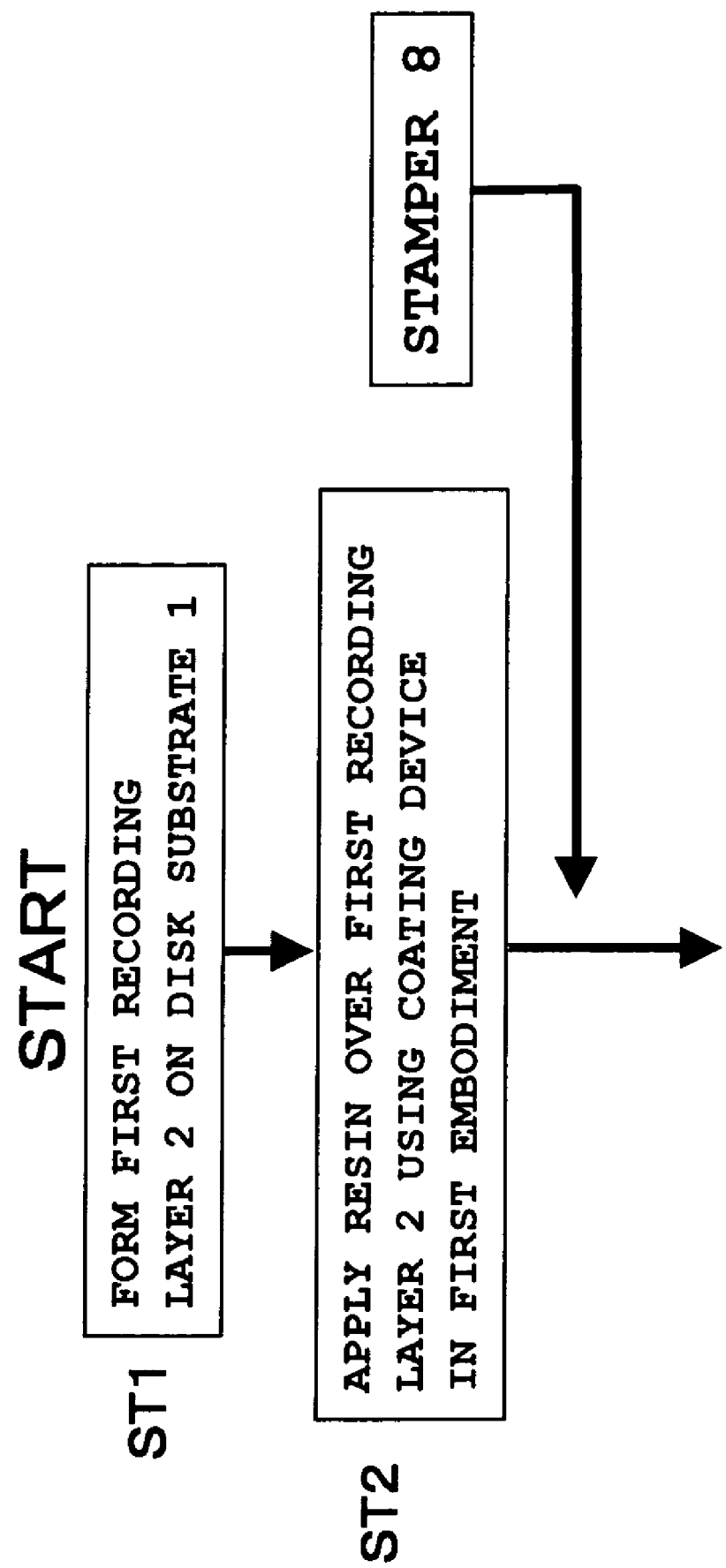
FIGS. 16A and 16B are flowcharts showing modifications of the method of manufacturing an optical disk in the first embodiment according to the present invention.
Figure 16:
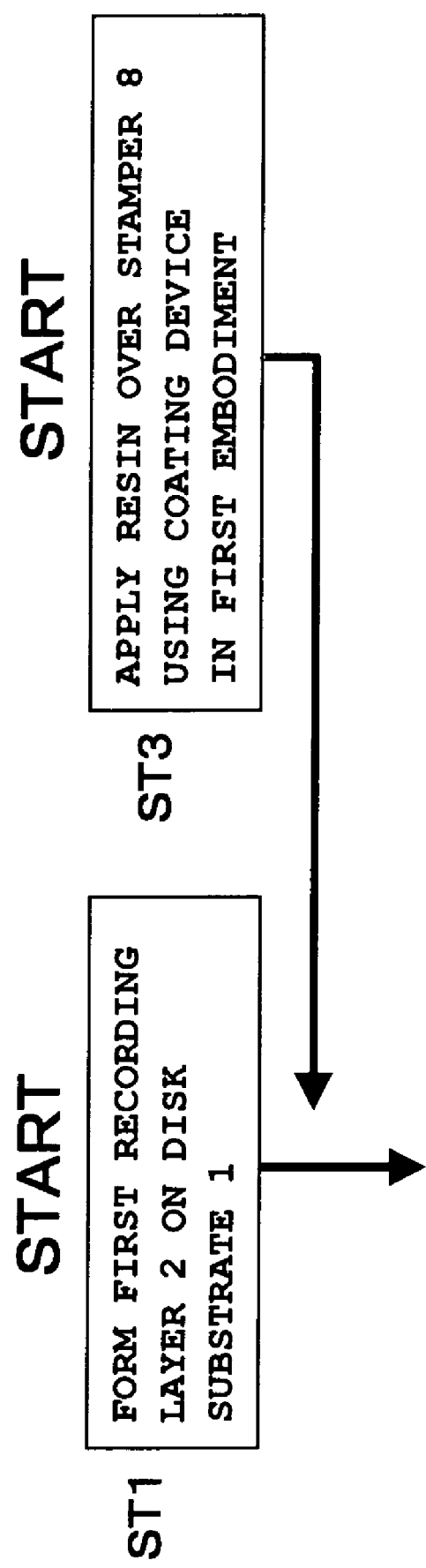

Since it is possible to form the intermediate layer 3 only with one kind of material, the ultraviolet-curing resin only has to be applied only one of the disk substrate 1 side and the stamper 8 side to stick the disk substrate 1 and the stamper 8 together. It is possible to change steps ST1 to ST3 shown in FIG. 3 to the flows shown in FIGS. 16A and 16B. FIG. 16A shows a flow in the case in which the ultraviolet-curing resin 9 is applied over only the first recording layer 2 on the disk substrate 1 side. FIG. 16B shows a flow in the case in which the ultraviolet-curing resin 9 is applied over only the stamper 8.

Since the uncoated portion 57 is provided around the hole 59 as well, it is possible to prevent the problem in that the resin overflows to the hole 59 to make it impossible to insert a rotor of a reproducing device in the hole 59.

In the fifth example, the resin film radius R=58.8 mm and the resin film inner diameter r=18 mm with respect to the disk radius Rd=60 mm. However, the present invention is not limited to this. It is possible to obtain an effect that the resin does not overflow to the outer peripheral end face of the disk and reuse of the stamper is possible in a range of the resin film radius R=Rd−x, (x=0.2 to 0.5 mm) and the resin film inner diameter r=0 to 25 mm. In examining such disk radius, resin film radius, and resin film inner diameter, the resin film radius was changed by changing width of a die or blocking a part of a slit to regulate a coating width.

The die in the first embodiment shown in FIG. 5 to FIGS. 7A and 7B has a structure in which, concerning the slit length, a point or an area where the slit length is shorter than shorter one of Lsa and Lsb and is smallest slit length Lsc in the area of the coating width is present in the area of the coating width. The die has a new structure in which, concerning the slit gap, the slit gap monotonously increases in the coating width direction from a coating width direction end corresponding to the inner peripheral side end of the disk toward a coating width direction end corresponding to the outer peripheral side end when the resin is applied over the disk.

Conventionally, as described in the explanation of the conventional die 127 in FIG. 23 to FIGS. 25A and 25B, in the conventional die 127, in order to reduce a pressure loss and increase a flow rate, a slit length in a portion where it is desired to set a discharge quantity largest in the coating width direction (the outer peripheral side end 18*a*) is set smallest. It is completely a new concept to adopt a structure in which a slit length is the smallest in the coating width area in a portion other than a portion where it is necessary to set a discharge quantity largest in the coating width direction as in the die of the present invention.

In this way, by adopting the new concept of setting the slit length of the area other than the portion with the largest discharge quantity smallest in coating width area while monotonously increasing the slit gap toward the inner peripheral side end and the outer peripheral side end of the disk in the width direction of the die, it is possible to reduce a pressure loss in the slit in the center in the coating width direction and increase a discharge quantity in the center in the width direction while realizing a discharge quantity difference in the inner peripheral side end and the outer peripheral side end of the disk in the coating width direction. As a result, it is possible to realize a discharge quantity distribution which makes it possible to apply the resin over a disk-like coating object in uniform film thickness.

According to the present invention, a loss of resin is small compared with the spin coat method and the like, a collection mechanism or the like is not required, and it is possible to highly accurately form a resin layer thin by only a predetermined quantity in a desired portion on a disk. This makes it possible to inexpensively and stably manufacture a large capacity optical disk which requires highly accurate film formation.

In the embodiment, the die 27 is arranged such that the discharge port 18 extends along the radius of the disk with recording layer 21. However, the die 27 may be arranged such that the discharge port 18 is oblique to the radius. In short, the die only has to be arranged such that a shorter end of the slit gap (the slit interval) is closer to the center of the rotation axis than a longer end of the slit gap.

Second Embodiment

A coating device in a second embodiment according to the present invention will be hereinafter explained.

Figure 17A:
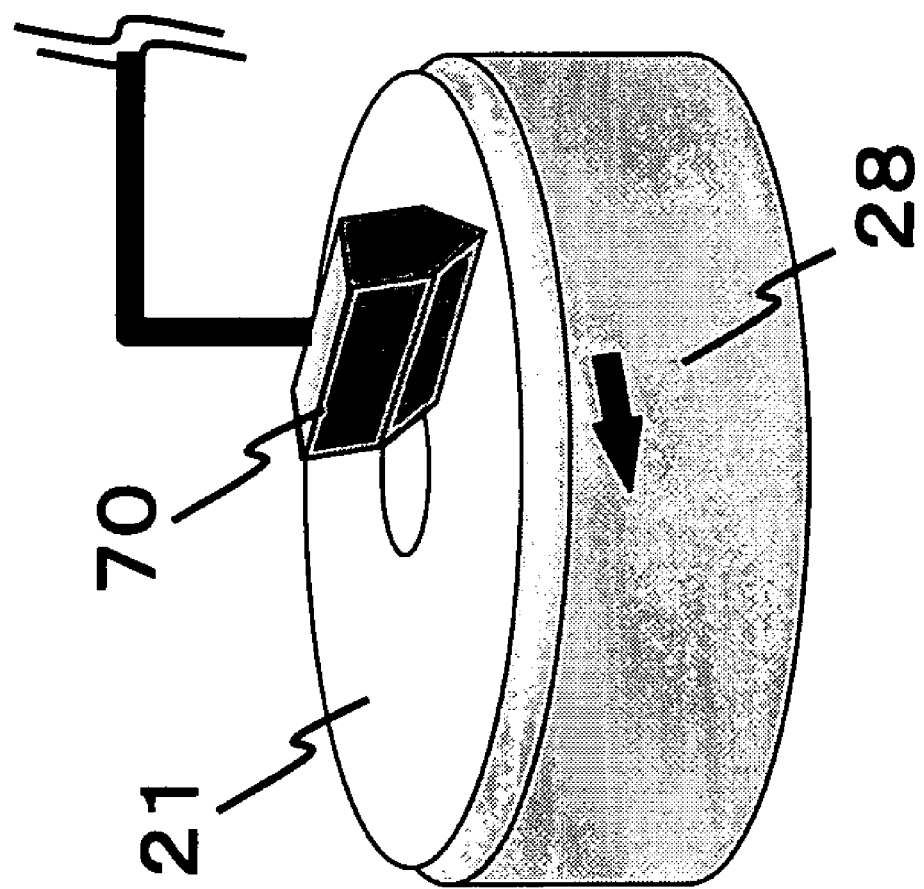
FIG. 17A is a schematic diagram of a coating device in a second embodiment according to the present invention.

FIG. 17A is a perspective view of the coating device in the second embodiment. FIG. 17B is a main part enlarged view of the coating device in FIG. 17A. In FIG. 17B, a die 70 is shown with a part of an upper block 11" cut off between S and S'. FIG. 17C is a diagram of the discharge port 18 viewed from the front. The coating device in the second embodiment has the same basic structure as that in the first embodiment. However, a shape of a slit gap of the die and a coating gap are different. Therefore, the differences will be mainly explained. When the identical components and the identical positions are shown, the components and the positions are denoted by the identical reference numerals and signs.

Figure 6:
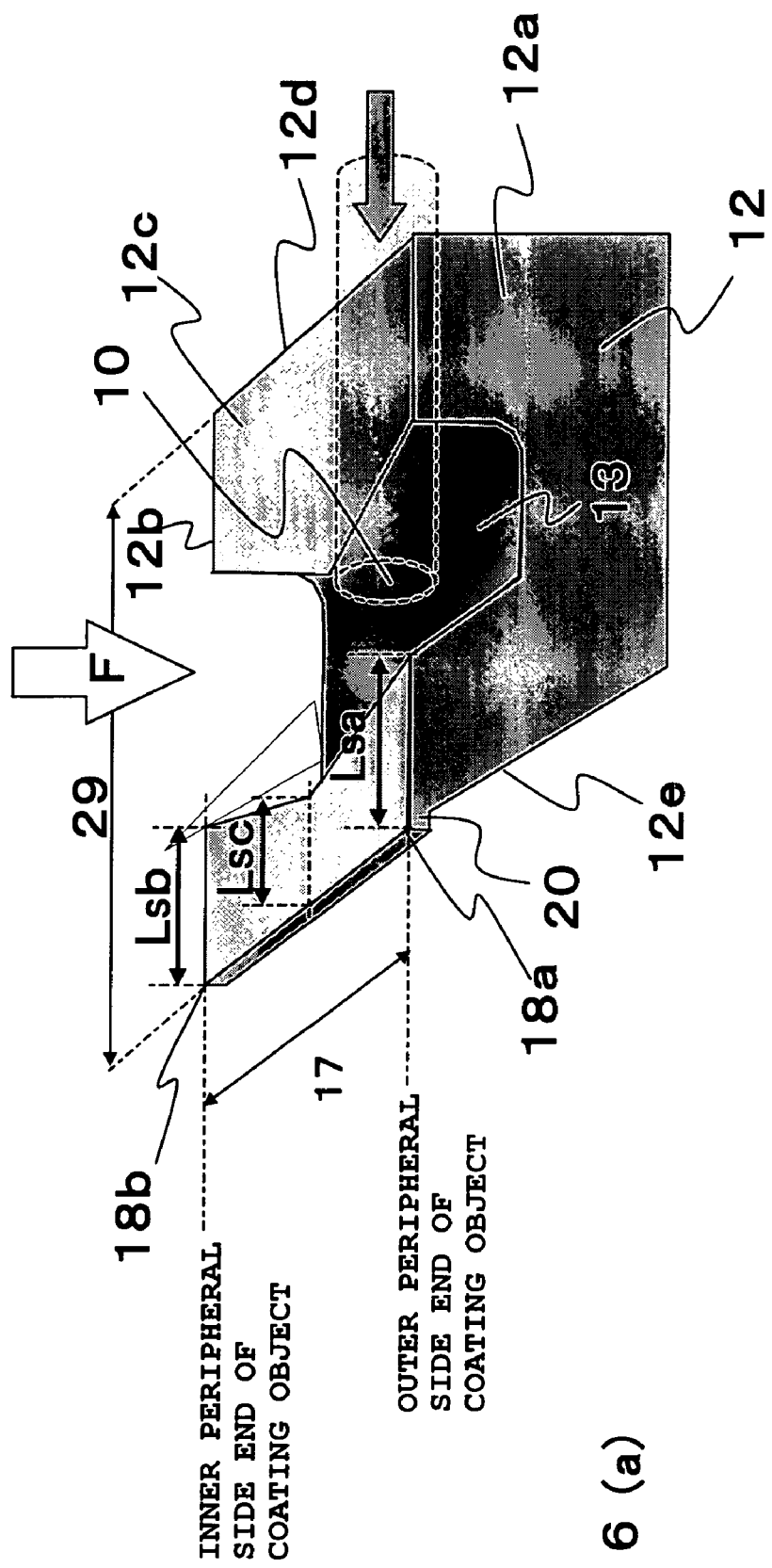
FIG. 6A is a perspective view of a lower block of the die in the first embodiment according to the present invention.
FIG. 6B is a plan view of the lower block of the die in the first embodiment of the present invention.
Figure 6:
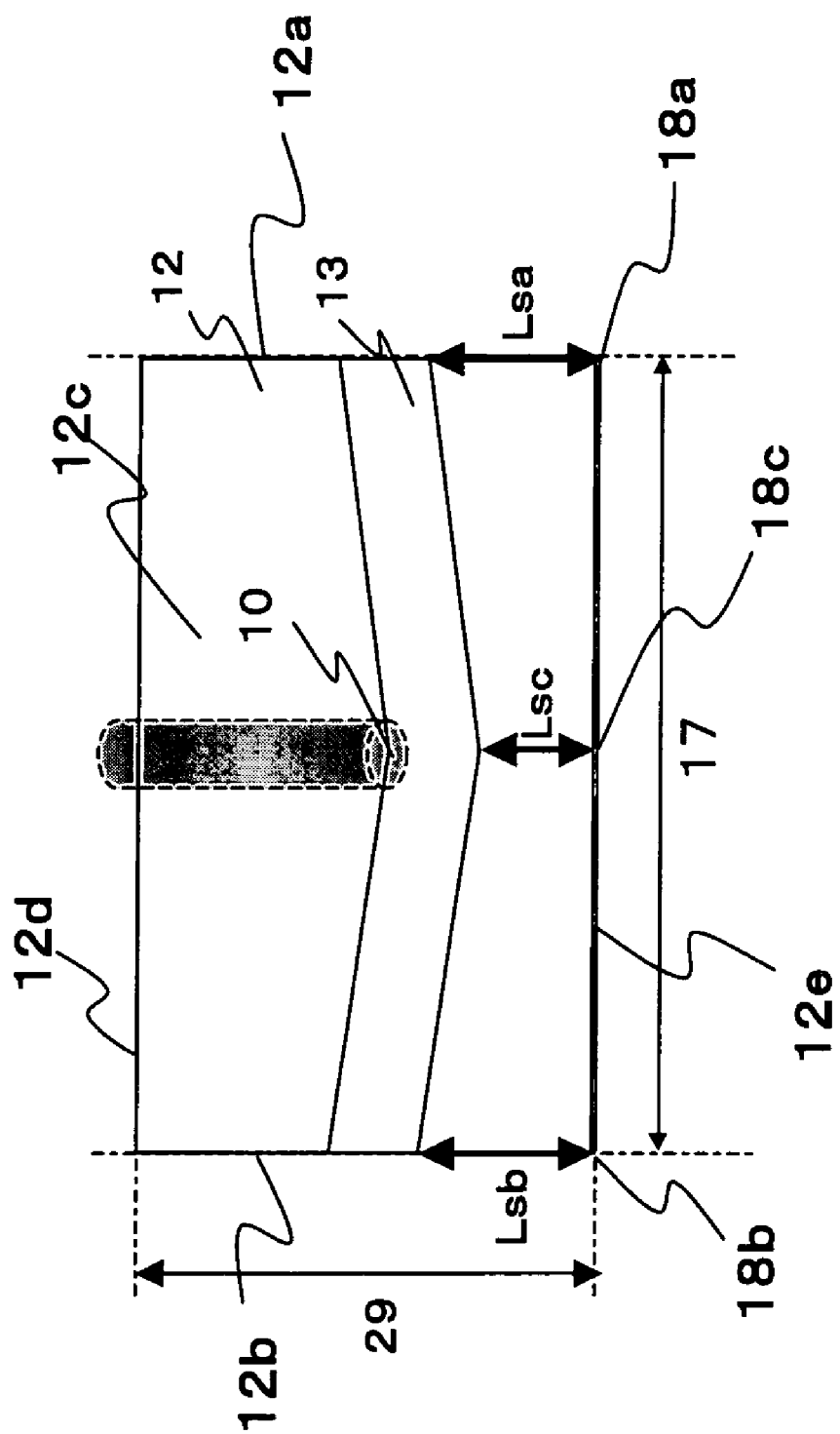
Figure 7:
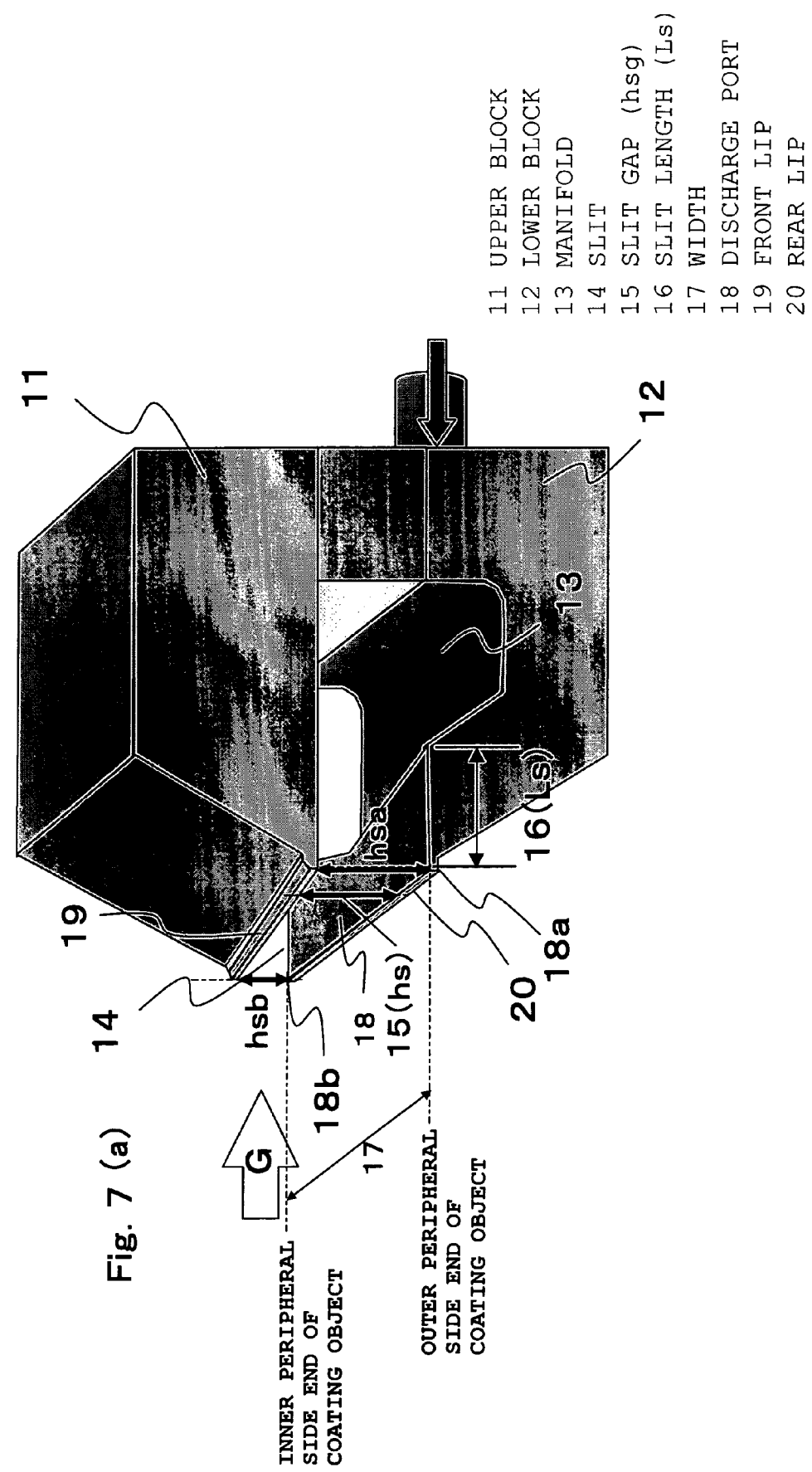
FIG. 7A is a perspective view enlarged for explaining a change in a slit gap of the die in the first embodiment according to the present invention.
FIG. 7B is a plan view of a discharge port of the die in the first embodiment according to the present invention.

The die 70 used in the coating device in the second embodiment shown in FIG. 17A has the upper block 11" and a lower block 12". The lower block 12" has a lower block in which the manifold 13 having a shape identical with that in FIG. 6 is formed. However, as shown in FIG. 17C, the slit gap 15 formed of the upper block 11" and the lower block 12" is fixed in the width 17 direction as in the conventional die (see FIG. 25B). In other words, a front lip 19' and a rear lip 20' are formed substantially parallel to each other. "Substantially parallel" means that the front lip 19' and the rear lip 20' are in a range recognized as parallel under the commonly accepted idea.

As shown in FIG. 17B, when a coating gap, which is a distance between the die 70 and the disk substrate with recording layer 21 at an outer peripheral side end 18*a"* of a discharge port 18", is set as hga and a coating gap at the inner peripheral side end 18*b"* is set as hgb, hga is larger than hgb. An alternate long and short dash line L in FIG. 17B is an imaginary line extending from the outer periphery of the disk substrate with recording layer 21 to the center axis 21*a*.

As explained with reference to FIGS. 10A to 10C in a first embodiment, when the slit gap 15 is fixed, the discharge quantity Q from the die 60 is in a proportional relation with the coating gap hg (Q∝hg^3). Thus, a discharge quantity distribution in the width 17 direction is not a linear distribution but is a curved-line shaped distribution. A discharge quantity in the center of the width 17 is smaller than the target discharge quantity.

Thus, it is possible to slightly increase the discharge quantity in the center of the width 17 and linearly increase the discharge quantity from the inner peripheral side toward the outer peripheral side of the disk substrate 1 by using the die 70 which has the lower block 12″ in which the slit length 16 is the smallest in the center of the width 17.

The second embodiment is equivalent to an example of an invention described below.

The present invention is a manufacturing method for an optical disk for manufacturing an optical disk using a die which includes a manifold for accumulating supplied paint and a slit serving as a supply path extending from the manifold to a discharge port of the paint, a slit length which is length from the manifold to the discharge port being largest in at least one of both end positions in a width direction of the discharge port and smallest in a middle position of both the ends and a space dimension of the slit being substantially fixed in the width direction of the discharge port, and the manufacturing method for an optical disk includes a coating step of arranging, with a center axis of a disk-like coating object as a reference, the die such that a distance from the coating object to the discharge port is smaller in a position close to the center axis than a position far from the center axis, rotationally moving the die relatively around the center axis with the coating object as a reference, and applying the resin over the coating object.

"Substantially fixed" means that the space dimension is within a range recognized as fixed under the commonly accepted idea.

Third Embodiment

A coating device in a third embodiment according to the present invention will be hereinafter explained.

The coating device in the third embodiment has the same basic structure as that in the first embodiment. However, the coating device in the third embodiment is different from that in the first embodiment in that the coating device includes a vibrating unit. Therefore, this difference will be mainly explained.

In the die coat method, a distance between the discharge port 18 at the tip of the die 27 and the surface of the disk substrate 1 (a coating gap) at the time of coating affects a coating film thickness. In the coating device in the first embodiment and the die 27 used in the coating device, when fluctuation in thickness of the disk substrate 1 and rotation irregularity of the rotation table 28 is large, thickness fluctuation is affected.

Thus, the coating device in the third embodiment includes a vibrating unit which gives, after coating, oscillation to the coating film according to movement obtained by combining movement of rotation at the time of coating and movement of reverse rotation thereof as indicated by an arrow 41 in a plan view of the rotation table 28 in FIG. 18A.

As shown in a side view of the rotation table 28 of the coating device in FIG. 18B, an oscillator 35a may be attached to a side of the rotation table or an oscillator 35b may be attached to a rear side of the rotation table. An oscillator 35c may be separately attached to a probe 36 to bring the oscillator 35c into contact with the disk substrate 1 or a placing stand 1 after coating. Oscillation may be given in a direction 38 parallel to the surface of the disk substrate 1 or a direction 39 perpendicular to the surface of the disk by such an oscillator. A state in which the resin film 53 is formed on the disk substrate with recording layer 21 placed on the rotation table 28 is shown in FIG. 18B. This resin film 53 corresponds to the adhesive 7 shown in FIG. 2B.

FIG. 18C is a side sectional view of the die 27. As shown in FIG. 18C, an oscillator 40 may be attached to a position of the die 27, where the slit 14 of the upper block 11 is formed, to apply resin while giving oscillation to the resin and form the resin film 53.

The present invention will be hereinafter explained more in detail in examples.

Sixth Example

The ultraviolet-curing resin 9 was applied over the disk substrate 1 by the coating device in the second example. After applying the ultraviolet-curing resin 9, oscillation was given in the arrow 41 direction shown in FIG. 18A by changing amplitude and frequency. Thickness fluctuation in a plane in that case was measured. Effects of the application of the oscillation were evaluated as good (◯) when the thickness fluctuation was smaller than thickness fluctuation at the time when the ultraviolet-curing resin 9 was applied by an ordinary method (not giving oscillation), evaluated as fair (Δ) when the former did not change from the latter, and evaluated as bad (×) when the former was larger than the latter. Results of the evaluation are shown in Table 7.

TABLE 7

Oscillation direction: Rotating direction

| Amplitude to thickness ratio (times) | Amplitude (μm) | Application time (sec.) | Frequency: f(Hz) | | | | | | | | | | |
|---|---|---|---|---|---|---|---|---|---|---|---|---|---|
| | | | 1 | 5 | 10 | 20 | 100 | 1000 | 10000 | 20000 | 30000 | 35000 | 40000 |
| 1/20 | 1 | 0.5 | Δ | Δ | Δ | Δ | Δ | Δ | Δ | Δ | Δ | Δ | Δ |
| | | 1 | Δ | Δ | Δ | Δ | Δ | Δ | Δ | Δ | Δ | Δ | Δ |
| | | 1.5 | Δ | Δ | Δ | Δ | Δ | Δ | Δ | Δ | Δ | Δ | Δ |
| | | 2 | Δ | Δ | Δ | Δ | Δ | Δ | Δ | Δ | Δ | Δ | Δ |
| 1/10 | 2 | 0.5 | ◯ | ◯ | ◯ | ◯ | ◯ | ◯ | ◯ | ◯ | ◯ | × | × |
| | | 1 | ◯ | ◯ | ◯ | ◯ | ◯ | ◯ | ◯ | ◯ | ◯ | × | × |
| | | 1.5 | ◯ | ◯ | ◯ | ◯ | ◯ | ◯ | ◯ | ◯ | ◯ | × | × |
| | | 2 | ◯ | ◯ | ◯ | ◯ | ◯ | ◯ | ◯ | ◯ | ◯ | × | × |
| 1/5 | 4 | 0.5 | ◯ | ◯ | ◯ | ◯ | ◯ | ◯ | ◯ | ◯ | ◯ | × | × |
| | | 1 | ◯ | ◯ | ◯ | ◯ | ◯ | ◯ | ◯ | ◯ | ◯ | × | × |
| | | 1.5 | ◯ | ◯ | ◯ | ◯ | ◯ | ◯ | ◯ | ◯ | ◯ | × | × |
| | | 2 | ◯ | ◯ | ◯ | ◯ | ◯ | ◯ | ◯ | ◯ | ◯ | × | × |
| 1/2 | 10 | 0.5 | ◯ | ◯ | ◯ | ◯ | ◯ | ◯ | ◯ | ◯ | ◯ | × | × |
| | | 1 | ◯ | ◯ | ◯ | ◯ | ◯ | ◯ | ◯ | ◯ | ◯ | × | × |
| | | 1.5 | ◯ | ◯ | ◯ | ◯ | ◯ | ◯ | ◯ | ◯ | ◯ | × | × |
| | | 2 | ◯ | ◯ | ◯ | ◯ | ◯ | ◯ | ◯ | ◯ | ◯ | × | × |

TABLE 7-continued

Oscillation direction: Rotating direction

| Amplitude to thickness ratio (times) | Amplitude (μm) | Application time (sec.) | 1 | 5 | 10 | 20 | 100 | 1000 | 10000 | 20000 | 30000 | 35000 | 40000 |
|---|---|---|---|---|---|---|---|---|---|---|---|---|---|
| 1 | 20 | 0.5 | ○ | ○ | ○ | ○ | ○ | ○ | ○ | ○ | ○ | x | x |
|  |  | 1 | ○ | ○ | ○ | ○ | ○ | ○ | ○ | ○ | ○ | x | x |
|  |  | 1.5 | ○ | ○ | ○ | ○ | ○ | ○ | ○ | ○ | ○ | x | x |
|  |  | 2 | ○ | ○ | ○ | ○ | ○ | ○ | ○ | ○ | ○ | x | x |
| 3 | 60 | 0.5 | ○ | ○ | ○ | ○ | ○ | ○ | ○ | ○ | ○ | x | x |
|  |  | 1 | ○ | ○ | ○ | ○ | ○ | ○ | ○ | ○ | ○ | x | x |
|  |  | 1.5 | ○ | ○ | ○ | ○ | ○ | ○ | ○ | ○ | ○ | x | x |
|  |  | 2 | ○ | ○ | ○ | ○ | ○ | ○ | ○ | ○ | ○ | x | x |
| 5 | 100 | 0.5 | ○ | ○ | ○ | ○ | ○ | ○ | ○ | ○ | ○ | x | x |
|  |  | 1 | ○ | ○ | ○ | ○ | ○ | ○ | ○ | ○ | ○ | x | x |
|  |  | 1.5 | ○ | ○ | ○ | ○ | ○ | ○ | ○ | ○ | ○ | x | x |
|  |  | 2 | ○ | ○ | ○ | ○ | ○ | ○ | ○ | ○ | ○ | x | x |
| 6 | 120 | 0.5 | x | x | x | x | x | x | x | x | x | x | x |
|  |  | 1 | x | x | x | x | x | x | x | x | x | x | x |
|  |  | 1.5 | x | x | x | x | x | x | x | x | x | x | x |
|  |  | 2 | x | x | x | x | x | x | x | x | x | x | x |

Film thickness 20 μm
Thickness fluctuation was improved: ○,
No change in thickness fluctuation Δ,
Thickness fluctuation Increased: x Concerning the amplitude, energy given to the film by oscillation was insufficient at amplitude 1/20 of the film thickness and no change in the thickness fluctuation was observed. Conversely, when the amplitude increased to be six times or more as large as the film thickness, excessive energy was given to the film to deteriorate the thickness fluctuation.

Concerning the frequency, in a range in which the amplitude was 1/10 to five times as large as the film thickness, influence could be given to the thickness fluctuation from 1 Hz. However, when the frequency increased to 35000 Hz or more, excessive energy was given to the film to deteriorate the thickness fluctuation.

Therefore, in a range in which the amplitude was 1/10 to five times as large as the film thickness, it is possible to reduce the thickness fluctuation at the time of application of the resin by giving oscillation having frequency of 1 Hz to 30000 Hz to a coating film. This makes it possible to increase a margin for thickness fluctuation of a disk, rotation irregularity of a rotation mechanism, and the like and continuously produce optical disks stably.

There is also an effect that, even when entrance of bubbles into a space between resin and a substrate occurs at the time when the resin is applied, it is possible to remove the bubbles by giving oscillation to the resin to temporarily give fluidity to the resin.

The same result was obtained when oscillation was given in the direction 38 horizontal to the disk substrate 1 or the direction 39 perpendicular to the surface of the disk substrate 1 by the oscillator 35a, 35b, or 35c shown in FIG. 18B.

Seventh Example

The oscillator 35 explained with reference to FIG. 18C was set on the die of the second example. Resin was applied over the disk substrate 1 while amplitude and frequency are changed to give oscillation to the resin. Thickness fluctuation in a plane in that case was measured. Effects of the oscillation were evaluated as good (O) when the thickness fluctuation was smaller than thickness fluctuation at the time when the resin was applied by an ordinary method (not giving oscillation), evaluated as fair (Δ) when the former did not change from the latter, and evaluated as bad (x) when the former was larger than the latter. Results of the evaluation are shown in Table 8.

TABLE 8

Oscillation: Slit portion oscillator

| Amplitude to thickness ratio (times) | Amplitude (μm) | Application time (sec.) | 1 | 5 | 10 | 20 | 100 | 1000 | 10000 | 20000 | 30000 | 35000 | 40000 |
|---|---|---|---|---|---|---|---|---|---|---|---|---|---|
| 1/20 | 1 | 0.5 | Δ | Δ | Δ | Δ | Δ | Δ | Δ | Δ | Δ | Δ | Δ |
|  |  | 1 | Δ | Δ | Δ | Δ | Δ | Δ | Δ | Δ | Δ | Δ | Δ |
|  |  | 1.5 | Δ | Δ | Δ | Δ | Δ | Δ | Δ | Δ | Δ | Δ | Δ |
|  |  | 2 | Δ | Δ | Δ | Δ | Δ | Δ | Δ | Δ | Δ | Δ | Δ |
| 1/10 | 2 | 0.5 | ○ | ○ | ○ | ○ | ○ | ○ | ○ | ○ | ○ | x | x |
|  |  | 1 | ○ | ○ | ○ | ○ | ○ | ○ | ○ | ○ | ○ | x | x |
|  |  | 1.5 | ○ | ○ | ○ | ○ | ○ | ○ | ○ | ○ | ○ | x | x |
|  |  | 2 | ○ | ○ | ○ | ○ | ○ | ○ | ○ | ○ | ○ | x | x |
| 1/5 | 4 | 0.5 | ○ | ○ | ○ | ○ | ○ | ○ | ○ | ○ | ○ | x | x |
|  |  | 1 | ○ | ○ | ○ | ○ | ○ | ○ | ○ | ○ | ○ | x | x |
|  |  | 1.5 | ○ | ○ | ○ | ○ | ○ | ○ | ○ | ○ | ○ | x | x |

TABLE 8-continued

Oscillation: Slit portion oscillator

| Amplitude to thickness ratio (times) | Amplitude (μm) | Application time (sec.) | Frequency: f(Hz) | | | | | | | | | | |
|---|---|---|---|---|---|---|---|---|---|---|---|---|---|
| | | | 1 | 5 | 10 | 20 | 100 | 1000 | 10000 | 20000 | 30000 | 35000 | 40000 |
| 1/2 | 10 | 2 | ○ | ○ | ○ | ○ | ○ | ○ | ○ | ○ | ○ | x | x |
| | | 0.5 | ○ | ○ | ○ | ○ | ○ | ○ | ○ | ○ | ○ | x | x |
| | | 1 | ○ | ○ | ○ | ○ | ○ | ○ | ○ | ○ | ○ | x | x |
| | | 1.5 | ○ | ○ | ○ | ○ | ○ | ○ | ○ | ○ | ○ | x | x |
| | | 2 | ○ | ○ | ○ | ○ | ○ | ○ | ○ | ○ | ○ | x | x |
| 1 | 20 | 0.5 | ○ | ○ | ○ | ○ | ○ | ○ | ○ | ○ | ○ | x | x |
| | | 1 | ○ | ○ | ○ | ○ | ○ | ○ | ○ | ○ | ○ | x | x |
| | | 1.5 | ○ | ○ | ○ | ○ | ○ | ○ | ○ | ○ | ○ | x | x |
| | | 2 | ○ | ○ | ○ | ○ | ○ | ○ | ○ | ○ | ○ | x | x |
| 3 | 60 | 0.5 | ○ | ○ | ○ | ○ | ○ | ○ | ○ | ○ | ○ | x | x |
| | | 1 | ○ | ○ | ○ | ○ | ○ | ○ | ○ | ○ | ○ | x | x |
| | | 1.5 | ○ | ○ | ○ | ○ | ○ | ○ | ○ | ○ | ○ | x | x |
| | | 2 | ○ | ○ | ○ | ○ | ○ | ○ | ○ | ○ | ○ | x | x |
| 5 | 100 | 0.5 | ○ | ○ | ○ | ○ | ○ | ○ | ○ | ○ | ○ | x | x |
| | | 1 | ○ | ○ | ○ | ○ | ○ | ○ | ○ | ○ | ○ | x | x |
| | | 1.5 | ○ | ○ | ○ | ○ | ○ | ○ | ○ | ○ | ○ | x | x |
| | | 2 | ○ | ○ | ○ | ○ | ○ | ○ | ○ | ○ | ○ | x | x |
| 6 | 120 | 0.5 | x | x | x | x | x | x | x | x | x | x | x |
| | | 1 | x | x | x | x | x | x | x | x | x | x | x |
| | | 1.5 | x | x | x | x | x | x | x | x | x | x | x |
| | | 2 | x | x | x | x | x | x | x | x | x | x | x |

Thickness fluctuation was improved: ○,
No change in thickness fluctuation Δ,
Thickness fluctuation Increased: x From the results in Table 8, concerning the amplitude, energy given to the resin, which was discharged from the die, by oscillation was insufficient at amplitude 1/20 of the film thickness and no change in the thickness fluctuation was observed. Conversely, when the amplitude increased to be six times or more as large as the film thickness, excessive energy was given to the resin and a state of formation of liquid accumulation right below the discharge port became unstable to deteriorate the thickness fluctuation.

Concerning the frequency, in a range in which the amplitude was 1/10 to five times as large as the film thickness, an effect of improving the thickness fluctuation was obtained from 1 Hz. However, when the frequency increased to 35000 Hz or more, excessive energy was given to the film and a state of formation of liquid accumulation right below the discharge port became unstable to deteriorate the thickness fluctuation.

In this way, it is possible to reduce the thickness fluctuation at the time of application of the resin by applying the resin while giving oscillation having frequency of 1 Hz to 30000 Hz in a range in which the amplitude was 1/10 to five times as large as the film thickness, to the resin discharged from the die. This makes it possible to increase a margin for thickness fluctuation of a disk, rotation irregularity of a rotation mechanism, and the like and continuously produce optical disks stably.

In the first to the third embodiments, the results obtained by using the ultraviolet-curing resin 9 are described. However, the same results are obtained when the ultraviolet-curing adhesive 7 is used.

In the first to the third embodiments, the die based on the structure shown in FIG. 5 and FIGS. 6A and 6B is used. However, the die only has to be constituted by at least the front lip 19, the rear lip 20, and the slit 14 which is formed between the front lip 19 and the rear lip 20 and an opening of which is formed as the paint discharge port 18. Thus, the die is not limited to the structure in the first embodiment.

In the first or the third embodiments, concerning the slit length 16 of the die, the die has the structure in which Lsa=Lsb, a slit length in the center in the coating width direction is the smallest length Lsc in the area of the coating width, and the slit length uniformly increases in the coating width direction from the position toward the ends of the die. Concerning the slit gap 15 of the die, the die has the structure in which the slit gap uniformly increases in the width 17 direction from the inner peripheral side end 18b toward the outer peripheral side end 18a. The structure of the disk is not limited to this. The same effect is obtained as long as the die has a structure in which, concerning the slit length, Lsa≠Lsb and a point or an area where the slit length is shorter than shorter one of Lsa and Lsb and is the smallest slit length Lsc in the area of the coating width is present in the area of the coating width and has a structure in which, concerning the slit gap, the slit gap monotonously increases in the coating width direction from a coating width direction end corresponding to the inner peripheral side end of the disk toward a coating width direction end corresponding to the outer peripheral side end when the resin is applied on the disk.

As respective lengths of the die in the second example, Lsa=Lsb=20 mm, Lsc=15 mm, hsa=100 μm, and hsb=60 μm. However, it goes without saying that a structure of the die is not limited to this structure and can be appropriately changed. For example, when an interval of hsa is reduced, since a discharge quantity decreases at the outer peripheral side end, it is possible to obtain the same effect as that of the die in the second example by reducing the length of Lsa by the reduction of interval of hsa to supplement the discharge quantity.

In the description of the first embodiment, all of the coating step for the adhesive 7 in step ST2, the coating step for the ultraviolet-curing resin 9 in step ST3, and the coating step for resin for forming a cover layer and a rear-side coat layer in step ST7 are performed by the die of the present invention. However, the die may be used for any one of the coating steps.

In the first embodiment, the paint supply path 10 is formed from the side 12*d* to the manifold 13. However, the paint supply path 10 may be formed from the top surface of the upper block 11 toward the manifold 13 or may be formed from the lower surface of the lower block 12 toward the manifold 13. In short, the paint supply path 10 only has to be formed from an outer side located between the end face 12*a* and the end face 12*b* of the lower block 12 toward the manifold 13.

In the first to the seventh examples, the results in formation of the resin film for the intermediate layer are described. However, the present invention is not limited to this. The same results are obtained for formation of a resin film for a cover layer and a rear-side coat layer.

In the first to the seventh example, the coating film thickness was set to 20 μm. However, the present invention is not limited to this. The same results are obtained in a range of 5 μm to 200 μm.

As described above, the die, the method of manufacturing an optical disk, and the optical disk have the effect that it is possible to manufacture a layer having more uniform thickness distribution or manufacture a layer at lower cost and are particularly useful for, for example, manufacturing of a two-layer or multilayer disk in which a resin layer is provided as an intermediate layer, a cover layer, a rear-side coat layer, or the like.

An example of the paint of the present invention corresponds to the ultraviolet-curing adhesive, the ultraviolet-curing resin, the polycarbonate, the acrylic resin, and the like described in the first to the third embodiments and is used for formation of the intermediate layer 3, the cover layer 5 and the rear-side coat layer 6 of the optical disk. However, the paint does not have to be limited to the ultraviolet-curing adhesive, resin, and the like and does not have to be limited to use in manufacturing of the optical disk. It is possible to use the paint in forming a layer by applying some kind of paint.

What is claimed is:

1. A die comprising:
   a manifold for accumulating supplied paint, and
   a supply path extending from said manifold to a discharge port of said paint,
   wherein:
   a length of said discharge port is smallest in one of both ends in a width direction of said discharge port and largest in the other end, and
   a length of said supply path which is a length from said manifold to said discharge port is largest in at least one of both end positions in the width direction of said discharge port and smallest in a position between both the ends.

2. The die according to claim 1, wherein the length of said supply path monotonically increases from the position between both the ends where the length is smallest toward the one end position and the other end position.

3. The die according to claim 2, wherein the position where the length of said supply path is smallest is a center position between both the ends.

4. The die according to claim 3, wherein
   a ratio of the smallest length and the largest length is 3:5 in the length of said discharge port,
   the length of said supply path is identical in the one end position and the other end position, and
   a ratio of the smallest length and the largest length is 3:4 in the length of said supply path.

5. A method of manufacturing an optical disk including a coating step of applying resin over a disk-like coating object to form the optical disk using the die according to claim 1.

6. The method of manufacturing an optical disk according to claim 5, further comprising an oscillation step of giving oscillation to the resin applied.

7. The method of manufacturing an optical disk according to claim 5, wherein the coating step is a step of arranging, with a center axis of the disk-like coating object as a reference, the die such that the smallest length of said discharge port is closer to the center axis than the largest length of said discharge port and a distance from the coating object to the discharge port is fixed, rotationally moving the die relatively around the center axis with the coating object as a reference, and applying the resin over the coating object.

8. The method of manufacturing an optical disk according to claim 7, wherein the distance from the coating object to the discharge port is substantially identical with a thickness of a film to be formed.

\* \* \* \* \*